United States Patent
Shimizu et al.

(10) Patent No.: US 6,292,195 B1
(45) Date of Patent: *Sep. 18, 2001

(54) FORMATTING COLOR SIGNALS BY SELECTING IRREGULARLY DISTRIBUTED OUTPUT COLOR POINTS OF ONE COLOR SPACE SURROUNDING AN INPUTTED COLOR POINT OF ANOTHER COLOR SPACE

(75) Inventors: Masayoshi Shimizu; Shoji Suzuki; Satoshi Semba, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,707

(22) Filed: Mar. 23, 1998

(30) Foreign Application Priority Data

Sep. 26, 1997 (JP) .......................................... 9-262564

(51) Int. Cl.[7] .................................................. G06T 17/00
(52) U.S. Cl. ............................................ 345/431; 345/427
(58) Field of Search ................................ 345/431, 419, 345/418, 427, 426, 429, 432

(56) References Cited

U.S. PATENT DOCUMENTS

| 4,477,833 | * | 10/1984 | Clark et al. .......................... 358/80 |
|---|---|---|---|
| 5,268,754 | * | 12/1993 | Van De Capelle et al. ......... 358/527 |
| 5,471,324 |   | 11/1995 | Rolleston . |
| 5,519,515 | * | 5/1996 | Komatsu ............................... 358/518 |
| 5,625,378 | * | 4/1997 | Wan et al. ............................. 345/150 |
| 5,692,071 | * | 11/1997 | Govaert ................................ 382/167 |
| 5,721,572 | * | 2/1998 | Wan et al. ............................. 345/431 |
| 5,832,109 | * | 11/1998 | Mahy .................................... 382/162 |
| 5,880,738 | * | 3/1999 | Donelly ................................ 345/431 |

FOREIGN PATENT DOCUMENTS

| 7-95431 |   | 4/1995 | (JP) . |
| 7-307872 |   | 11/1995 | (JP) . |
| 08223431A | * | 8/1996 | (JP) ................................ H04N/1/60 |
| 11103397A | * | 4/1999 | (JP) ................................ H04N/1/60 |
| WO 9816057 | * | 8/1996 | (WO) .............................. H04N/1/60 |
| WO 9819452 | * | 5/1998 | (WO) .............................. H04N/1/60 |

OTHER PUBLICATIONS

"Efficient Lattices for Sampling" IBM TDB, vol. 40, issue 5, pp. 141–144, May, 1997.*

* cited by examiner

*Primary Examiner*—Cliff Vo
(74) *Attorney, Agent, or Firm*—Staas & Halsey LLP

(57) ABSTRACT

A color signal selection apparatus comprising a color space split unit for splitting a color space to which an inputted first color signal belongs, according to the first color signal, and a color signal selection unit for selecting second color signals from within color subspaces which have been formed by the splitting of the color space split unit, the second color signals being distributed on the color subspaces.

37 Claims, 37 Drawing Sheets

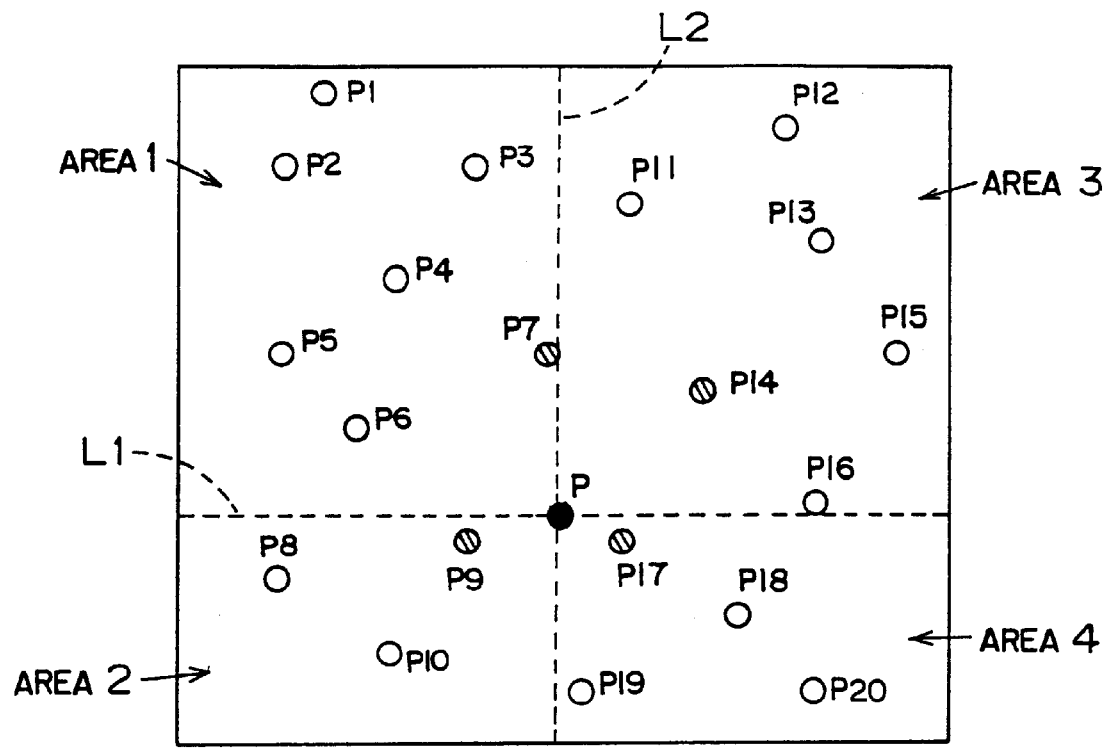
○ COLOR IN THE TABLE (NOT SELECTED)
◍ COLOR IN THE TABLE (SELECTED)
● REFERENCE COLOR (INTERPOLATION GENERATION COLOR)
---- AREA SPLIT LINE
F I G. 3

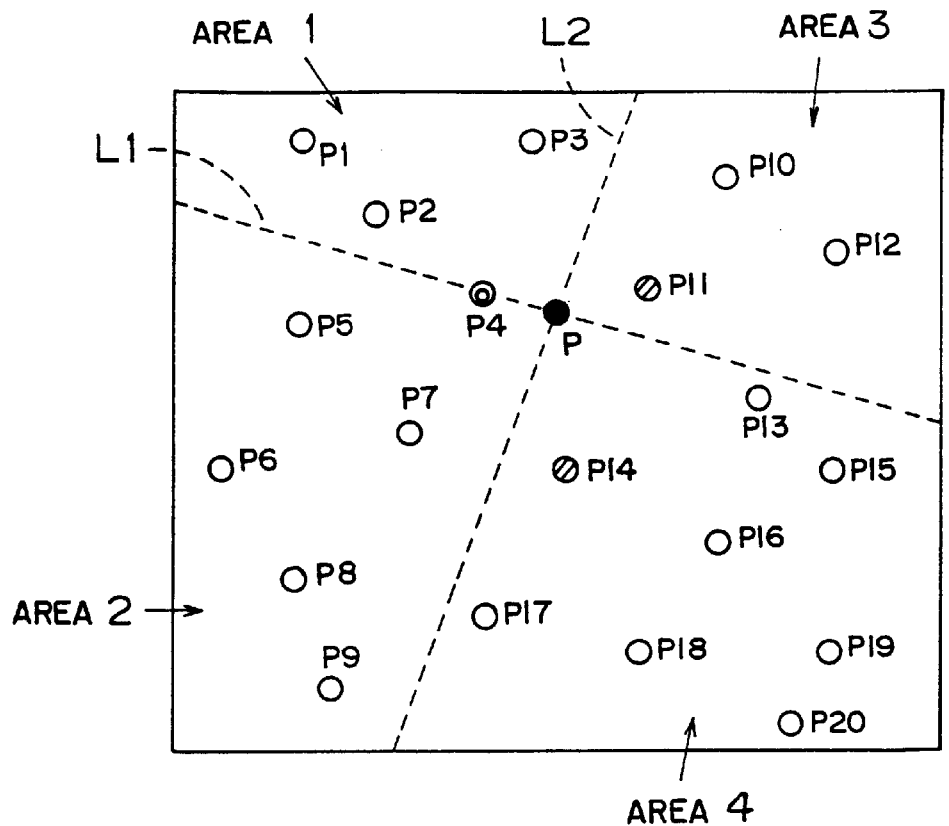
| ○ | COLOR IN THE TABLE (NOT SELECTED) |
| ⊚ | COLOR IN THE TABLE (SELECTED AS ROTATION REFERENCE) |
| ⊘ | COLOR IN THE TABLE (SELECTED) |
| ● | REFERENCE COLOR (INTERPOLATION GENERATION COLOR) |
| ---- | AREA SPLIT LINE |
F I G. 6

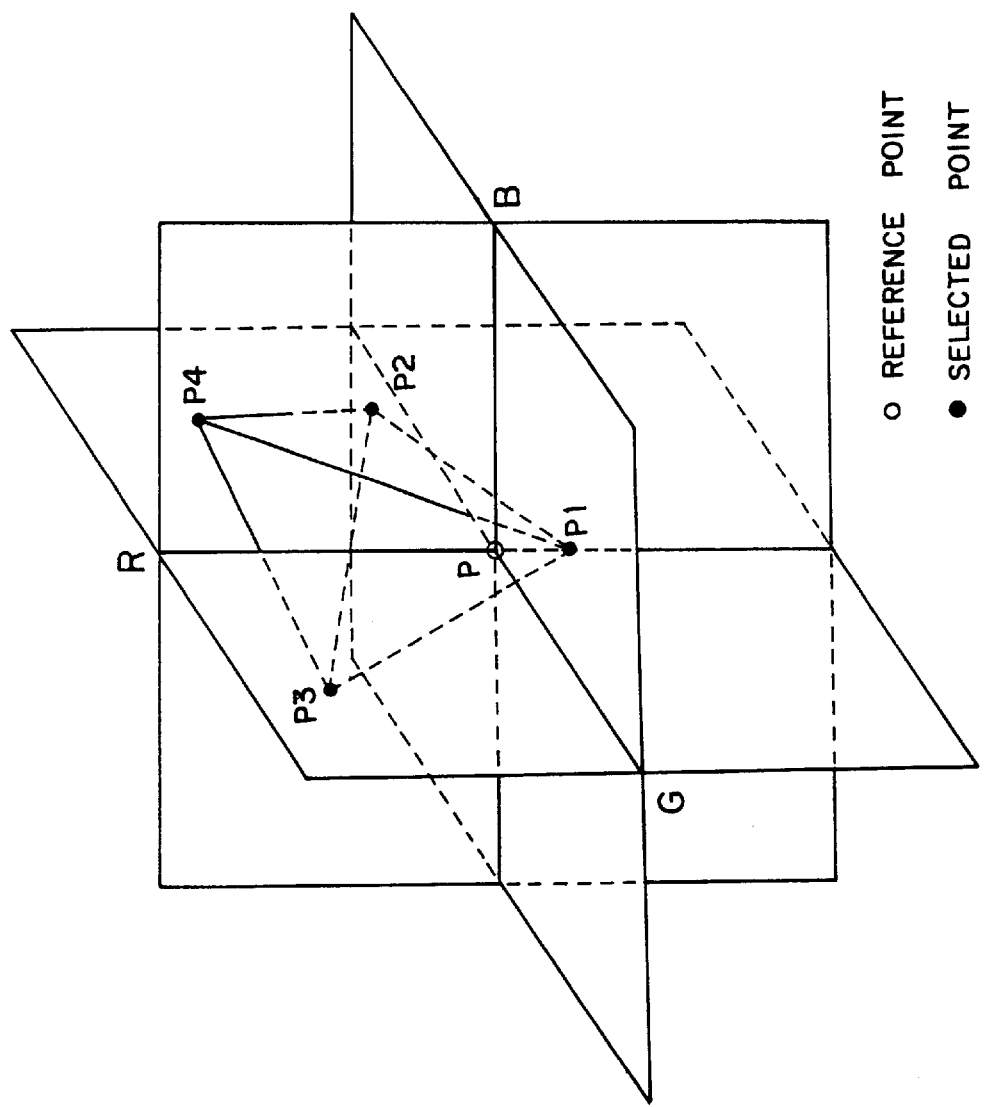
F I G. 8

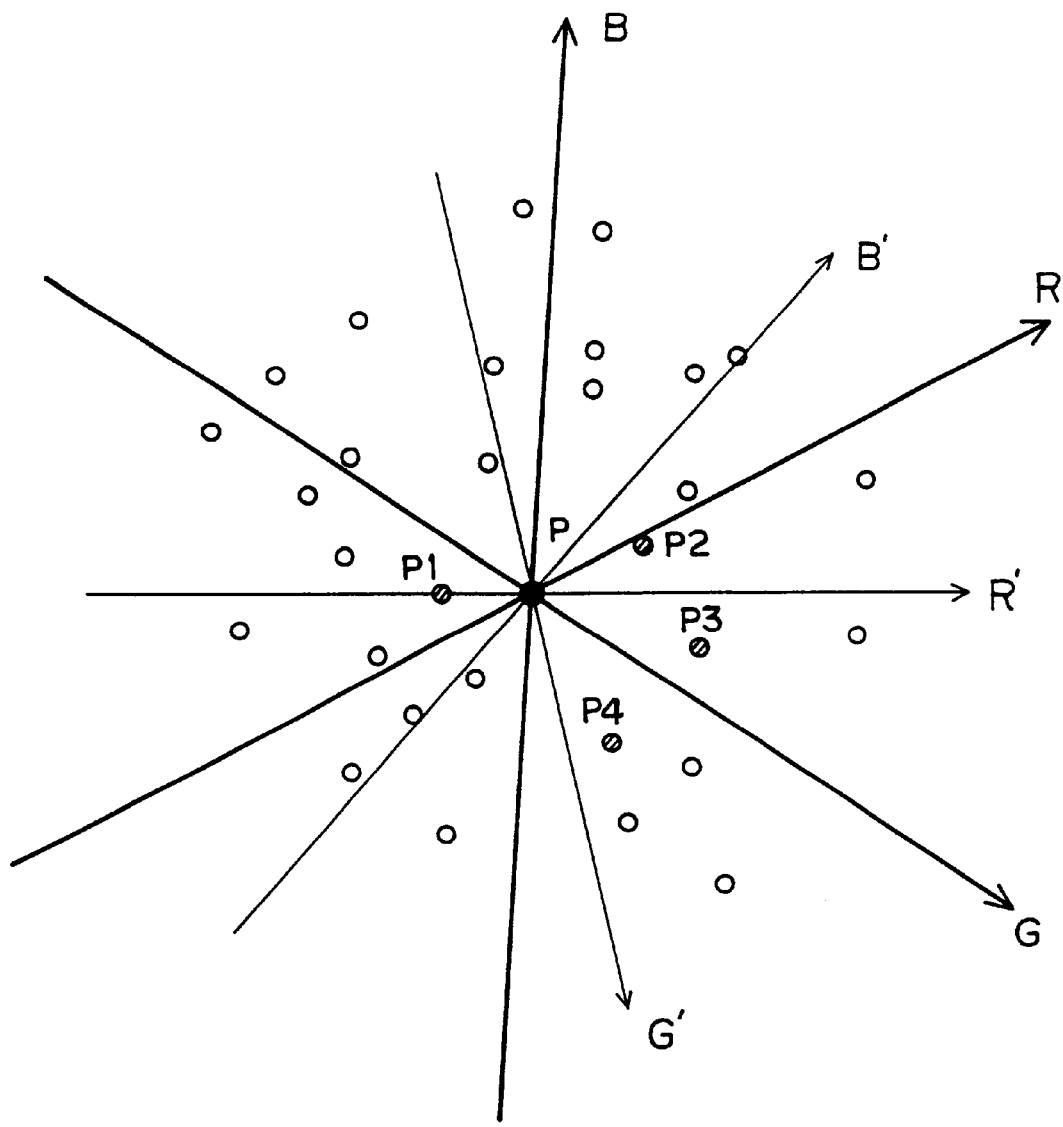
- ● REFERENCE POINT
- ⊘ POINT REGISTERED IN THE COLOR CONVERSION TABLE (SELECTED POINT)
- ○ POINT REGISTERED IN THE COLOR CONVERSION TABLE (POINT NOT SELECTED)
F I G. 9

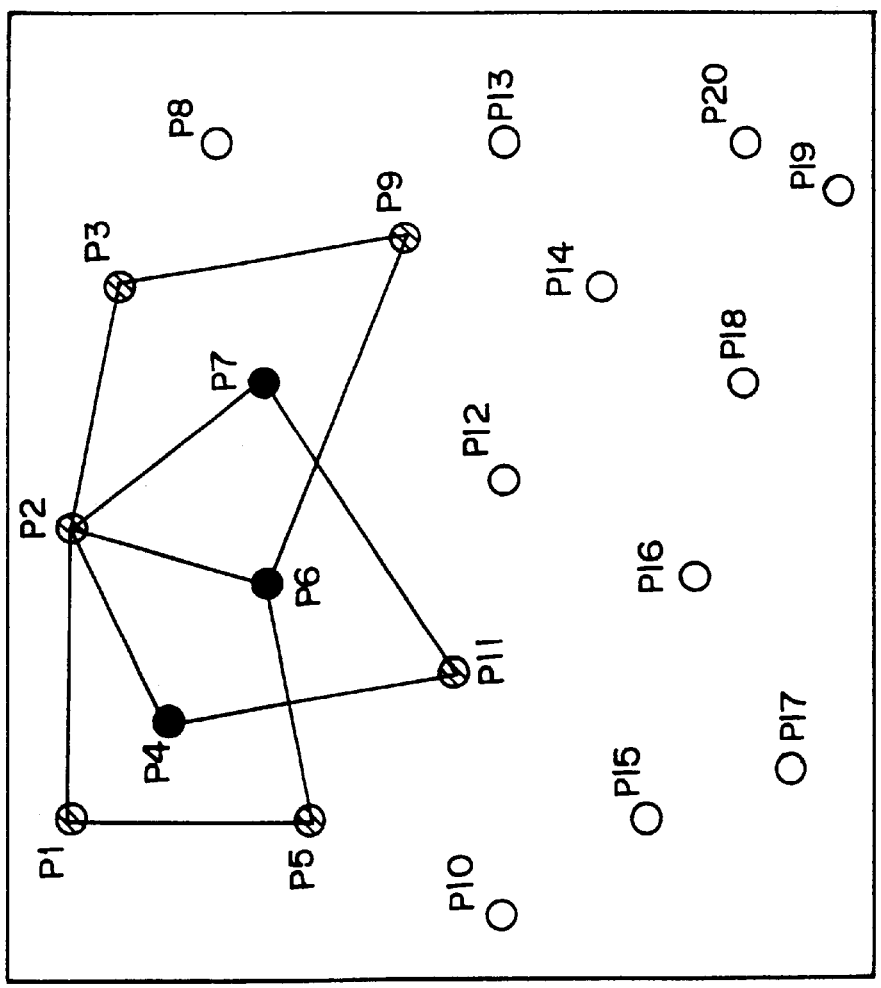
F I G. 10
● POINT REGISTERED IN THE COLOR CONVERSION TABLE (REFERENCE POINT)
⊘ POINT REGISTERED IN THE COLOR CONVERSION TABLE (SELECTED POINT)
○ POINT REGISTERED IN THE COLOR CONVERSION TABLE (POINT NOT SELECTED)

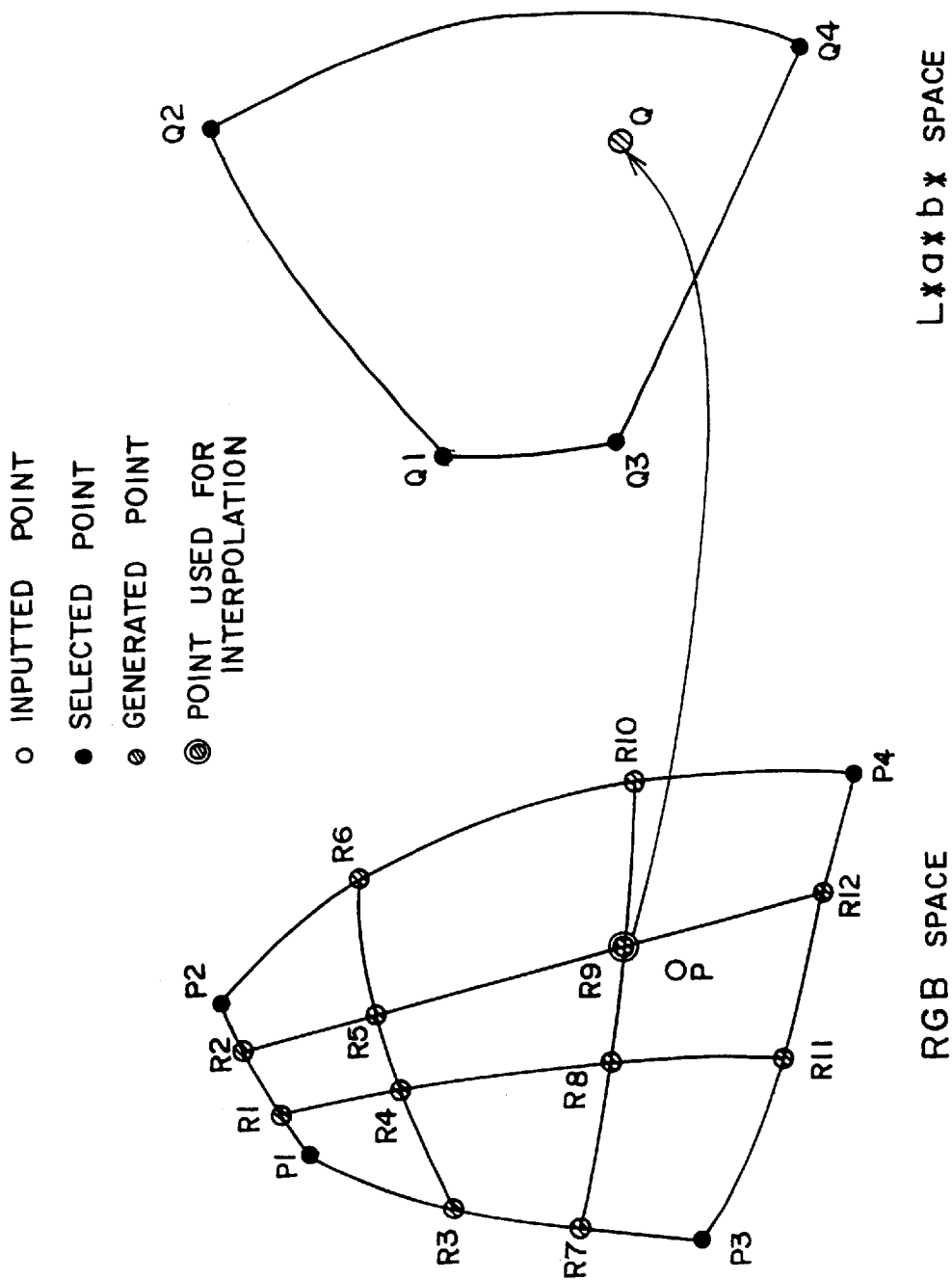
F I G. 15

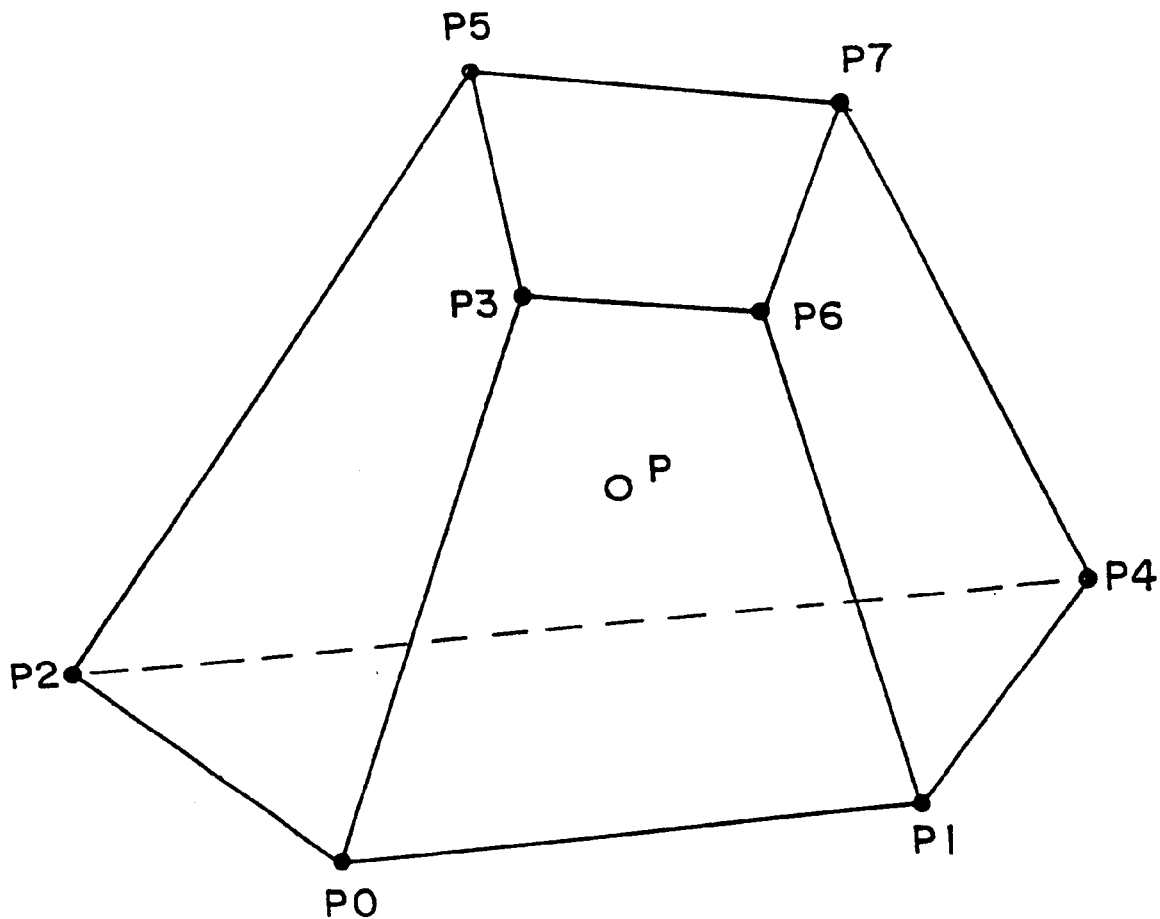
F I G. 25

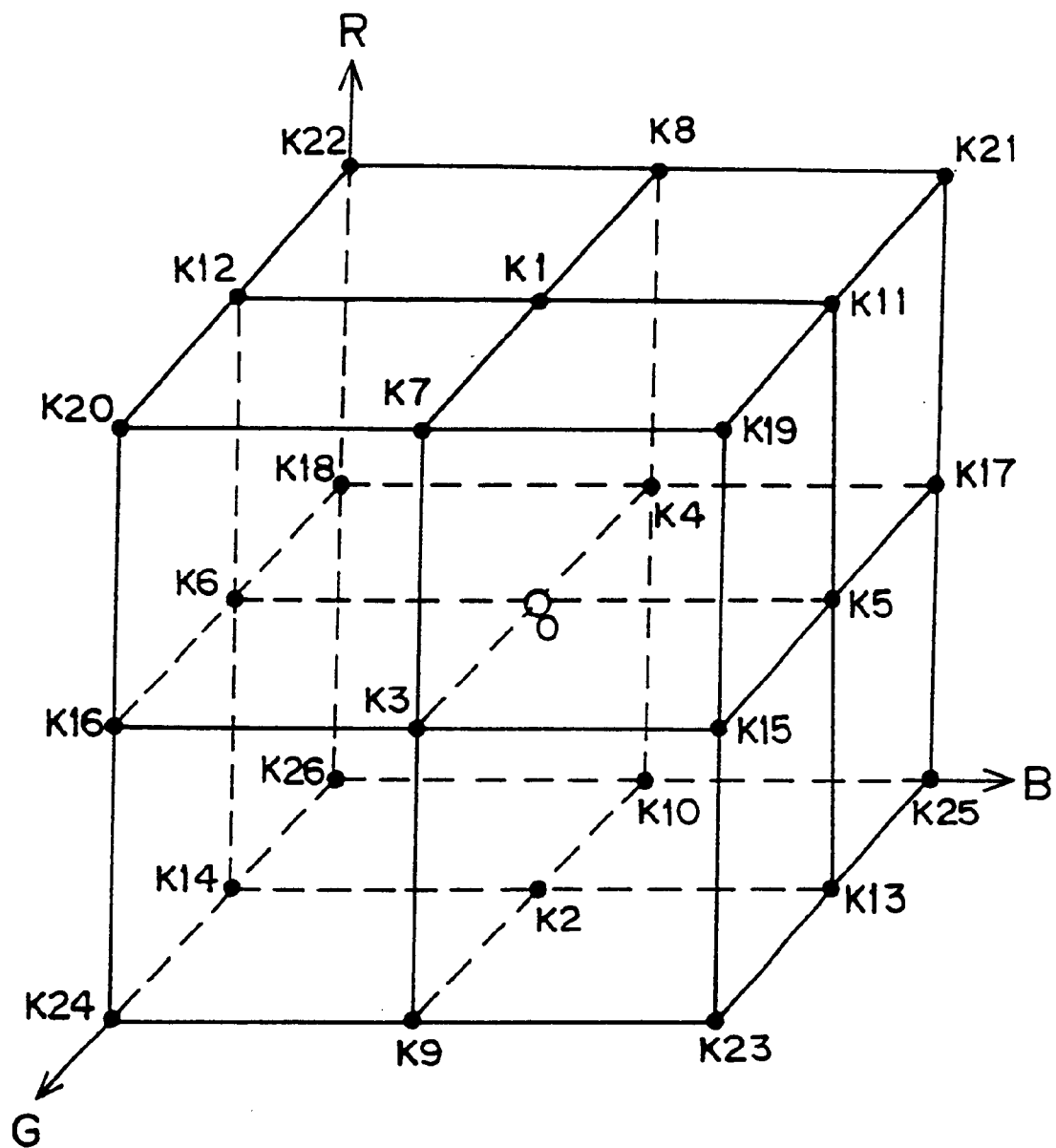
○ SELECTED POINT
● POINT ADJACENT TO POINT O
F I G. 29

FORMATTING COLOR SIGNALS BY SELECTING IRREGULARLY DISTRIBUTED OUTPUT COLOR POINTS OF ONE COLOR SPACE SURROUNDING AN INPUTTED COLOR POINT OF ANOTHER COLOR SPACE

BACKGROUND OF THE INVENTION

1. Field of the Invention

The present invention relates to a color signal selection apparatus, color signal interpolation apparatus, color signal generation apparatus, surrounding point selection method, and a color conversion table creation method, which are particularly suitable for application to the selection of points surrounding an inputted point from points irregularly distributed on a space.

2. Description of the Related Art

Recently, the full-color image generation technology is rapidly developing in printers, facsimiles, etc., and there is a growing demand for sharing color images among different devices. However, an attempt to share color images among different devices presents the problem that, since the different devices provide different color reproducibilities, the colors of images sent from a transmission side are different from those of images obtained on a reception side.

In the case of printers and scanners, etc., for example, colors are respectively treated in the formats of color signals such as CMY signals and RGB signals, etc. which are sent to devices. In other words, in the case of printers having the values from 0 (minimum value) to 255 (maximum value) as the values of output color signals, all output colors are represented by combinations of CMY input signal values from 0 to 255. In this case, since even CMY signals with identical values provide different print colors, depending on printer models, it can be the that the representation of colors by CMY signals is device-dependent.

That is why color signals represented in a device-dependent representation format are transferred into an intermediate representation format which is independent of devices, thereby achieving the same color reproduction among different devices.

For example, the representations such as L*a*b signals and XYZ signals are used as methods for representing absolute colors which are independent of devices. These representations can be used to represent intermediate colors in the color conversion among the color spaces of different devices because colors represented by the representations are uniquely defined.

Specifically, images represented by RGB signals inputted from a scanner are converted into images represented by L*a*b* signals, and the L*a*b* signals are further converted into CMY signals before the images are outputted to a printer. Therefore, if the representation formats of these color signals are correctly converted, the same colors can be obtained among devices.

To convert the representation formats of color signals, the values of color signals represented in each format must be converted into the values of color signals of another format. One method for converting the values of color signals is to use a color conversion table describing the correspondence of colors in each color space. In the conversion of color signals by use of the color conversion table, when color signals registered in the color conversion table are converted into the color signals of another format, the correspondence registered in the color conversion table is used for the conversion. When a color signal not registered in the color conversion table is converted into the color signal of another format, color signals near the color signal to be converted are selected from the color signals registered in the color conversion table. These selected color signals are used for interpolation to convert the color signal to be converted.

Here, the color conversion table falls into two categories: a regularity table and an irregularity table. In the regularity table, the color signals to be converted are regularly distributed on a color space, whereas, in the irregularity table, the color signals to be converted are irregularly distributed on a color space.

In case of color conversion using the regularity table, even when a color signal not registered in the color conversion table has been inputted as one to-be-converted, color signals surrounding the color signal to-be-converted can be readily selected from among color signals registered in the color conversion table.

Moreover, since the selected color signals are distributed at grid points on a color space, the conversion of the color signal to-be-converted can be effected comparatively easily by a tetrahedron interpolation, triangle pole interpolation, cube interpolation, or the like.

On the other hand, in case of color conversion using the irregularity table, when a color signal not registered in the color conversion table has been inputted as one to-be-converted, this color signal to-be-converted is not always surrounded with selected color signals even by selecting the color signals near the color signal to-be-converted from among color signals registered in the color conversion table. In some cases, therefore, the precision of an interpolation is unsatisfactory in spite of the interpolation using the color signals near the color signal to-be-converted.

A method for selecting colors which are used for interpolative calculations in color conversion, and a method for transforming the layout of a color conversion table into a table which is easy of utilization in the execution of color conversion, are mentioned in the Official Gazette of Japanese Patent Application Laid-open No. 95431/1995 by way of example.

This example discloses a method wherein an interpolation is performed using data which are not distributed at grid points in a color space. That is, it states a color selection method in the case of color conversion using an irregularity table.

FIG. 1 is a flowchart showing the color selection method in the prior art.

Referring to the figure, k points x1 to xk nearest to a point x to-be-interpolated are selected (step ST1).

Subsequently, it is checked if the point x to-be-interpolated is surrounded with the selected k points x1 to xk (step ST2). On condition that the point x to-be-interpolated is not surrounded with the selected k points x1 to xk (step ST3), the next nearest points are selected (step ST4). The processing is iterated until points surrounding the point x to-be-interpolated is found. In due course, when the points surrounding the point x to-be-interpolated have been selected, the interpolation is performed using the selected points (step ST5).

Further, the afore cited Official Gazette of Japanese Patent Application Laid-open No. 95431/1995 refers to a method wherein, by employing a convex interpolation, a color conversion table (irregularity table) in which color signals are not distributed at grid points is transformed into a color conversion table (regularity table) in which color signals are distributed at grid points. With this method, the color signals of regular distribution are created by employing the convex interpolation, and the created color signals are registered in the regularity table.

With the color signal selection method, however, in the case where the point x to-be-interpolated is not surrounded with the selected k points x1 to xk, the selection of data is redone, and hence, the data selection needs to be iterated for the purpose of finding the points surrounding the point x to-be-interpolated. This leads to the problem of a long processing time period for selecting the points which surround the point x to-be-interpolated.

Another problem is that a time period is expended on the selection of surrounding color signals to lower the processing speed of color conversion, so a processing speed similarly lowers even in case of applying the surrounding color signals to the transformation of the irregularity table into the regularity table.

A further problem is that, in a case where each color signal to be transferred from the irregularity table to the regularity table is generated by interpolative calculations, it cannot be generated outside any range in which it is surrounded with the color signals registered in the irregularity table.

SUMMARY OF THE INVENTION

The first object of the present invention is to incarnate the high speed selection of points surrounding an inputted point, from among points which are irregularly distributed on a space.

The second object of the present invention is to incarnate the generation of the color signals of a regularity table from those of an irregularity table without any omission.

In order to accomplish the above objects, the present invention comprises a color space split unit for splitting a color space to which an inputted first color signal belongs, according to the first color signal, and a color signal selection unit for selecting second color signals from within split color subspaces.

Thus, even in a case where the second color signals are irregularly distributed on the color space, the selection of the second color signals surrounding the first color signal does not end in failure, the selection of color signals not surrounding the first color signal is prevented, and it can be dispensed with to redo the selection of the second color signals. It is therefore permitted to select the second color signals surrounding the first color signal, at high speed.

Besides, according to one aspect of the present invention, a rotational transformation of color signals distributed on the color space is performed in order that the second color signals may come into predetermined areas.

Thus, in selecting the second color signals which surround the first color signal, the number of the second color signals can be made as small as possible, and interpolative calculations can be executed simply.

According to another aspect of the present invention, the second color signals are selected on the basis of a relationship in magnitude between values of components of the first color signal and those of components of the each second color signal.

Thus, the second color signals surrounding the first color signal can be reliably selected merely by comparing the values of the components of the first color signal with those of the components of each of the second signals, so that the second color signals surrounding the first color signal can be selected merely by executing simple calculations.

According to still another aspect of the present invention, the color signals of the shortest distances from the first color signal are selected from within the split color subspaces as the second color signals.

Thus, color signals at points far from the first color signal can be prevented from being used for interpolative calculations, and the interpolative calculations of the first color signal using the second color signals can be executed at a high precision.

According to yet another aspect of the present invention, the color signals of the shortest distances from the first color signal, the distances being equal to or greater than a predetermined value, are selected from within the split color subspaces as the second color signals.

Thus, a deviation or an offset can be prevented from occurring in the range of color signals generable by interpolative calculations, the deviation being ascribable to the selection of only color signals within a limited range of small extent, and the omission of any color signal generable within a color reproduction range on the color space can be avoided.

Meanwhile, according to one aspect of the present invention, a color space split unit for splitting a first color space according to an inputted first color signal, a color signal selection unit for selecting second color signals from within split first color subspaces, and a color signal calculation unit for calculating a result of conversion of the first color signal into a color signal of a second color space, on the basis of results of conversions of the second color signals into color signals of the second color space are provided.

Thus, even in a case where the second color signals are irregularly distributed on the first color space, it is permitted by picking out the second color signals from within the split first color subspaces, respectively, to reliably surround the first color signal with the second color signals and to quickly select the second color signals necessary for the interpolation of the first color signal, so that the interpolation of the color signal can be executed at high speed.

Besides, according to one aspect of the present invention, the first color space is split according to values of a grid point on the first color space.

Thus, interpolation points can be regularly generated on the first color space, and the distribution of color signals on the first color space can be uniformalized without a deviation or an offset.

Meanwhile, according to one aspect of the present invention, a color space split unit for splitting a first color space according to an inputted first color signal, a color signal selection unit for selecting second color signals from within split first color subspaces, and a color signal calculation unit for calculating results of conversions relevant to third color signals surrounded with the second color signals, on the basis of results of conversions of the second color signals into color signals of a second color space are provided.

Thus, the third color signal to be interpolated on the first color space can be made different from the first color signal serving as the reference point of the splitting on the first color space, and the reference point in the case of splitting the color space can be shared or set common even when a different color signal is inputted as the third color signal, so that the second color signals can be collectively selected as to the different third color signals which lie within an identical range surrounded with the second color signals.

Herein, according to one aspect of the present invention, the first color space is split according to values of a grid point on the first color space.

Thus, reference points for selecting the second color signals can be set at equal intervals on the first color space, and the selections of the second color signals on the first color space can be regularly performed.

Besides, according to one aspect of the present invention, a grid distance of the grid points is altered on the basis of a density of the color signals distributed on the first color space.

Thus, in selecting the second color signals with reference to each of the grid points, it is permitted to prevent the same second color signals from being selected for the different grid points and to reduce the overlap of ranges surrounded with the second color signals, so that new interpolation points can be efficiently generated on the first color space.

In addition, according to one aspect of the present invention, a color signal distributed on the first color space is inputted as the first color signal.

Thus, ranges which are surrounded with the second color signals selected with reference to the first color signal can be set without any vacancy over the whole range of the color signals distributed on the first color space, and the omission of any color signal generable within a color reproduction range on the color space can be avoided. Incidentally, the color signals distributed on the first color space are, for example, values registered in a color conversion table.

Yet in addition, according to one aspect of the present invention, values of a grid point on the first color space are set as the third color signal.

Thus, even in a case where the third color signal to be interpolated on the first color space is different from the first color signal serving as the reference point of the splitting on the first color space, the color signal of the grid point on the first color space can be obtained.

Meanwhile, according to one aspect of the present invention, a color signal input unit for inputting a first color signal which belongs to a first color space, a color signal selection unit for selecting second color signals which surround the first color signal, a correspondence relationship acquisition unit for acquiring correspondence relationships between the second color signals and third color signals which belong to a second color space, a weight coefficient setting unit for setting weight coefficients relevant to the second color signals selected by the color signal selection unit, an interpolation point generation unit for generating interpolation points in a range surrounded with the second color signals, on the basis of the weight coefficients, a weight coefficient selection unit for selecting the weight coefficients of the interpolation point nearest to a fourth color signal surrounded with the second color signals, from among the weight coefficients set by the weight coefficient setting unit, and an interpolation operation unit for calculating a result of conversion of the fourth color signal into a color signal of the second color space, in such a way that the weight coefficients selected by the weight coefficient selection unit are applied to the third color signal are provided.

Thus, in selecting the second color signals which surround the first color signal, the number of the second color signals can be made as small as possible, and interpolative calculations can be executed simply.

Besides, according to one aspect of the present invention, the second color signals are selected on the basis of a relationship in magnitude between values of components of the first color signal and those of components of the each second color signal.

Thus, the second color signals surrounding the first color signal can be reliably selected merely by comparing the values of the components of the first color signal with those of the components of each of the second signals, so that the second color signals surrounding the first color signal can be selected merely by executing simple calculations.

Herein, according to one aspect of the present invention, the color signals of the shortest distances from the first color signal are selected from within the split color subspaces as the second color signals.

Thus, color signals at points far from the first color signal can be prevented from being used for interpolative calculations, and the interpolative calculations of the first color signal using the second color signals can be executed at a high precision.

In addition, according to one aspect of the present invention, the color signals of the shortest distances from the first color signal, the distances being equal to or greater than a predetermined value, are selected from within the split color subspaces as the second color signals.

Thus, a deviation or an offset can be prevented from occurring in the range of color signals generable by interpolative calculations, the deviation being ascribable to the selection of only color signals within a limited range of small extent, and the omission of any color signal generable within a color reproduction range on the color space can be avoided.

Meanwhile, according to one aspect of the present invention, a color space split unit for splitting a first color space according to an inputted first color signal, a color signal selection unit for selecting second color signals from within split first color subspaces, and a color signal calculation unit for calculating a result of conversion of the first color signal into a color signal of a second color space, on the basis of results of conversions of the second color signals into color signals of the second color space are provided.

Thus, even in a case where the second color signals are irregularly distributed on the first color space, it is permitted by picking out the second color signals from within the split first color subspaces, respectively, to reliably surround the first color signal with the second color signals and to quickly select the second color signals necessary for the interpolation of the first color signal, so that the interpolation of the color signal can be executed at high speed.

Besides, according to one aspect of the present invention, the first color space is split according to values of a grid point on the first color space.

Thus, interpolation points can be regularly generated on the first color space, and the distribution of color signals on the first color space can be uniformalized without a deviation or an offset.

Meanwhile, according to one aspect of the present invention, a color space split unit for splitting a first color space according to an inputted first color signal, a color signal selection unit for selecting second color signals from within split first color subspaces, and a color signal calculation unit for calculating results of conversions relevant to third color signals surrounded with the second color signals, on the basis of results of conversions of the second color signals into color signals of a second color space are provided.

Thus, the third color signal to be interpolated on the first color space can be made different from the first color signal serving as the reference point of the splitting on the first color space, and the reference point in the case of splitting the color space can be shared or set common even when a different color signal is inputted as the third color signal, so that the second color signals can be collectively selected as to the different third color signals which lie within an identical range surrounded with the second color signals.

Herein, according to one aspect of the present invention, the first color space is split according to values of a grid point on the first color space.

Thus, reference points for selecting the second color signals can be set at equal intervals on the first color space, and the selections of the second color signals on the first color space can be regularly performed.

Besides, according to one aspect of the present invention, a grid distance of the grid points is altered on the basis of a density of the color signals distributed on the first color space.

Thus, in selecting the second color signals with reference to each of the grid points, it is permitted to prevent the same second color signals from being selected for the different grid points and to reduce the overlap of ranges surrounded with the second color signals, so that new interpolation points can be efficiently generated on the first color space.

In addition, according to one aspect of the present invention, a color signal distributed on the first color space is inputted as the first color signal.

Thus, ranges which are surrounded with the second color signals selected with reference to the first color signal can be set without any vacancy over the whole range of the color signals distributed on the first color space, and the omission of any color signal generable within a color reproduction range on the color space can be avoided.

Yet in addition, according to one aspect of the present invention, values of a grid point on the first color space are set as the third color signal.

Thus, even in a case where the third color signal to be interpolated on the first color space is different from the first color signal serving as the reference point of the splitting on the first color space, the color signal of the grid point on the first color space can be obtained.

Meanwhile, according to one aspect of the present invention, a color signal input unit for inputting a first color signal which belongs to a first color space, a color signal selection unit for selecting second color signals which surround the first color signal, a correspondence relationship acquisition unit for acquiring correspondence relationships between the second color signals and third color signals which belong to a second color space, a weight coefficient setting unit for setting weight coefficients relevant to the second color signals selected by the color signal selection unit, an interpolation point generation unit for generating interpolation points in a range surrounded with the second color signals, on the basis of the weight coefficients, a weight coefficient selection unit for selecting the weight coefficients of the interpolation point nearest to a fourth color signal surrounded with the second color signals, from among the weight coefficients set by the weight coefficient setting unit, and an interpolation operation unit for calculating a result of conversion of the fourth color signal into a color signal of the second color space, in such a way that the weight coefficients selected by the weight coefficient selection unit are applied to the third color signal are provided.

Thus, even in a case where the second color signals are irregularly distributed on the first color space, it is permitted to set the weight coefficients for use in the interpolation of the first color space, to obtain the values of the color signal on the second color space by the use of the weight coefficients which were used for finding the interpolation point on the first color space, and to obtain values on the second color space as to a color signal given on the first color space anew.

Herein, in one aspect of the present invention, the second color signals are selected from within first color subspaces split according to the first color signal.

Thus, even in a case where the second color signals are irregularly distributed on the first color space, the selection of the second color signals surrounding the first color signal does not end in failure, so that the second color signals surrounding the first color signal can be selected at high speed, and that the interpolation point can be generated at high speed.

Besides, according to one aspect of the present invention, volumes obtained by dividing a cube at predetermined intervals are set as the weight coefficients in the case of generating the each interpolation point.

Thus, even in the case where the second color signals are irregularly distributed on the first color space, the interpolation points can be generated by an 8-point interpolation, and such an interpolation method less susceptible to noise can be offered.

In addition, according to one aspect of the present invention, the intervals for the division of the cube are altered on the basis of distances between the second color signals or distances between the third color signals.

Thus, it is permitted to control the intervals of the interpolation points on the first color space or on the second color space and to generate the interpolation points uniformly on the first color space or on the second color space even in a case where the range surrounded with the second color signals or the third color signals is in a distorted shape, so that the color signals can be interpolated in a shape which is more adapted to the visual property of man.

Yet in addition, according to one aspect of the present invention, in a case where the plurality of fourth signals are surrounded with the same second color signals, the weight coefficients relevant to the respective fourth color signals are collectively selected.

Thus, the selection of the same second color signals need not be iterated for the plurality of fourth color signals, and the results of the conversions of the fourth color signals lying in the same range can be efficiently calculated.

Still in addition, according to one aspect of the present invention, the first color space is a device-dependent color space which depends upon device, and the second color space is an independent color space which does not depend upon device.

Thus, even in a case where color signals are transmitted or received between device of different color reproducibilities, the color reproducibilities between the device can be brought into agreement.

Further, according to one aspect of the present invention, the first color space is a CMY-space, a CMYK-space or an RGB-space, and the second color space is an L*a*b*-space or an XYZ-space.

Thus, the color signals on the device-dependent color space which depends upon a device can be converted into the color signals on the independent color space which does not depend upon a device.

Meanwhile, according to one aspect of the present invention, a first-interpolation-point generation unit for generating a first interpolation point within a range which is surrounded with first color signals distributed on a color space, a second-interpolation-point generation unit for generating a second interpolation point within a range which is surrounded with second color signals distributed on the color space, an interpolation point selection unit for selecting one of the first interpolation point and the second interpolation point as is nearer to a third color signal on the color space, and an interpolation unit for interpolating the third color signal by use of the first color signals on condition that the first interpolation point has been selected by the interpolation point selection unit, and for interpolating the third color signal by use of the second color signals on condition that the second interpolation point has been selected by the interpolation point selection unit are provided.

Thus, even in a case where a plurality of sets of candidates for color signals to be used for the interpolation of the third color signal have been obtained as the result of the selection of the color signals for interpolating the third color signal, the selection being with reference to the point different from the third color signal, the optimum color signals to be used for the interpolation of the third color signal can be selected from among the plurality of sets of candidates for the color signals.

Meanwhile, according to one aspect of the present invention, a color signal input unit for inputting a first color signal which belongs to a first color space, a color signal selection unit for selecting second color signals which surround the first color signal, a color signal calculation unit for calculating a result of conversion of a third color signal surrounded with the second color signals, into a color signal of a second color space, on the basis of results of conversions of the second color signals into color signals of the second color space, and an extrapolation unit for calculating by extrapolation a result of conversion of a fourth color signal into a color signal of the second color space, the fourth color signal lying outside a range surrounded with the second color signals are provided.

Thus, even in a case where the second color signals are irregularly distributed on the first color space, a new color signal can be generated outside the range surrounded with the second color signals.

Besides, according to one aspect of the present invention, the second color signals are selected from within first color subspaces split according to the first color signal.

Thus, even in the case where the second color signals are irregularly distributed on the first color space, the selection of the second color signals surrounding the first color signal does not end in failure. Therefore, the second color signals surrounding the first color signal can be selected at high speed, and an interpolation point can be generated at high speed. Moreover, an extrapolation point can be generated at high speed, and the new color signal can be efficiently generated outside the range surrounded with the color signals distributed on the first color space.

Meanwhile, according to one aspect of the present invention, a surrounding-point selection method which selects three points surrounding a first point on a two-dimensional space comprises the steps of selecting a second point near the first point, rotating a coordinate axis around the first point so that the second point may come onto the coordinate axis, and selecting one point from within each of areas which oppose to each other through the coordinate axis.

Thus, the three points surrounding the first point on the two-dimensional space can be reliably selected, and the first point on the two-dimensional space can be surrounded with the smallest number of points.

Meanwhile, according to one aspect of the present invention, a surrounding-point selection method which selects four points surrounding a first point on a three-dimensional space, comprises the steps of selecting a second point near the first point, rotating a first coordinate axis around the first point so that the second point may come into an area which is minus value on the first coordinate axis, selecting a third point from within an area which is plus value on the rotated first coordinate axis, rotating a second coordinate axis so that the third point may come into an area which lies on a plane containing the first coordinate axis and the second coordinate axis, and which is minus value regarding the second coordinate axis, selecting a fourth point from within an area which is minus value regarding the first coordinate axis and the second coordinate axis, and which has a value of zero or above regarding a third coordinate axis, and selecting a fifth point from within an area which is minus value regarding the first coordinate axis and the second coordinate axis, and which is minus value with respect to the third coordinate axis.

Thus, the four points surrounding the first point on the three-dimensional space can be reliably selected, and the first point on the three-dimensional space can be surrounded with the smallest number of points.

Meanwhile, according to one aspect of the present invention, a method of creating a color conversion table comprises the steps of finding first correspondence relationships between first color signals distributed irregularly on a first color space and second color signals distributed on a second color space, setting reference points on the first color space, splitting the first color space at each of the reference points, selecting the first color signals from within split color subspaces, executing interpolations on the basis of the selected first color signals, thereby to find second correspondence relationships between third color signals distributed at grid points on the first color space and fourth color signals distributed on the second color space, within a range which is surrounded with the first color signals, extrapolating the second correspondence relationships, thereby to find third correspondence relationships between fifth color signals distributed at the grid points on the first color space and sixth color signals distributed on the second color space, outside the range which is surrounded with the first color signals, and registering the second correspondence relationships and the third correspondence relationships in the color conversion table.

Thus, even in the case where the first color signals are irregularly distributed on the first color space, the selection of the first color signals for use in interpolative calculations does not end in failure, and interpolation points can be generated in the range surrounded with the first color signals. Moreover, extrapolation points can be generated outside the range surrounded with the first color signals, and the color signals of the second color space corresponding to the grid points of the first color space can be obtained. It is accordingly permitted to efficiently convert an irregularity table into a regularity table.

Besides, according to one aspect of the present invention, the reference points correspond to the first color signals.

Thus, the second color signals can be selected with reference to the first color signals distributed irregularly on the first color space, and the ranges of the first color space surrounded with the second color signals can be set without any vacancy over the whole range of the color signals distributed on the first color space, so that the color conversion table in which any color signal to be registered is not omitted can be generated.

In addition, according to one aspect of the present invention, the reference points correspond to the third color signals.

Thus, the second color signals can be selected with reference to the grid points of the first color space, and interpolation points can be generated regularly on the first color space, so that the color conversion table in which color signals are registered without a deviation or an offset can be generated.

Yet in addition, according to one aspect of the present invention, the reference points correspond to some of the third color signals.

Thus, even in a case where different grid points are surrounded with the same first color signals because the density of the grid points to be registered in the color conversion table is higher than that of the first color signals, the overlaps of the ranges surrounded with the first color signals can be diminished by reducing the number of the reference points for the selection of the first color signals, so that the same process for an identical range can be prevented from recurring many times, and that an irregularity table can be efficiently converted into a regularity table.

Still in addition, according to one aspect of the present invention, the above step of finding the second correspondence relationships comprises the steps of setting volumes obtained by dividing a cube at predetermined intervals, as weight coefficients relevant to the selected first color signals, generating interpolation points in a range surrounded with the first color signals, on the basis of the weight coefficients, selecting the weight coefficients of the interpolation point nearest to the third color signal surrounded with the first color signals, from among the set weight coefficients, and calculating the fourth color signal by applying the selected weight coefficients to the second color signals.

Thus, even in the case where the first color signals are irregularly distributed on the first color space, an 8-point interpolation can be executed on the first color space, and the values of the color signal on the second color space can be obtained by the use of the weight coefficients which were used for finding the interpolation point on the first color space, so that an irregularity table can be accurately converted into a regularity table.

Further, according to one aspect of the present invention, the above step of finding the third correspondence relationships comprises the steps of selecting on the first color space a first grid point which adjoins outside a boundary of the range surrounded with the first color signals, selecting on the first color space a second grid point which adjoins inside the first grid point, selecting on the first color space a third grid point which lies directly inside the second grid point, finding a first point on the second color space as corresponds to the second grid point, on the basis of the second correspondence relationships, finding a second point on the second color space as corresponds to the third grid point, on the basis of the second correspondence relationships, finding on the second color space a color signal of a third point which is in point symmetry with the second point about the first point, and registering the color signal of the third point in the color conversion table in correspondence with the first grid point.

Thus, a point to be created by an extrapolation can be generated on a straight line which joins two points for use in the extrapolation, and the sixth color signal to be generated by the extrapolation can be simply calculated using the fourth color signal near the sixth color signal, so that the color signal outside the range surrounded with the first color signals can be calculated quickly and accurately.

BRIEF DESCRIPTION OF THE INVENTION

FIG. 3 is a diagram showing on a two-dimensional color space a color signal selection method according to the first embodiment of the present invention;

FIG. 6 is a diagram showing on a two-dimensional color space a color signal selection method according to the second embodiment of the present invention;

FIG. 8 is a diagram showing on a three-dimensional color space the color signal selection method according to the second embodiment of the present invention;

FIG. 9 is a diagram showing the method of selecting color signals on a three-dimensional color space in accordance with the second embodiment of the present invention;

FIG. 10 is a diagram showing on a two-dimensional color space a color signal selection method according to the third embodiment of the present invention;

FIG. 15 is a diagram showing on a color space a color signal interpolation method according to one embodiment of the present invention;

FIG. 25 is a diagram showing selected points according to one embodiment of the present invention, on a three-dimensional color space;

FIG. 29 is a diagram showing adjacent points on a three-dimensional space according to one embodiment of the present invention;

DESCRIPTION OF THE PREFERRED EMBODIMENTS

Now, embodiments of the present invention will be described by reference to the drawings.

Figure 1:
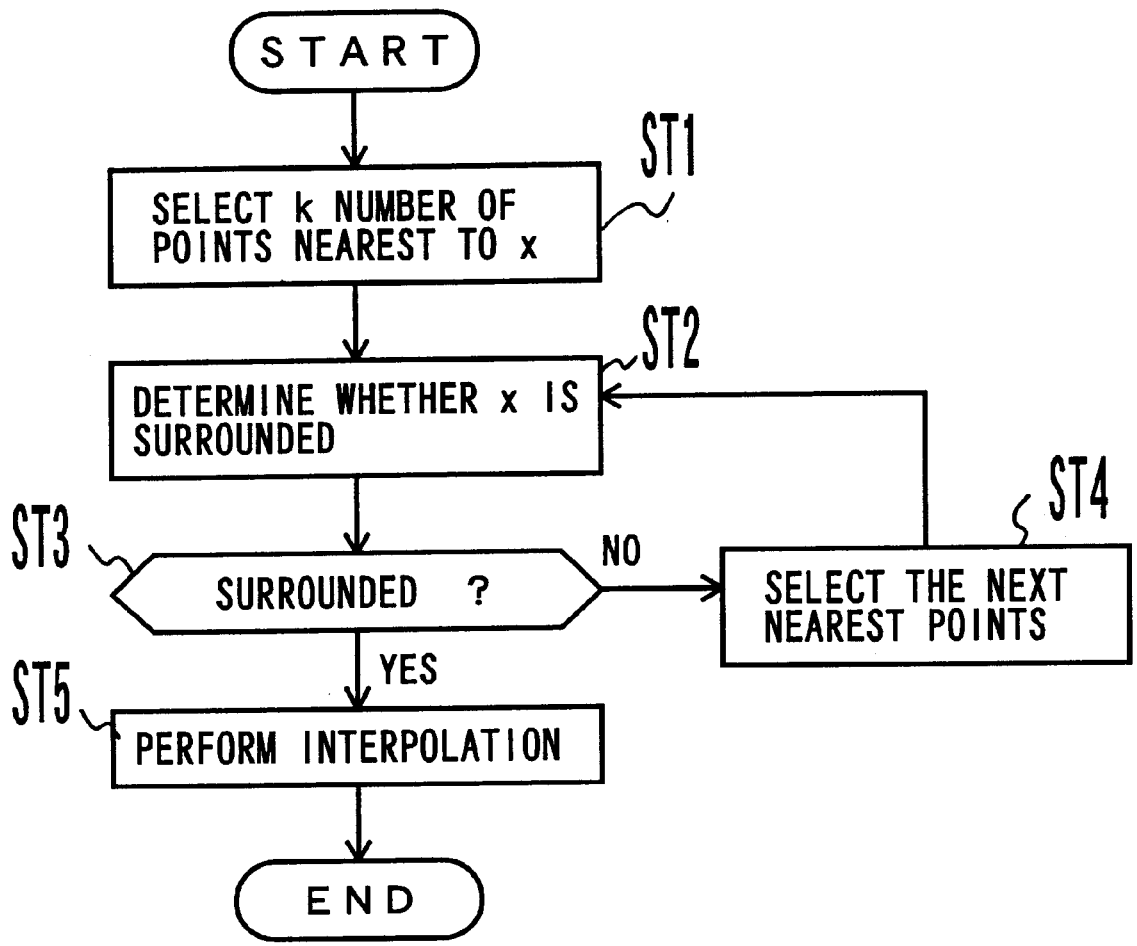
FIG. 1 is a flowchart showing a surrounding point selection method in the prior art.
Figure 2:
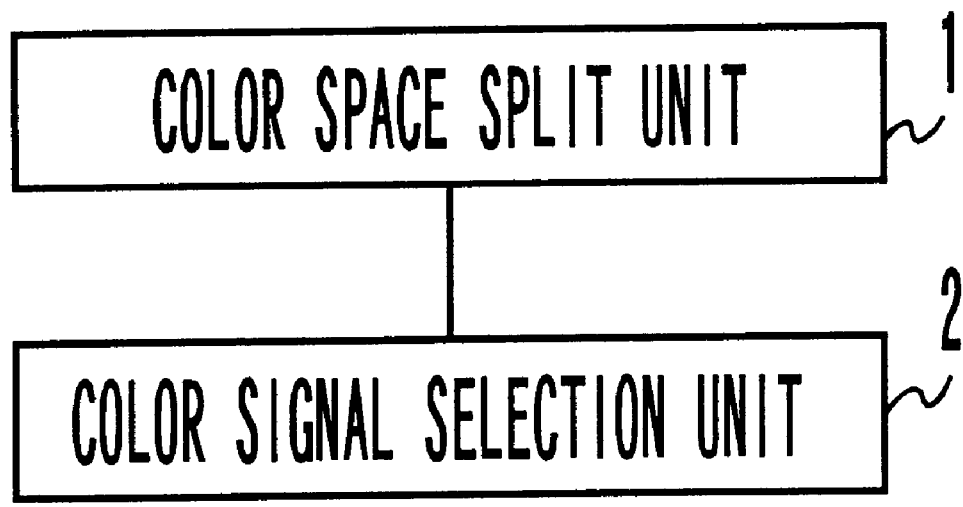
FIG. 2 is a block diagram showing the construction of a color signal selection apparatus according to one embodiment of the present invention.

FIG. 2 is a block diagram showing the construction of a color signal selection apparatus according to one embodiment of the present invention.

Referring to FIG. 2, a color space split unit 1 splits a color space to which an inputted first color signal belongs, according to the first color signal. A color signal selection unit 2 selects second color signals distributed in color subspaces split by the color space split unit 1, from within the color subspaces.

Thus, it is permitted to reliably surround the first color signal with the second color signals. Even in a case where the second color signals are irregularly distributed on the color space, the selection of color signals not surrounding the first color signal is prevented, and hence, the selection of color signals need not be redone.

In this manner, the color space is split into areas, and the color signals are selected from within some of the areas, whereby the iteration of the selection of data can be prevented to incarnate the high-speed selection of the color signals.

FIG. 3 is a diagram showing on a two-dimensional color space a color signal selection method according to the first embodiment of the present invention. With the color signal selection method according to the first embodiment, each of the second color signals is selected on the basis of the relationship in magnitude between the values of the components of the first color signal and those of the components of the second color signal.

Referring to FIG. 3, it is assumed that color signals registered in a color conversion table be distributed at points P1 to P20 on the color space. It is also assumed that a color signal at a point P on the color space have been inputted as a subject for interpolation. Here, since the color signal at the point P is not registered in the color conversion table, the four points P7, P9, P14 and P17 surrounding the point P are selected from among the points P1 to P20 distributed on the color space. Subsequently, the color signal of the point P is interpolated by executing weight calculations which use the color signals of the four selected points P7, P9, P14 and P17. In selecting the four points P7, P9, P14 and P17 which surround the point P, the color space in which the points P1 to P20 are distributed is split by straight lines L1 and L2 which pass through the point P and which are orthogonal to each other. Owing to the splitting, four areas #1 to #4 are generated on the color space. Subsequently, the point P7 nearest to the point P is selected from within the area 1, the similar point P9 is selected from within the area 2, the similar point P14 is selected from within the area 3, and the similar point P17 is selected from within the area 4. As a result, the point P is reliably surrounded with the four points P7, P9, P14 and P17, and the four points P7, P9, P14 and P17 surrounding the point P can be picked out from among the points P1 to P20 irregularly distributed on the color space, merely by selecting one color signal from within each of the four areas #1 to #4 obtained by the splitting.

In this manner, the color space is split by the straight lines L1 and L2 passing through the point P and being orthogonal to each other, whereby the mere comparisons between the values of the components of the color signal of the point P and those of the components of each of the color signals of the points P1 to P20 realize the reliable selection of the color signals of the four points P7, P9, P14 and P17 surrounding the color signal of the point P and also realize the high speed selection of the color signals for the interpolation with the simple calculations.

Moreover, the four points P7, P9, P14 and P17 of the shortest distances from the point P are selected from within the respective split areas #1 to #4, whereby the use of the color signals of any points far from the point P can be prevented in executing the interpolative calculations, to realize the interpolative calculations at a high precision.

Incidentally, although the color space is split into the four areas in the example of FIG. 3 because of the two-dimensional illustration, it is split into eight areas in case of three dimensions.

Figure 4:
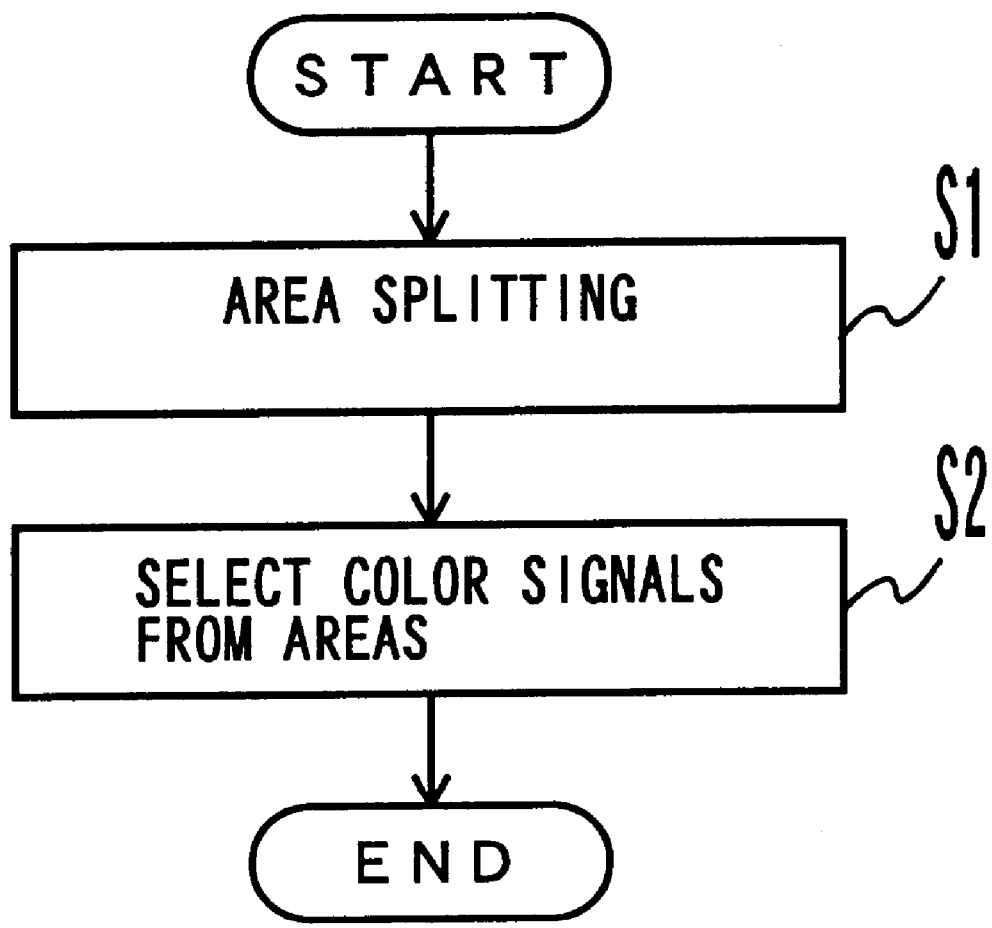
FIG. 4 is a flowchart showing the color signal selection method according to the first embodiment of the present invention.

FIG. 4 is a flowchart showing the color signal selection method according to the first embodiment of the present invention.

Referring to FIG. 4, a color space in which color signals are distributed is split into a plurality of areas (step S1), and color signals are selected from within the split areas (step S2). Thus, the color signals surrounding a color signal which is a subject for interpolation can be readily found from among the color signals irregularly distributed.

Figure 5:
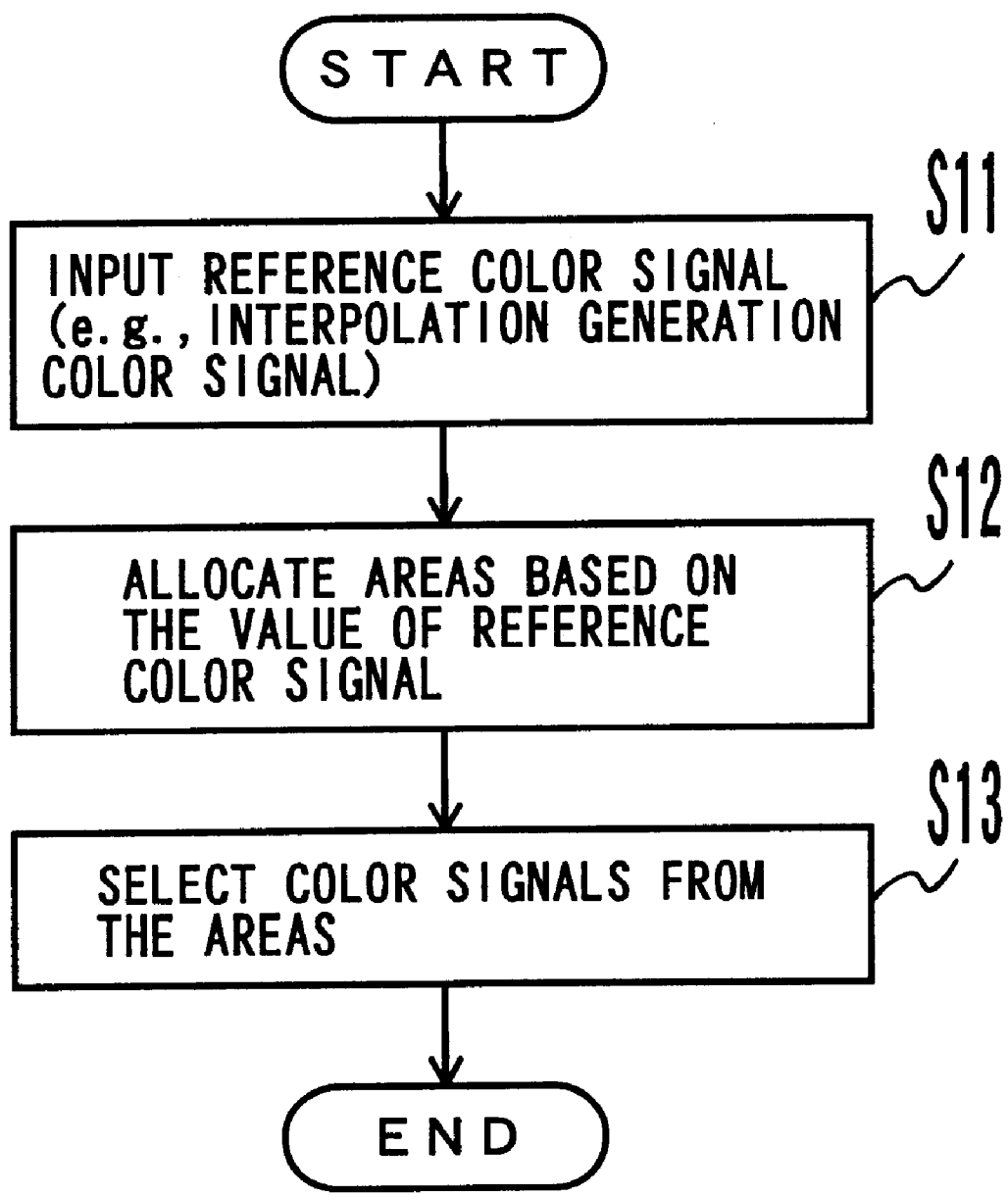
FIG. 5 is a flowchart showing an area splitting method according to the first embodiment of the present invention.

FIG. 5 is a flowchart showing an area splitting method according to the first embodiment of the present invention.

Referring to FIG. 5, a reference color signal in the case of splitting a color space is inputted (step S11). Here, the reference color signal may be either a color signal being a subject for interpolation or a color signal lying at a grid point.

Subsequently, a plurality of areas are set for or allocated to the color space according to the inputted color signal (step S12), and color signals are selected from within the set areas (step S13).

FIG. 6 is a diagram showing on a two-dimensional color space a color signal selection method according to the second embodiment of the present invention. With the color signal selection method according to the second embodiment, a color space is subjected to a rotational transformation and is thereafter split into areas, whereby color signals surrounding a reference point can be reliably selected with the smallest possible number of data.

Referring to FIG. 6, it is assumed that color signals registered in a color conversion table be distributed at points P1 to P20 on the color space. It is also assumed that a color signal at the point P on the color space have been inputted as a subject for interpolation. Here, since the color signal at the point P is not registered in the color conversion table, three points P4, P11 and P14 surrounding the point P are selected from among the points P1 to P20 distributed on the color space. Subsequently, the color signal of the point P is interpolated by executing weight calculations which use the color signals of the three selected points P4, P11 and P14.

In selecting the three points P4, P11 and P14 which surround the point P, the point P4 nearest to the point P is selected from among the points P1 to P20 distributed on the color space. Besides, the color space is split by a straight line L1 passing through the points P and P4, and it is also split by a straight line L2 orthogonal to the straight line L1. Owing to the splitting, four areas #1 to #4 are generated on the color space. In addition, the point P11 nearest to the point P is selected from within the area 3, and the similar point P14 is selected from within the area 4. As a result, the point P is reliably surrounded with the three points P4, P11 and P14, and the three points P4, P11 and P14 of the smallest number surrounding the point P can be picked out from among the points P1 to P20 irregularly distributed on the color space.

In this manner, the point nearest to the reference point is first selected, the color space is rotated so as to bring the selected point onto a coordinate axis, and one point is thereafter selected from within each of the two opposing areas, whereby the three points surrounding the reference point can be reliably selected.

Figure 7:
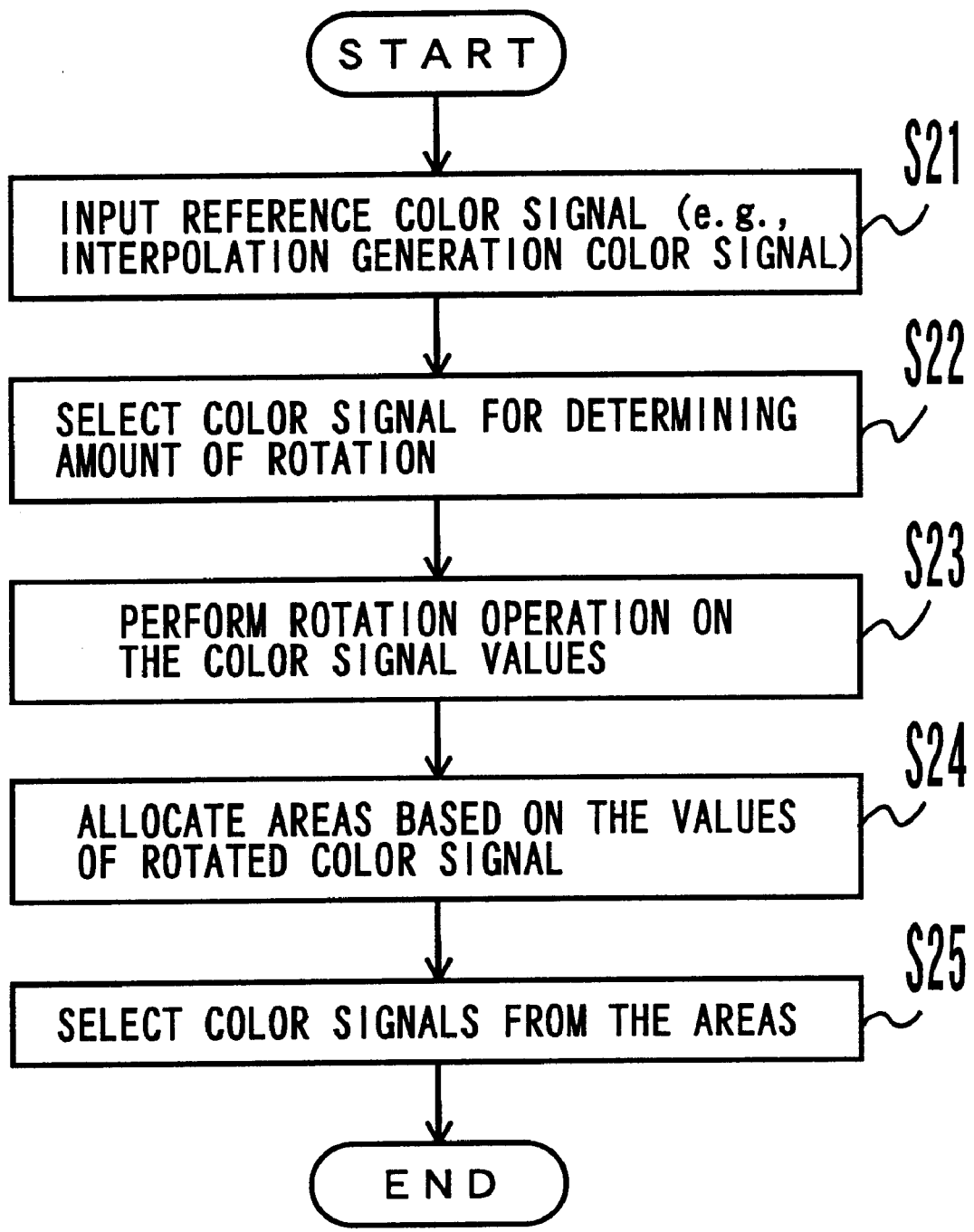
FIG. 7 is a flowchart showing the color signal selection method according to the second embodiment of the present invention.

FIG. 7 is a flowchart showing the color signal selection method according to the second embodiment of the present invention.

Referring to FIG. 7, a reference color signal in the case of splitting a color space is inputted (step S21). Here, the reference color signal may be either a color signal being a subject for interpolation or a color signal lying at a grid point.

Subsequently, a color signal for determining the amount of rotation is selected from among color signals distributed on the color space (step S22). Here, the color signal for determining the amount of rotation can be set at a point nearest to the reference color signal.

At the next step, the color signals distributed on the color space are subjected to a rotational operation so that the color signal for determining the amount of rotation may come onto a coordinate axis (step S23).

Next, a plurality of areas are set for or allocated to the color space according to the values of the rotated color signals (step S24), and color signals are selected from within the set areas (step S25).

FIG. 8 is a diagram showing on a three-dimensional color space the color signal selection method according to the second embodiment of the present invention.

Referring to FIG. 8, it is assumed to select four points P1 to P4 surrounding a point P on the three-dimensional space. In this case, the point P1 nearest to the point P is set at a minus position on an R-axis, and the remaining three points P2 to P4 are selected from within areas in which R-axial values are plus. Here, a point nearest to the point P in the areas having the plus R-axial values is assumed the point P2, and this point P2 is set so as to lie in an area in which values on a G-axis on an RG-plane are minus. Subsequently, the points P3 and P4 are selected from within areas in which the G-axial values are plus. Here, the point P3 is selected so as to lie in the area in which values regarding a B-axis are zero or plus, whereas the point P4 is selected so as to lie in the area in which the B-axial values are minus.

That is, the R-axial values become the opposite signs between the point P1 and the points P2 to P4. Further, the G-axial values become the opposite signs between the point P2 and the points P3 to P4, and the G-axial value of the point P1 becomes zero. Still further, the B-axial values become the opposite signs between the point P3 and the point P4, and the B-axial values of the points P1 and P2 become zero.

FIG. 9 is a diagram showing the method of selecting color signals on a three-dimensional color space in accordance with the second embodiment of the present invention. Here in the illustrated example, an RGB-coordinate system (having R-, G- and B-axes) whose origin is a reference point P is mentioned, and coordinate axes after a rotation are expressed by symbols R', G' and B'.

Referring to FIG. 9, a point P1 nearest to the reference point P as registered in a color conversion table is first selected.

Subsequently, the R-axis is rotated so that the point P1 may have a minus value on the R-axis. By the way, the rotation is unnecessary in a case where the point P1 is the origin.

Next, a point P2 registered in the color conversion table is selected as one nearest to the origin P in a range in which an R-axial value after the rotation is plus.

Next, the G-axis is rotated so that the point P2 may come into an area of minus G-axial values on an RG-plane. By the way, the rotation is unnecessary in a case where the point P2 lies on the R-axis.

Next, points P3 and P4 nearest to the reference point P are respectively selected from within an area in which R- and G-axial values are plus and in which B-axial values are zero or above, and an area in which the R- and G-axial values are plus and in which the B-axial values are minus.

FIG. 10 is a diagram showing on a two-dimensional color space a color signal selection method according to the third embodiment of the present invention. With the color signal selection method according to the third embodiment, color signals registered in a color conversion table are successively selected as reference points, whereby ranges which are surrounded with color signals selected centering around the reference points can be set without any vacancy over the whole range in which the registered color signals are distributed.

Referring to FIG. 10, it is assumed that the color signals registered in the color conversion table be distributed at points P1 to P20 on the color space. It is also assumed to set the reference points in the cases of selecting the points P1 to P20 distributed on the color space. On this occasion, the points P1 to P20 distributed on the color space are noticed and are successively set as the reference points.

By way of example, the point P4 distributed on the color space is set as the reference point, and the color space is split according to the point P4, whereby the four points P1, P2, P5 and P6 surrounding the point P4 are selected.

Subsequently, the selected point P6 is set as the reference point, and the color space is split according to the point P6, whereby the four points P2, P4, P7 and P11 surrounding the point P6 are selected.

Next, the selected point P7 is set as the reference point, and the color space is split according to the point P7, whereby the four points P2, P3, P6 and P9 surrounding the point P7 are selected.

Such processes for setting the reference points are executed for all the points P1 to P20 distributed on the color space, whereby the ranges which are surrounded with the points selected from among the points P1 to P20 can be set or distributed without any vacancy over the whole range in which the registered points are distributed. Therefore, in interpolating color signals of irregular distribution to create color signals of regular distribution (for example, lying on grid points), any omission can be prevented from occurring in the ranges of the color signals generated on a color space, and a regularity table realizing accurate color conversions can be generated.

Figure 11:
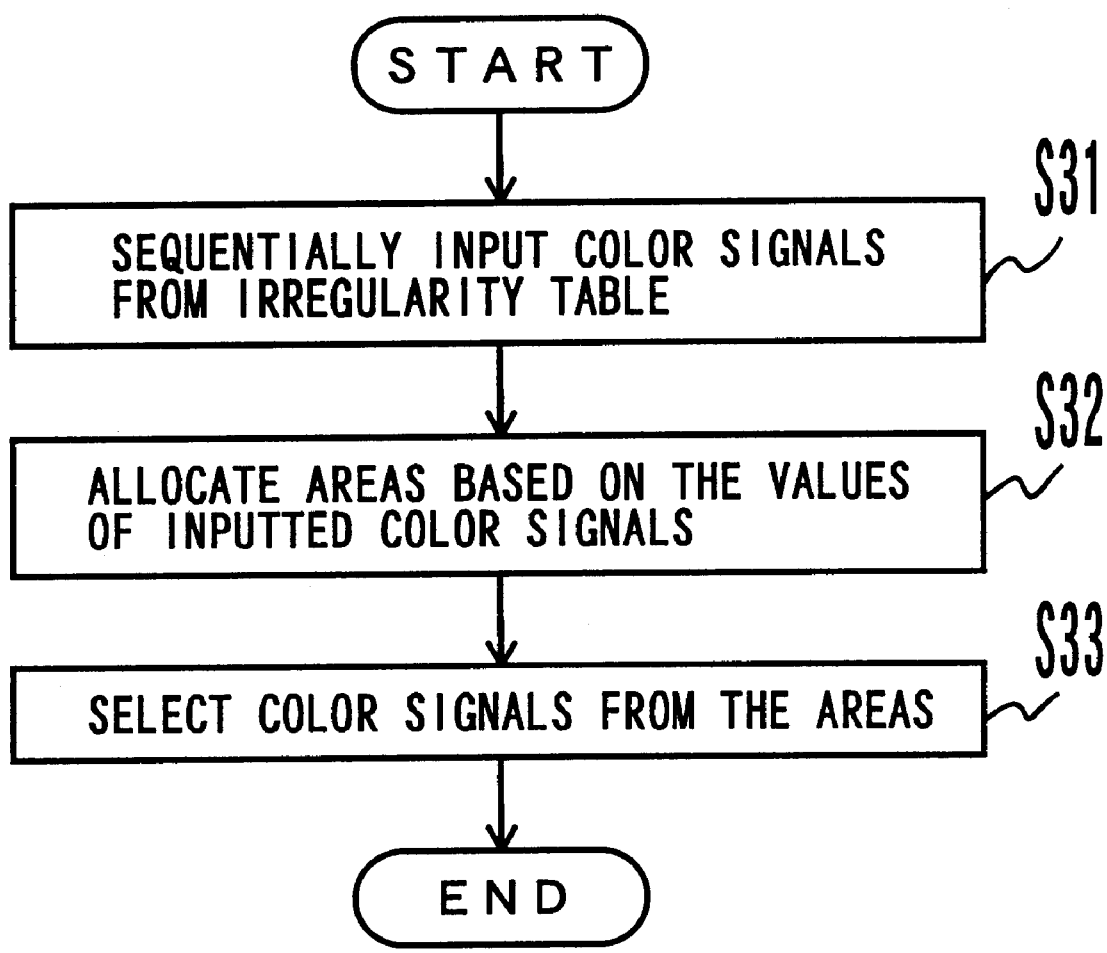
FIG. 11 is a flowchart showing the color signal selection method according to the third embodiment of the present invention.

FIG. 11 is a flowchart showing the color signal selection method according to the third embodiment of the present invention.

Referring to FIG. 11, color signals registered in an irregularity table are successively inputted (step S31). Here, the sequence of inputting the color signals can be set at will. By way of example, the color signals can be inputted in the sequence in which they are stored in the irregularity table.

Subsequently, a plurality of areas are set for or allocated to a color space according to the values of each of the inputted color signals (step S32), and color signals are selected from within the set areas (step S33).

Figure 12:
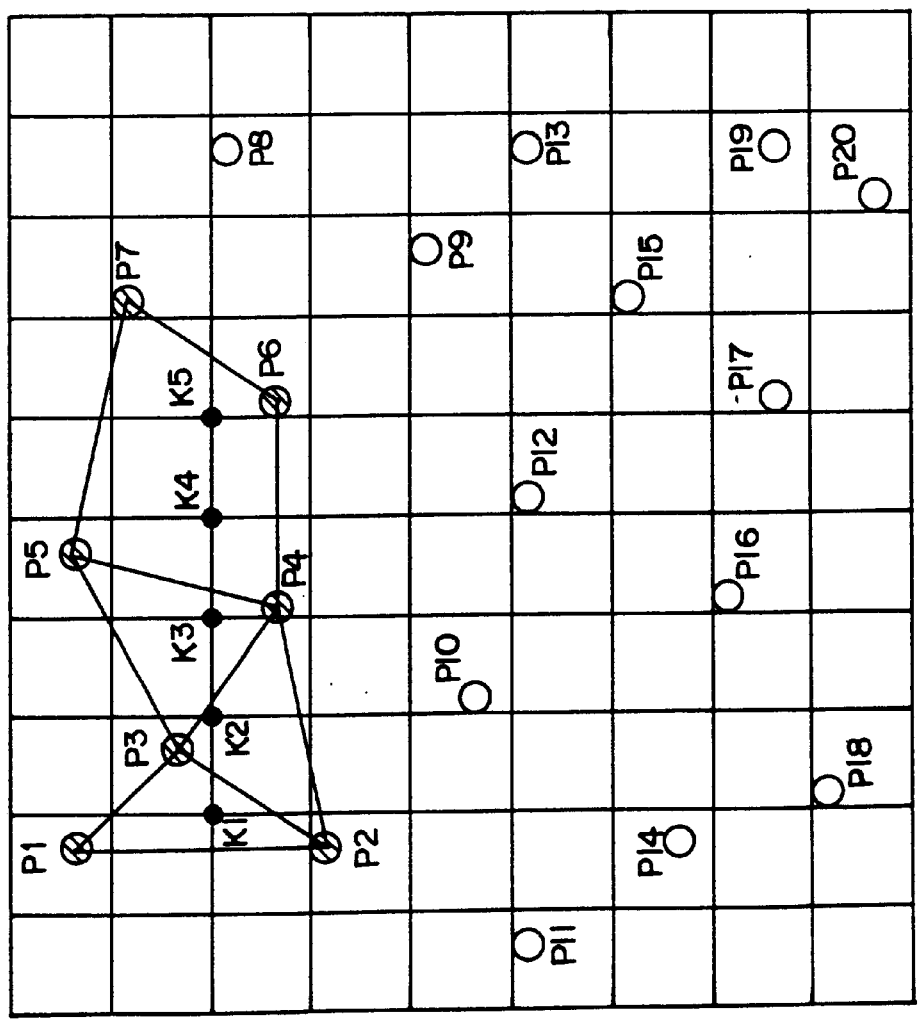
FIG. 12 is a diagram showing on a two-dimensional color space a color signal selection method according to the fourth embodiment of the present invention.

FIG. 12 is a diagram showing on a two-dimensional color space a color signal selection method according to the fourth embodiment of the present invention. With the color signal selection method according to the fourth embodiment, color signals are selected with reference points set at color signals to be registered in a color conversion table which is to be generated anew.

Referring to FIG. 12, it is assumed that color signals already registered in a color conversion table be distributed at points P1 to P20 on a color space. Here, it is assumed that the values of the color signals corresponding to grid points on the color space be obtained by interpolations. In this case, the color space is split with each reference point set at the color signal corresponding to the grid point on the color space, and the color signals for use in the interpolation are selected.

By way of example, when the values of the grid point K1 have been inputted as the reference point, the color space is split with the grid point K1 as the reference point, and the points P1, P2, P3 and P4 are respectively selected from within the split color subspaces. As a result, the grid point K1 is surrounded with the points P1, P2, P3 and P4, and the values of the grid point K1 can be obtained by executing the interpolation which uses the values of the points P1, P2, P3 and P4.

Besides, when the values of the grid point K2 have been inputted as the reference point, the color space is split with the grid point K2 as the reference point, and the points P2, P3, P4 and P5 are respectively selected from within the split color subspaces. As a result, the grid point K2 is surrounded with the points P2, P3, P4 and P5, and the values of the grid point K2 can be obtained by executing the interpolation which uses the values of the points P2, P3, P4 and P5.

In addition, when the values of the grid point K3 have been inputted as the reference point, the color space is split with the grid point K3 as the reference point, and the points P2, P3, P4 and P5 are respectively selected from within the split color subspaces. As a result, the grid point K3 is surrounded with the points P2, P3, P4 and P5, and the values of the grid point K3 can be obtained by executing the interpolation which uses the values of the points P2, P3, P4 and P5.

Yet in addition, when the values of the grid point K4 have been inputted as the reference point, the color space is split with the grid point K4 as the reference point, and the points P4, P5, P6 and P7 are respectively selected from within the split color subspaces. As a result, the grid point K4 is surrounded with the points P4, P5, P6 and P7, and the values of the grid point K4 can be obtained by executing the interpolation which uses the values of the points P4, P5, P6 and P7.

Further, when the values of the grid point K5 have been inputted as the reference point, the color space is split with the grid point K5 as the reference point, and the points P4, P5, P6 and P7 are respectively selected from within the split color subspaces. As a result, the grid point K5 is surrounded with the points P4, P5, P6 and P7, and the values of the grid point K5 can be obtained by executing the interpolation which uses the values of the points P4, P5, P6 and P7.

In this manner, the reference color signal is set at each grid point, whereby the color signals surrounding the grid point can be reliably selected, and the irregularity table can be efficiently transformed into the regularity table.

Figure 13:
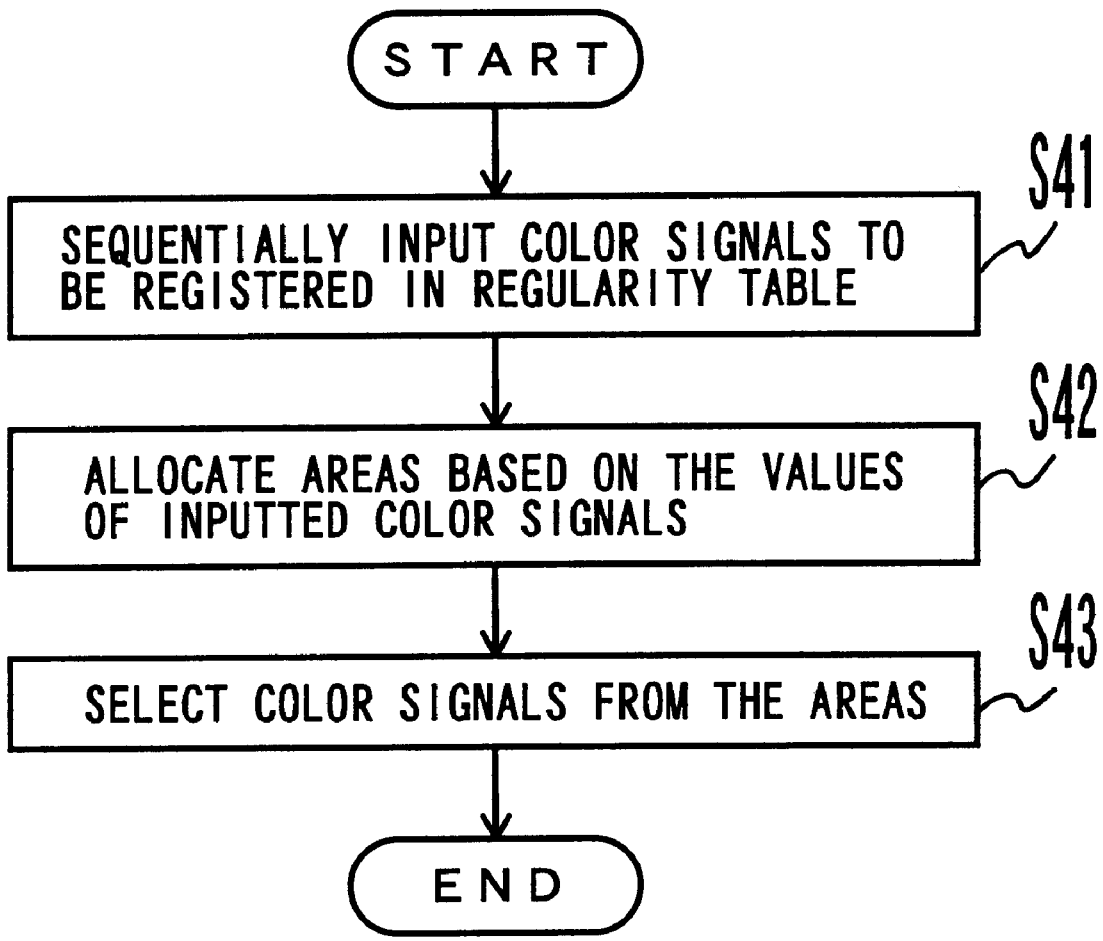
FIG. 13 is a flowchart showing the color signal selection method according to the fourth embodiment of the present invention.

FIG. 13 is a flowchart showing the color signal selection method according to the fourth embodiment of the present invention.

Referring to FIG. 13, color signals to be registered in a regularity table are successively inputted (step S41). Here, the sequence of inputting the color signals can be set at will. By way of example, the color signals can be inputted in the sequence of grid Nos. in an irregularity table.

Subsequently, a plurality of areas are set for or allocated to a color space according to the values of each of the inputted color signals (step S42), and color signals are selected from within the set areas (step S43).

Figure 14:
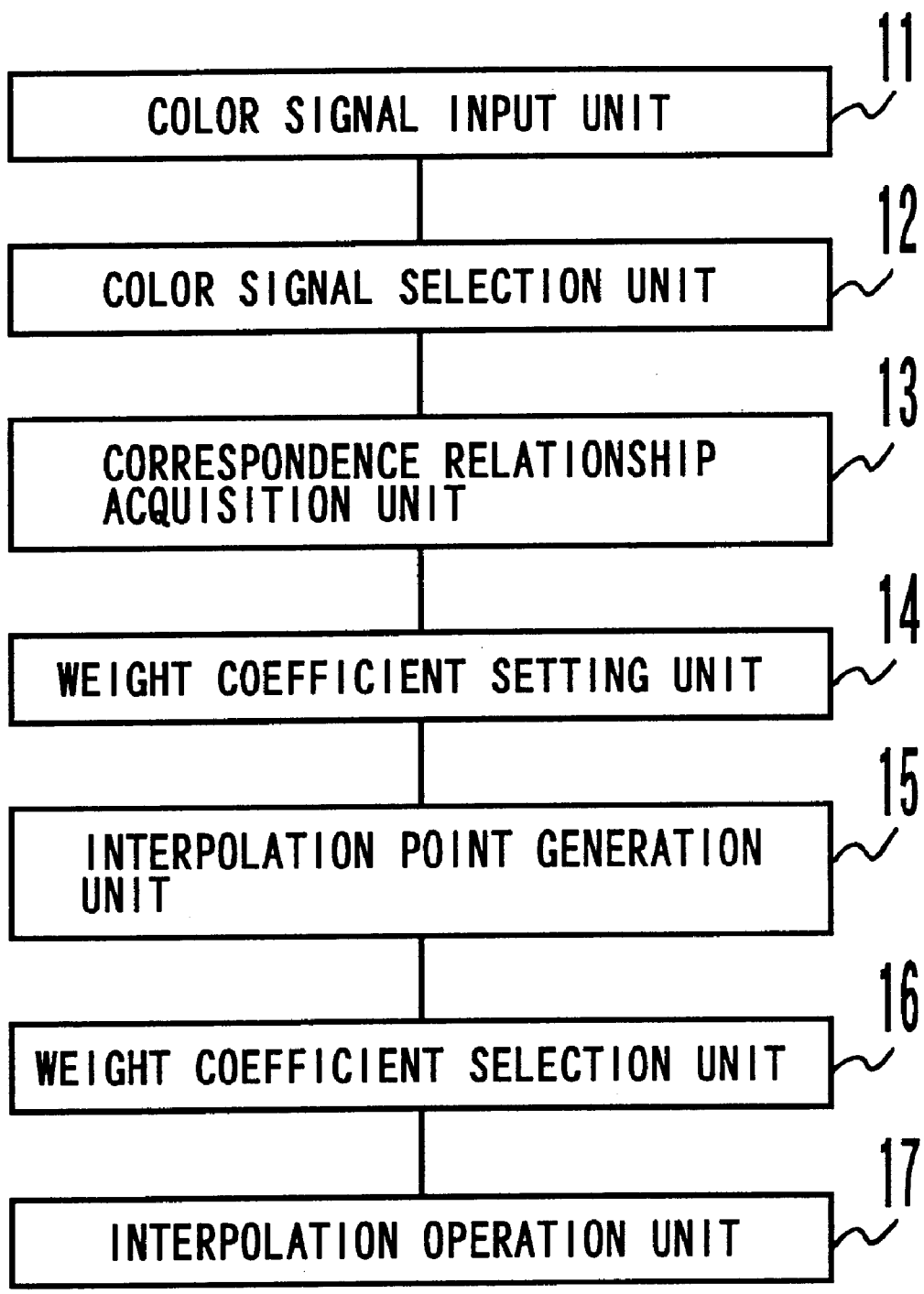
FIG. 14 is a block diagram showing the construction of a color signal interpolation apparatus according to one embodiment of the present invention.

FIG. 14 is a block diagram showing the construction of a color signal interpolation apparatus according to one embodiment of the present invention.

Referring to FIG. 14, a color signal input unit 11 inputs a first color signal which belongs to a first color space.

A color signal selection unit 12 selects second color signals which surround the first color signal inputted by the color signal input unit 11. Here, the color signal selection unit 12 can select the second color signals surrounding the first color signal, by splitting the first color space according to the first color signal and then selecting the color signals from within split first color subspaces.

A correspondence relationship acquisition unit 13 acquires the correspondence relationships between the second color signals selected by the color signal selection unit 12 and third color signals belonging to a second color space. Here, the correspondence relationship acquisition unit 13 can acquire the correspondence relationships between the second color signals and the third color signals by reading out data stored in a color conversion table.

A weight coefficient setting unit 14 sets weight coefficients for the second color signals selected by the color signal selection unit 12. Here, in a case where an interpolation point generation unit 15 generates an interpolation point by an 8-point interpolation, the weight coefficients are set for the eight color signals selected by the color signal selection unit 12, respectively. Usable as the weight coefficients of the eight color signals are volumes which are obtained when a cube is divided into eight at a specified position.

On the other hand, in a case where the interpolation point generation unit 15 generates an interpolation point by a tetrahedron interpolation, the weight coefficients are set for the four color signals selected by the color signal selection unit 12, respectively.

The interpolation point generation unit 15 generates the interpolation point within a range surrounded with the second color signals, on the basis of the weight coefficients set by the weight coefficient setting unit 14. In particular, the interpolation point generation unit 15 generates a plurality of interpolation points in the range surrounded with the second color signals, in such a way that the weight coefficients set by the weight coefficient setting unit 14 are changed little by little.

A weight coefficient selection unit 16 detects the interpolation point nearest to a fourth color signal, from among the plurality of interpolation points generated by the interpolation point generation unit 15. Further, it selects the weight coefficients of the detected interpolation point from among the weight coefficients set by the weight coefficient setting unit 14. Therefore, even in a case where the second color signals are irregularly distributed on the first color space, the number and weight coefficients of the second color signals for use in the interpolation can be freely set.

An interpolation operation unit 17 calculates the result of the conversion of the fourth color signal into the color signal of the second color space in such a way that the weight coefficients selected by the weight coefficient selection unit 16 are applied to the third color signals. Therefore, using the weight coefficients which were used for finding the interpolation point on the first color space, the values of the color signal on the second color space can be obtained, and the correspondence relationship between the color signal afforded on the first color space anew and the color signal of the second color space can be obtained.

In this manner, the interpolation point nearest to the point to be converted is selected from among the interpolation points generated by the use of the set weight coefficients, and the color conversion is executed by the use of the weight coefficients used in the case of obtaining the selected interpolation point. Thus, even in the case where the color signals are irregularly distributed on the color space, the number of points for use in an n-dimensional interpolation such as the tetrahedron interpolation need not be limited to (n+1), and the interpolation point can be generated by employing an interpolation method less susceptible to noise, such as the 8-point interpolation.

In other words, it is permitted to execute the interpolation and to accurately execute the interpolation operation (or interpolative calculations) by employing, not only the ordinary interpolation method such as a distance interpolation, a vector interpolation or the tetrahedron interpolation, which can be employed in the case where the color signals are irregularly distributed on the color space, but also the interpolation method such as the 8-point interpolation, in which a sampled signal or a sampled point needs to exist as grid points in the two spaces pertinent to the interpolation.

FIG. 15 is a diagram for explaining in two dimensions an embodiment in which L*a*b*-values (values L*, a* and b*) corresponding to inputted RGB-values (values R, G and B) are obtained by interpolation from the correspondence relationships between RGB-values irregularly distributed on an RGB-space and L*a*b*-values irregularly distributed on an L*a*b*-space.

Referring to FIG. 15, it is assumed that the correspondence relationships between the RGB-values obtained by reading a color chart with a scanner and the L*a*b*-values obtained by measuring the color chart with a calorimeter have been discretely generated. It is also assumed that the RGB-values obtained by reading the color chart with the scanner be irregularly distributed on the RGB-space, while the L*a*b*-values obtained by measuring the color chart with the calorimeter be irregularly distributed on the L*a*b*-space. By way of example, it is assumed that a point P1 on the RGB-space corresponds to a point Q1 on the L*a*b*-space, that a point P2 on the RGB-space corresponds to a point Q2 on the L*a*b*-space, that a point P3 on the RGB-space corresponds to a point Q3 on the L*a*b*-space, and that a point P4 on the RGB-space corresponds to a point Q4 on the L*a*b*-space.

Here, let's consider a case of finding a point Q on the L*a*b*-space as corresponds to a point P on the RGB-space.

First, the points P1 to P4 surrounding the point P on the RGB-space are selected. By the way, in the case of selecting the points P1 to P4, the RGB-space can be split into four areas according to the point P so as to select points nearest to the point P from within the resulting four areas, respectively.

Subsequently, a plurality of RGB-values based on interpolations are generated within a range surrounded with the points P1 to P4. It is assumed here that the RGB-values of points R1 to R12 have been generated by the interpolations.

Next, a point nearest to the point P is selected from among the points R1 to R12 on the RGB-space as generated by the interpolations. It is assumed that the point R9 on the RGB-space have thus been selected.

At the next step, the point Q on the L*a*b*-space is found in such a way that those weight coefficients relevant to the points P1 to P4 which were used for obtaining the point R9 are respectively applied to the points Q1 to Q4 on the L*a*b*-space. Besides, the L*a*b*-values of the point Q on the L*a*b*-space are outputted as corresponding to the RGB-values of the point P on the RGB-space.

In this manner, the correspondence relationships of the color signals on the RGB-space where these color signals are irregularly distributed are increased by the interpolations, and the interpolation point nearest to the RGB-values to be converted is found from among the interpolation points. Besides, the weight coefficients which were used for the interpolations on the RGB-space are applied to the L*a*b*-values on the L*a*b*-space. Thus, the correspondence relationship between the inputted RGB-values and the L*a*b*-values can be approximately obtained from the correspondence relationships between the RGB-values and the L*a*b*-values which are irregularly distributed.

Figure 16:
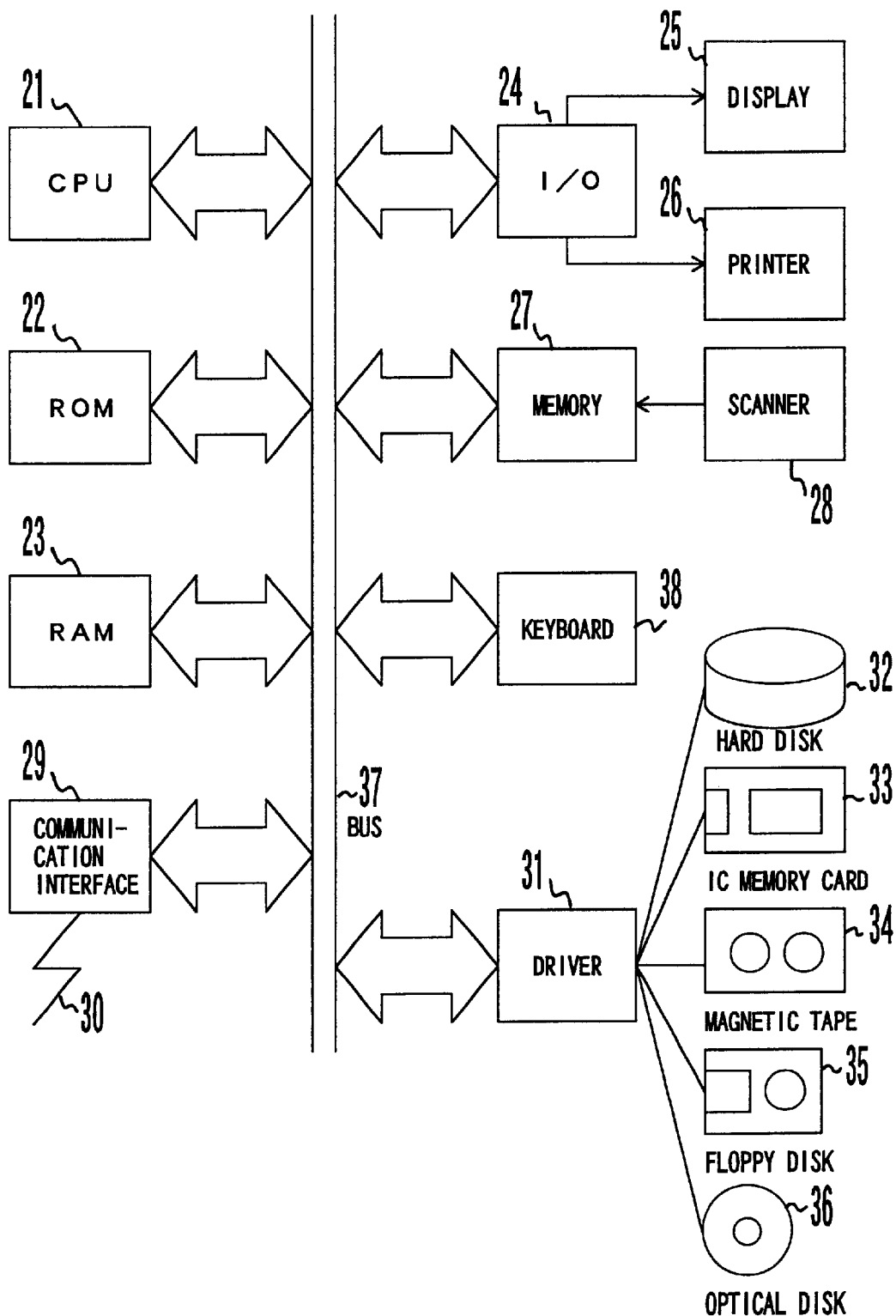
FIG. 16 is a block diagram showing the system architecture of a color signal processing apparatus according to one embodiment of the present invention.

FIG. 16 is a block diagram showing the system architecture of a color signal processing apparatus according to one embodiment of the present invention.

Referring to FIG. 16, the color signal processing apparatus comprises a central processing unit (CPU) 21 for executing the whole processing, a read-only memory (ROM) 22, a random access memory (RAM) 23, an input/output interface (I/O) 24, a display unit 25 for displaying a color image on the basis of RGB-signals (signals R, G and B), a printer 26 for printing a color image on the basis of CMY-signals (signals C, M and Y), a memory 27 for temporarily storing therein data read by a scanner 28, the scanner 28 for reading a color image and thereby outputting RGB-signals, a communication interface 29, a communication network 30, a driver assembly 31 for driving storage media, a bus 37, and a keyboard 38. Exemplified as the storage media are a hard disk 32, an IC memory card 33, a magnetic tape 34, a floppy disk 35, and an optical disk 36 such as CD-ROM or DVD-ROM.

A program for executing a color signal selection process, or a program for executing a color signal interpolation process, and the contents of a color conversion table are stored in the storage media such as the hard disk 32, IC memory card 33, magnetic tape 34, floppy disk 35 and optical disk 36, and they are loaded into the RAM 23, whereby the color signal selection process or the color signal interpolation process can be executed. The program for the color signal selection process or the program for the color signal interpolation process, and the contents of the color conversion table can also be kept stored in the ROM 22.

Further, the program for the color signal selection process or the program for the color signal interpolation process, and the contents of the color conversion table can be fetched from the communication network 30 through the communication interface 29. As the communication network 30 connected to the communication interface 29, it is possible to employ any of, for example, a LAN (Local Area Network), a WAN (Wide Area Network), the Internet, an analog telephone network, a digital telephone network (ISDN: Integrated Services Digital Network), and a radio communication network such as PHS (Personal Handyphone System) or satellite communication system.

When the program for the color signal selection process has been started, the CPU 21 receives the RGB-signals read by the scanner 28. Then, it splits an RGB-space according to the received RGB-signals. Besides, it selects RGB-signals registered in the color conversion table, from within the respective resulting RGB subspaces. Thus, the RGB-signals surrounding the received RGB-signals can be selected from among RGB-values registered in the color conversion table of the scanner 28.

When the program for the color signal interpolation process has been started, the CPU 21 receives the RGB-signals read by the scanner 28. Then, it converts the received RGB-signals into L*a*b*-signals by reference to the color conversion table of the scanner 28. Besides, it converts the L*a*b*-signals into the CMY-signals by reference to the color conversion table of the printer 26, and it outputs the resulting CMY-signals to the printer 26. Thus, a color reproducibility in the scanner 28 and one in the printer 26 can be brought into agreement.

Now, there will be described a method of converting the correspondence relationships between RGB-values and L*a*b*-values distributed irregularly, into those between RGB-values and L*a*b*-values distributed regularly.

Figure 17:
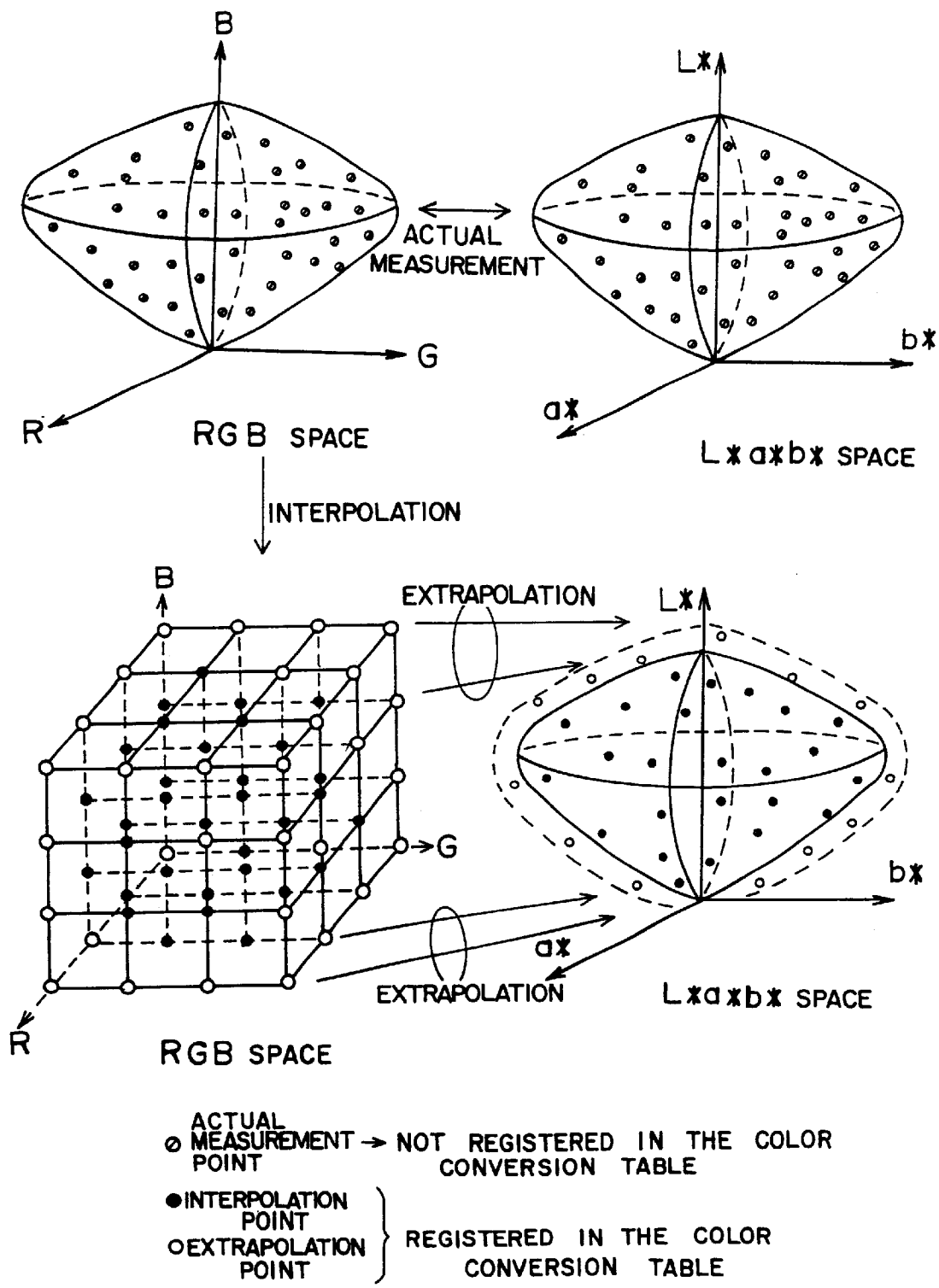
FIG. 17 is a diagram showing on color spaces a color signal generation method according to one embodiment of the present invention.

FIG. 17 is a diagram showing on color spaces a method of creating a color conversion table according to one embodiment of the present invention. This embodiment consists in that, as regards the RGB-values of the irregular distribution obtained by an actual measurement, the RGB-values of the regular distribution in a grid shape are generated by executing interpolations, while as regards the RGB-values exceeding a range which is obtained by the actual measurement, the correspondence relationships between the RGB-values and the L*a*b*-values distributed regularly are generated by executing extrapolations.

Referring to FIG. 17, a color chart is read by a scanner, whereby the distribution of RGB-values corresponding to the colors of the color chart is generated on an RGB-space. In addition, the identical color chart is measured by a calorimeter, whereby the distribution of L*a*b*-values corresponding to the colors of the color chart is generated on an L*a*b*-space. At this time, a one-to-one correspondence is afforded between the RGB-values distributed on the RGB-space and the L*a*b*-values distributed on the L*a*b*-space.

Here, since the colors of the color chart are not always distributed regularly, the distribution of the RGB-values on the RGB-space and that of the L*a*b*-values on the L*a*b*-space may become irregular. As a result, the correspondence relationships between the RGB-values and the L*a*b*-values distributed irregularly are generated by the actual measurements.

Subsequently, the RGB-values are converted so as to be regularly distributed, on the basis of the correspondence relationships between the RGB-values and the L*a*b*-values distributed irregularly. The conversion can be effected in such a way that the RGB-values distributed irregularly on the RGB-space are subjected to interpolations, and that L*a*b*-values corresponding to interpolated grid points on the RGB-space are found.

The calculations of the interpolations can be performed by, for example, a method explained below.

First, RGB-values surrounding each grid point on the RGB-space are selected from among the actual measurement data. Besides, weight coefficients corresponding to the selected RGB-values are successively set, whereupon a large number of interpolation points are generated within an area surrounded with the selected RGB-values.

Next, the interpolation point of the shortest distance to the grid point on the RGB-space is detected from among the large number of interpolation points generated. Besides, the interpolation of the actually measured L*a*b*-values is executed using the weight coefficients for the interpolation point detected on the RGB-space. In such a way, the correspondence relationships between the RGB-values and the L*a*b*-values of the regular distribution in a grid shape can be approximately obtained within the range of the distribution of the actually measured RGB-values.

At the next step, the correspondence relationships between the RGB-values and the L*a*b*-values generated by the interpolations are subjected to extrapolations, thereby to expand the range of the distribution of the grid points on the RGB-space. This step is performed by reason that the grid points on the RGB-space as generated by the interpolations are limited within the range surrounded with the actually measured RGB-signals, so the range of the distribution of the grid points on the RGB-space as generated by the interpolations becomes smaller than that of the distribution of the actually measured RGB-signals.

In this manner, an irregularity table obtained by the actual measurements is converted into a regularity table, whereby a color conversion table permitting high-speed and high-precision interpolative calculations in the case of converting RGB-values into L*a*b*-values can be generated.

Figure 18:
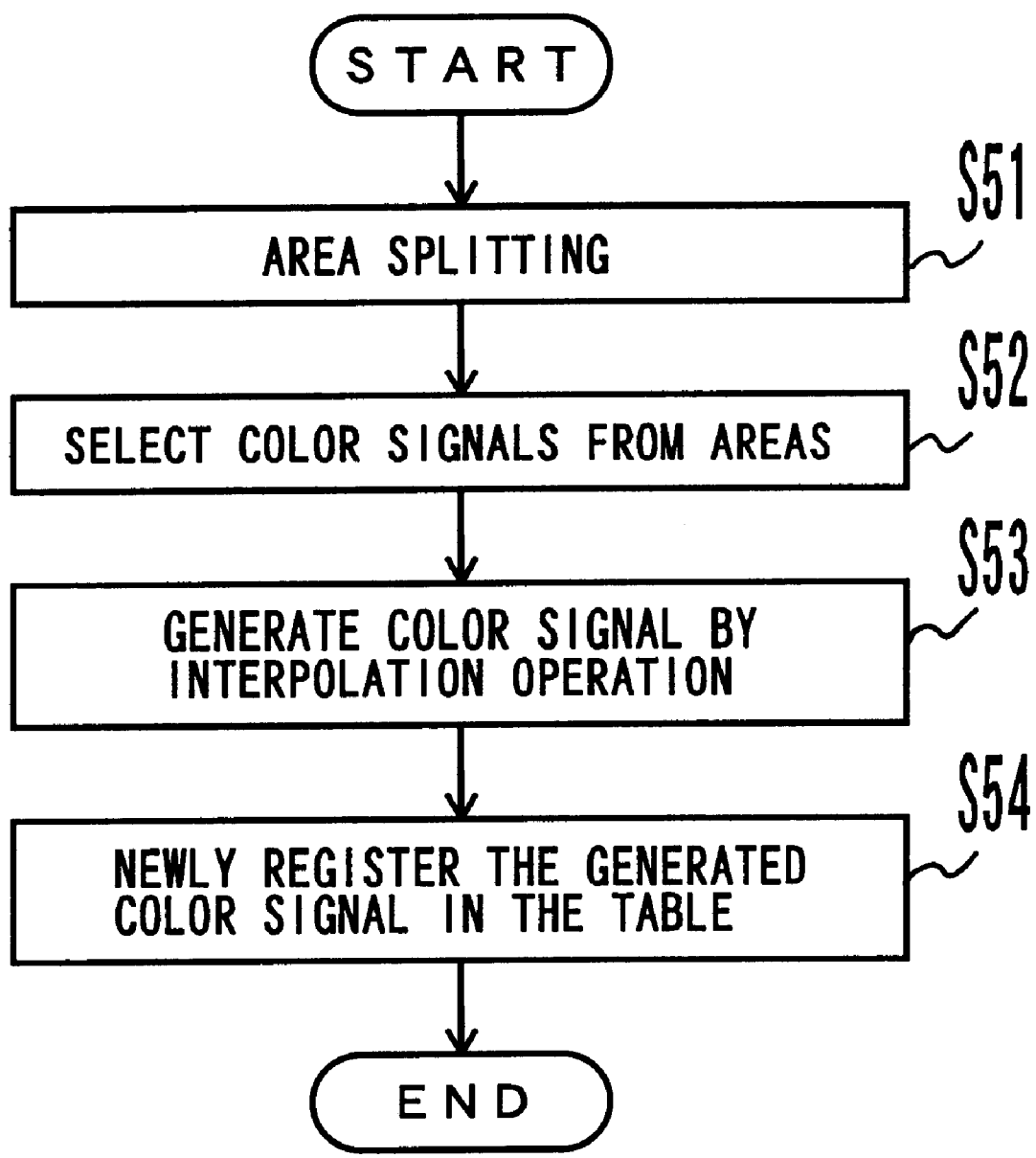
FIG. 18 is a flowchart showing a color-conversion-table generation method according to one embodiment of the present invention.

FIG. 18 is a flowchart showing an example of a method of generating a color conversion table on the basis of an interpolation.

Referring to FIG. 18, a color space in which color signals are distributed is split into a plurality of areas (step S51), and color signals are selected from within the resulting areas (step S52).

Subsequently, an interpolation operation (or interpolative calculations) is executed using the selected color signals, thereby to generate a color signal anew (step S53), and the color signal generated anew is registered in a color conversion table (step S54).

In this manner, the interpolation is executed using the color signals selected from within the split areas, whereby an irregularity table can be converted into a regularity table at high speed, and the color conversion table easy of utilization can be efficiently generated.

Figure 19:
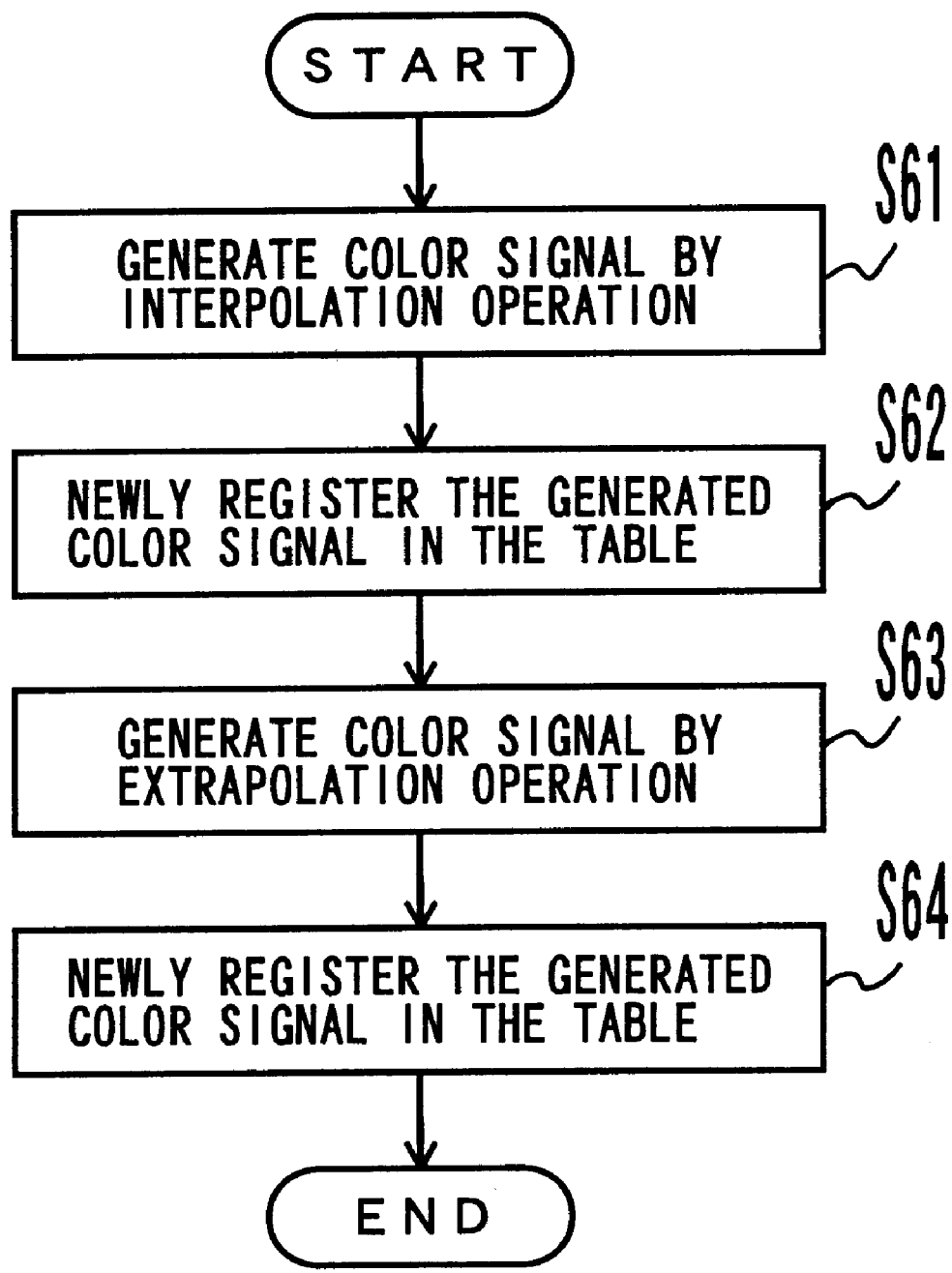
FIG. 19 is a flowchart showing an extrapolation point generation method according to one embodiment of the present invention.

FIG. 19 is a flowchart showing an example of a method of generating a color conversion table on the basis of an extrapolation.

Referring to FIG. 19, an interpolation operation (or interpolative calculations) is executed using color signals registered in a color conversion table, thereby to generate a new color signal within the range of color signals registered in the color conversion table (step S61), and the color signal generated anew is registered in the color conversion table (step S62).

Subsequently, an extrapolation operation (or extrapolative calculations) is executed, thereby to generate a new color signal outside the range of the color signals registered in the color conversion table (step S63), and the color signal generated anew is registered in the color conversion table (step S64).

In this manner, the color signal generated by the interpolation operation is further used for the extrapolation to increase the color signal, whereby the color signal to be registered in a regularity table can be generated even outside the range covered by an irregularity table.

Figure 20:
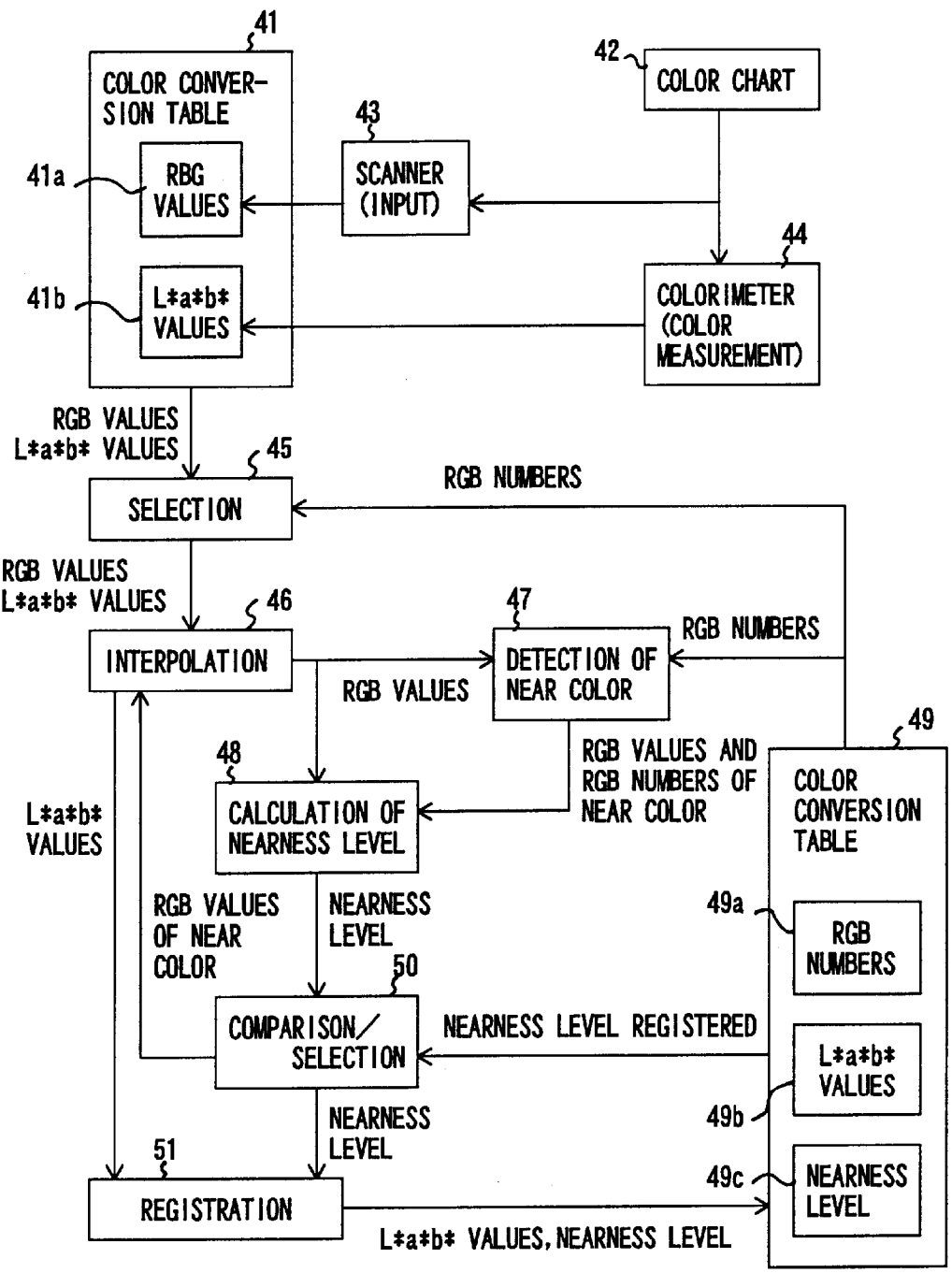
FIG. 20 is a block diagram showing the block arrangement of a color-conversion-table generation apparatus according to one embodiment of the present invention.

FIG. 20 is a block diagram showing the block arrangement of a color-conversion-table generation apparatus according to one embodiment of the present invention. The color-conversion-table generation apparatus makes it possible to efficiently generate a regularity table from an irregularity table, and to avoid any omission of color signals which are to be registered in the range of the regularity table.

Referring to FIG. 20, a scanner 43 reads colors printed on a color chart 42 and outputs the resulting RGB-values 41a to a color conversion table 41. On the other hand, a calorimeter 44 measures the colors printed on the color chart 42 and outputs the resulting L*a*b*-values 41b to the color conversion table 41.

Here, since the RGB-values 41a obtained from the scanner 43 and the L*a*b*-values 41b obtained from the colorimeter 44 are irregularly distributed, the color conversion table 41 becomes an irregularity table.

A color conversion table 49 stored therein the correspondence relationships between RGB-values distributed at the grid points of an RGB-space and L*a*b*-values 49b. It is assumed by way of example that the ranges of the RGB-values to be registered in the color conversion table 49 be $0 \leq R \leq 256$, $0 \leq G \leq 256$ and $0 \leq B \leq 256$ which correspond to the color reproduction range of the scanner 43, and that the RGB-values corresponding to the grid points having grid intervals of 16 be registered. Therefore, the RGB-values to be registered in the color conversion table 49 can be replaced with RGB-numbers 49a, which become the integral values of $0 \leq R\text{-number} \leq 16$, $0 \leq G\text{-number} \leq 16$ and $0 \leq B\text{-number} \leq 16$.

Here, the RGB-values can be obtained from the RGB-numbers 49a in accordance with:

$$\text{R-value}=\text{R-value}\times 16 \tag{1}$$

$$\text{G-value}=\text{G-value}\times 16 \tag{2}$$

$$\text{B-value}=\text{B-value}\times 16 \tag{3}$$

When supplied with the RGB-numbers 49a to-be-registered from the color conversion table 49, a selection unit 45 finds the RGB-values corresponding to these RGB-numbers 49a in accordance with Eqs. (1) to (3). The found RGB-values correspond to the RGB-values (grid RGB-values) of the grid point on the RGB-space. Besides, the selection unit 45 splits the RGB-space according to the grid RGB-values and selects the RGB-values 41a surrounding the grid RGB-values, from among the RGB-values 41a registered in the color conversion table 41. Here, in a case where the generation of an interpolation point by an interpolation unit 46 is based on an 8-point interpolation, the RGB-values 41a surrounding the grid RGB-values are selected in the number of eight, and in a case where it is based on a tetrahedron interpolation, they are selected in the number of four.

Incidentally, the selection unit 45 may well select the grid RGB-values at intervals wider than the grid intervals of the grid RGB-values and then split the RGB-space according to the selected grid RGB-values.

Subsequently, when the selection unit 45 has selected the RGB-values 41a surrounding the grid RGB-values, it reads out the L*a*b*-values 41b correspondent to the selected RGB-values 41a from the color conversion table 41. Further, it supplies the interpolation unit 46 with the RGB-values 41a selected from within the color conversion table 41 and the L*a*b*-values 41b read out of this color conversion table 41.

The interpolation unit 46 sets weight coefficients for the RGB-values 41a outputted from the selection unit 45, so as to generate the interpolation point in an area which is surrounded with the RGB-values 41a outputted from the selection unit 45. Here, the interpolation unit 46 can generate the interpolation point in conformity with the 8-point interpolation, the tetrahedron interpolation, or the like.

A near color detection unit 47 finds the grid RGB-values correspondent to the RGB-numbers 49a outputted from the color conversion table 49, in accordance with Eqs. (1) to (3), and it compares the found grid RGB-values with the RGB-values of the interpolation point outputted from the interpolation unit 46. Besides, it detects the RGB-numbers of the grid point near the RGB-values of the interpolation point.

A nearness level calculation unit 48 calculates the nearness level between the RGB-values of the interpolation point outputted from the interpolation unit 46 and those of the grid point detected by the near color detection unit 47. By the way, the nearness level can be defined as the square of the distance between the RGB-values of the interpolation point outputted from the interpolation unit 46 and those of the grid point detected by the near color detection unit 47.

A comparison/selection unit 50 reads out the nearness level 49c of the RGB-numbers 49a of the grid point detected by the near color detection unit 47, from the color conversion table 49, and it compares the read-out nearness level 49c with the nearness level calculated by the nearness level calculation unit 48. Besides, in a case where the nearness level calculated by the nearness level calculation unit 48 is greater than the one 49c read out of the color conversion table 49, the comparison/selection unit 50 reports the fact to the interpolation unit 46.

In the case where the nearness level of the interpolation point is greater than the nearness level 49c registered in the color conversion table 49, or in a case where the nearness level 49c is not registered as to the RGB-numbers of the grid point detected by the near color detection unit 47, the interpolation unit 46 applies the weight coefficients of the interpolation point to the L*a*b*-values 41b which correspond to the RGB-values 41a selected from within the color conversion table 41, thereby to calculate the L*a*b*-values 49b which correspond to the RGB-numbers 49a of the color conversion table 49.

A registration unit 51 registers the L*a*b*-values 49b outputted from the interpolation unit 46 and the nearness level 49c outputted from the comparison/selection unit 50, in the color conversion table 49 in correspondence with the RGB-numbers 49a of the grid point detected by the near color detection unit 47.

Next, a method of creating a color conversion table for a scanner will be explained more concretely in conjunction with numerical formulae. Incidentally, the color conversion table for the scanner to be created here is one which is employed for converting RGB-signals inputted by the scanner, into L*a*b*-signals. L*a*b*-values corresponding to RGB-values of regular distribution are registered in this color conversion table.

In creating the color conversion table, a target (a color chart on which various color chips are printed) is inputted by the scanner so as to acquire the RGB-values of the color chart, while the color chart is measured by a colorimeter so as to obtain the L*a*b*-values of the color chart. Here, the ordinary target "IT8. 7" shall be employed.

Since the data obtained by the inputting operation of the scanner and the measurement of the colorimeter express the correspondences between the RGB-values and the L*a*b*-values, the resulting table can be termed the "color conversion table". Since, however, the colors of the target are not distributed in perfect regularity, both the RGB-values and the L*a*b*-values become irregular distributions.

Now, a table transformation method according to the first embodiment of the present invention will be described. The table transformation method according to the first embodiment transforms an irregularity table into a regularity table in conformity with an 8-point interpolation. The processing steps of the first embodiment consist of three stages; the "creation of the combination of colors", the "generation of the regularity table by interpolations" and the "supplementation of the regularity table by extrapolations".

In the creation of the combination of colors, the color signals of the irregularity table surrounding grid RGB-values are obtained as to respective grid points. Here, eight color signals are selected as to one grid point. Incidentally, the eight color signals shall be called the "combination of colors" below.

In the generation of the regularity table by interpolations, the combinations of colors are interpolated, thereby to generate a large number of color signals between the combinations of colors. Besides, color signals nearest to the grid RGB-values are selected from among the generated color signals. L*a*b*-values for the respective grid RGB-values can be calculated by selecting the combinations of colors as to all the grid points to-be-registered. By the way, when only the color signals registered in the irregularity table are used, all the grid points to be registered cannot be always surrounded with these color signals, and hence, the grid RGB-values for which the L*a*b*-values cannot be calculated are usually existent. Assuming here that the ranges of the RGB-values to be registered in the regularity table be $0 \leq R \leq 256$, $0 \leq G \leq 256$ and $0 \leq B \leq 256$, and that the grid RGB-values corresponding to the grid points having grid intervals of 16 be registered, the grid RGB-values (Rgrid, Ggrid, Bgrid) can be calculated by:

$$Rgrid = Rnum \cdot 16 \tag{4}$$

$$Ggrid = Gnum \cdot 16 \tag{5}$$

$$Bgrid = Bnum \cdot 16 \tag{6}$$

In these equations, terms "Rnum", "Gnum" and "Bnum" denote RGB-numbers, which are the integral values of 0 to 16, respectively.

In the supplementation of the regularity table by extrapolations, the L*a*b*-values for all the grid RGB-values to be registered are calculated by extrapolating the values of the generated regularity table.

The respective steps will be explained in more detail below.

In the creation of the combination of colors, the grid RGB-values to be generated as the regularity table are successively noted. Besides, the eight color signals (the scanner input values and the color measurement values of the target) around the grid RGB-values are selected as the combination of colors.

Figure 21:
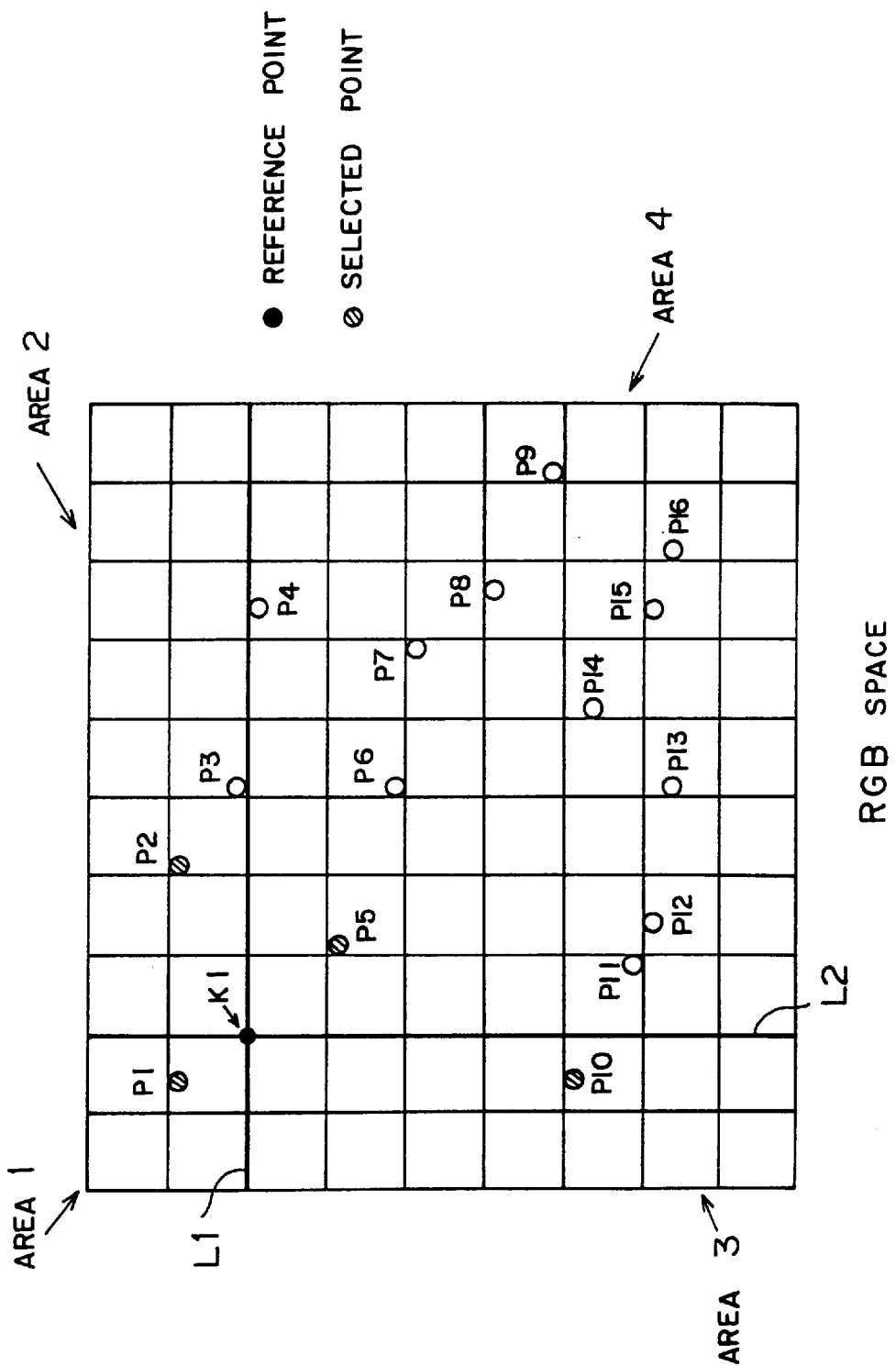
FIG. 21 is a diagram showing a color signal selection method according to one embodiment of the present invention, in two dimensions on an RGB-space.

FIG. 21 is a diagram showing a color signal selection method according to one embodiment of the present invention, in two dimensions on an RGB-space.

Referring to FIG. 21, it is assumed that RGB-values registered in an irregularity table be distributed at points P1 to P16 on the color space. It is also assumed that the grid RGB-values of a grid point K1 to be registered in a regularity table have been inputted as a subject for interpolation. Here, since the grid RGB-values of the grid point K1 are not registered in the irregularity table, the RGB-values of the points P1, P2, P5 and P10 surrounding the grid point K1 are selected from among those of the points P1 to P16 registered in the irregularity table. Besides, weighted calculations are executed using the RGB-values of the selected points P1, P2, P5 and P10. Thus, the grid RGB-values of the grid point K1 are interpolated.

In order to select the four points P1, P2, P5 and P10 surrounding the grid point K1, the color space where the points P1 to P16 are distributed is split by straight lines L1 and L2 which pass through the grid point K1 and which are orthogonal to each other. Owing to the splitting, four areas #1 to #4 are generated on the color space. Besides, the point P1 nearest to the grid point K1 is selected from within the area #1, the similar point P2 is selected from within the area #2, the similar point P10 is selected from within the area #3, and the similar point P5 is selected from within the area #4. As a result, the grid point K1 is reliably surrounded with the four points P1, P2, P5 and P10, and the four points P1, P2, P5 and P10 surrounding the grid point K1 can be picked out from among the points P1 to P16 irregularly distributed on the color space, merely by selecting one color signal from within each of the four areas #1 to #4 obtained by the splitting.

In a case where, in successively selecting all the grid points, the eight color signals surrounding the grid point cannot be selected because this grid point lies near the boundary of a color reproduction range, it is determined that the combination of eight colors could not be selected as to this grid point. In the example of FIG. 21, no color signals are registered around the grid point whose grid numbers are (2, 1), and hence, the color signals surrounding this grid point which has the grid numbers of (2, 1) cannot be selected.

In this manner, while all the grid points are successively selected, the plane or color space is split into the four areas according to each of the grid points, and the color signal of the shortest distance from the grid point is selected from each of the areas, whereby the four points around the grid point can reliably surround this grid point.

Incidentally, although the four color signals are selected in the example of FIG. 21 because of the two-dimensional illustration, the eight color signals are selected in case of a three-dimensional space.

An algorithm for creating the combination of colors will be explained as to sequential steps below.

As initialization, the RGB-values and L*a*b*-values (the colors of the target) registered in the irregularity table are set in an array.

That is, the RGB-values and L*a*b*-values registered in the irregularity table are set at Lin[k], ain[k], bin[k], Rin[k], Gin[k] and Bin[k]. Here, the color number k lies within $0 \leq k <$ (the number of colors).

Subsequently, the color signals of the grid points of the RGB-space are successively selected by successively designating grid numbers.

That is, the Rgrid-values, Ggrid-values and Bgrid-values are successively set in accordance with Eqs. (4) to (6) mentioned before.

Subsequently, the RGB-space is split into eight areas about each of the grid points, and the color signals of the irregularity table lying at the shortest distances from the grid point are selected from within the respective areas.

That is, regarding the range of $0 \leq i <$ (the number of colors), the values (Rin[k], Gin[k], Bin[k]) are classified into the eight areas according to the Rgrid-value, Ggrid-value and Bgrid-value, and the color numbers i of the shortest distances from the grid point, among the values (Rin[i], Gin[i], Bin[i]) classified into the respective areas, are stored in numbers "num0" to "num7".

This processing is expressed with numerical formulae, as follows:

(1) Retain in "num0" the color number i which satisfies the conditions of Rin[i]≦Rgrid, Gin[i]≦Ggrid and Bin[i]≦Bgrid.

(2) Retain in "num1" the color number i which satisfies the conditions of Rin[i]>Rgrid, Gin[i]≦Ggrid and Bin[i]≦Bgrid.

(3) Retain in "num2" the color number i which satisfies the conditions of Rin[i]≦Rgrid, Gin[i]>Ggrid and Bin[i]≦Bgrid.

(4) Retain in "num3" the color number i which satisfies the conditions of Rin[i]≦Rgrid, Gin[i]≦Ggrid and Bin[i]>Bgrid.

(5) Retain in "num4" the color number i which satisfies the conditions of Rin[i]>Rgrid, Gin[i]>Ggrid and Bin[i]≦Bgrid.

(6) Retain in "num5" the color number i which satisfies the conditions of Rin[i]≦Rgrid, Gin[i]>Ggrid and Bin[i]>Bgrid.

(7) Retain in "num6" the color number i which satisfies the conditions of Rin[i]>Rgrid, Gin[i]≦Ggrid and Bin[i]>Bgrid.

(8) Retain in "num7" the color number i which satisfies the conditions of Rin[i]>Rgrid, Gin[i]>Ggrid and Bin[i]>Bgrid.

Incidentally, the next step, namely, the generation of the regularity table by interpolations is executed only in a case where all the numbers "num0" to "num7" have been successfully set, and the control flow of the algorithm returns to the selection of the grid point in a case where any color signal cannot be set.

Figure 22:
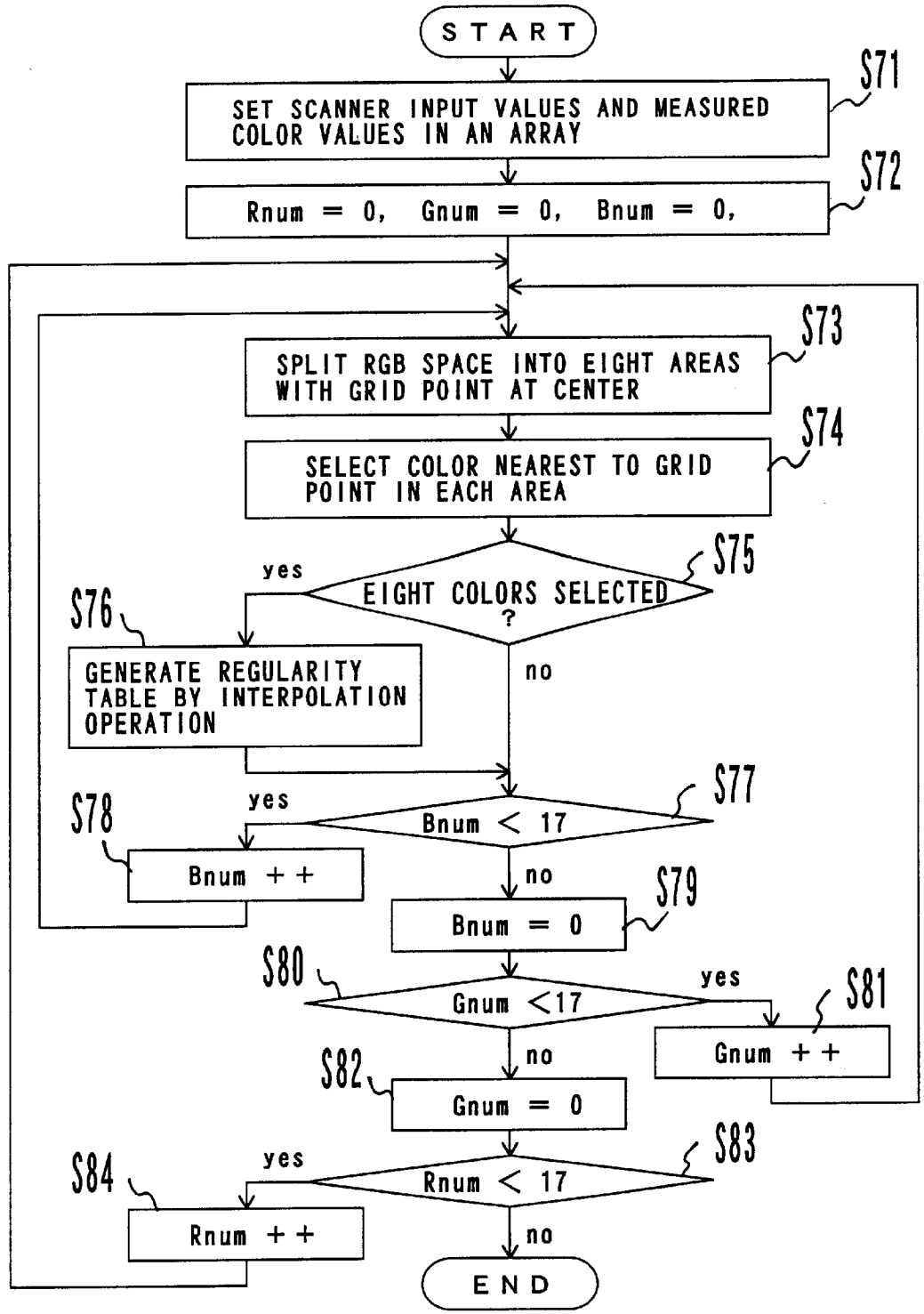
FIG. 22 is a flowchart showing a method of selecting a combination of color signals in accordance with the first embodiment of the present invention.

FIG. 22 is a flowchart showing a method of selecting a combination of colors in accordance with the first embodiment of the present invention. By the way, it is assumed in the flowchart of FIG. 22 that the ranges of RGB-values to be registered in a regularity table be 0≦R≦256, 0≦G≦256 and 0≦B≦256, and that the RGB-values corresponding to grid points having grid intervals of 16 be registered. Therefore, RGB-numbers (Rnum, Gnum, Bnum) become integral values in the ranges of 0≦Rnum≦16, 0≦Gnum≦16 and 0≦Bnum≦16.

Referring to FIG. 22, values inputted by a scanner and values measured by a calorimeter are set in an array (step S71). Here, color signals which are set in the array become irregular ordinarily, and the array can be specified by designating color numbers k corresponding to the colors of a target.

Subsequently, RGB-numbers (Rnum, Gnum, Bnum) are respectively set at zero (step S72). Further, an RGB-space is split into eight areas around a grid point specified by the RGB-numbers (Rnum, Gnum, Bnum) (step S73), and the color numbers k nearest to the grid point are specified for the respective split areas (step S74). Thus, the eight colors of the target surrounding the color of the grid point can be selected on the RGB-space.

The next step serves to judge if, as to the grid point specified by the RGB-numbers (Rnum, Gnum, Bnum), the eight colors of the target surrounding the color of this grid point have been successfully selected (step S75). On condition that the selection has been successful, a regularity table is generated by an interpolation operation (or interpolative calculations) (step S76), whereupon the next grid point is selected (step S77 to step S84). On condition that the eight colors of the target surrounding the color of the grid point have not been successfully selected, the generation of the regularity table by the interpolation operation is not performed for this grid point, whereupon the next grid point is selected (step S77 to step S84).

Thenceforth, the RGB-numbers (Rnum, Gnum, Bnum) are respectively incremented by one until they reach 16 (step S77 to step S84). As a result, L*a*b*-values can be registered in the regularity table for the grid points surrounded with the eight colors of the target, among 17×17×17 grid points generated on the RGB-space.

In the generation of the regularity table by interpolations, a large number of new correspondence relationships of color signals are created by interpolating the combinations of colors, and the L*a*b*-values corresponding to the RGB-values near the grid points of the RGB-space among the created color signals are registered.

By the way, since data to be created are the L*a*b*-values corresponding to the RGB-numbers (Rnum, Gnum, Bnum) of the grid points, the actual format of the created data become the following three-dimensional array:

L[Rnum][Gnum][Bnum],
a[Rnum][Gnum][Bnum],
b[Rnum][Gnum][Bnum].

An algorithm for generating the regularity table by the interpolations will be explained as to sequential steps below.

In the first place, the intervals of colors to be created by the interpolations are set. This processing is based on the fact that, even when an extremely large number of interpolation points are created in the interpolative generation of the large number of colors, a large number of interpolation points of no use appear wastefully. Therefore, the interpolations are made efficient by controlling the generation intervals of the colors which are to be created by the interpolations.

Figure 23:
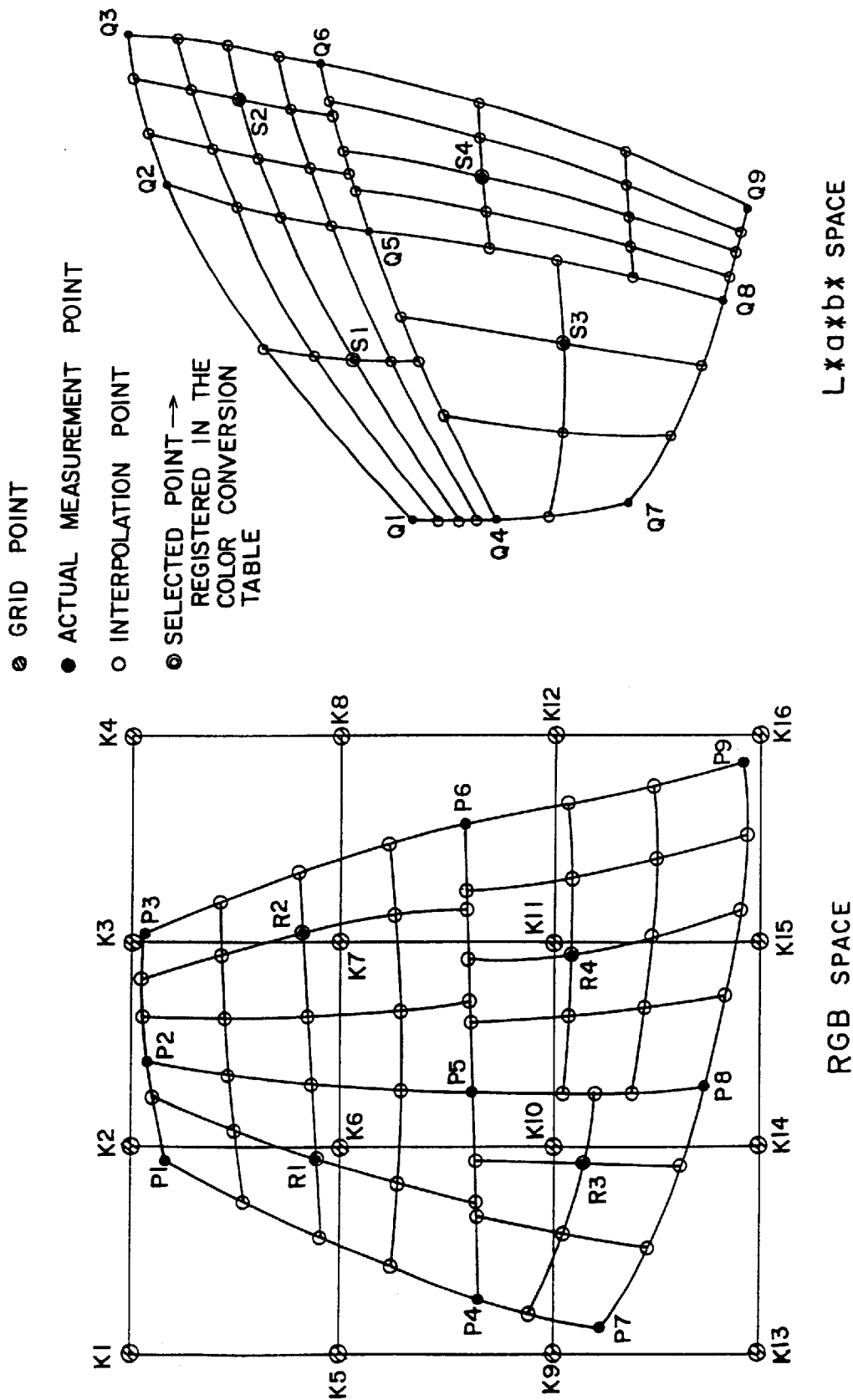
FIG. 23 is a diagram showing a method of splitting an RGB-space and an L*a*b*-space in accordance with the first embodiment of the present invention.

FIG. 23 is a diagram showing a method of splitting an RGB-space and an L*a*b*-space in accordance with the first embodiment of the present invention. In the example of FIG. 23, the generation intervals of colors to be created by interpolations are set so as to become approximately equal on the RGB-space.

Referring to FIG. 23, it is assumed that RGB-values obtained by reading a color chart with a scanner be distributed at points P1 to P9 on the RGB-space, while L*a*b*-values obtained by measuring the color chart with a calorimeter be distributed at points Q1 to Q9 on the L*a*b*-space. It is also assumed here that the points P1 to P9 correspond to the points Q1 to Q9, respectively. Besides, it is assumed that the points P1 to P9 be irregularly distributed on the RGB-space, and that the L*a*b*-values corresponding to grid points K1 to K16 on the RGB-space be found in order to bring the irregular distribution into a regular distribution.

The grid points K1 to K5, K8, K9 and K12 to K16 on the RGB-space are excluded from subjects for the generation of a regularity table by interpolations because no actual measurement points surrounding these grid points have been obtained.

In a case where the grid point K6 on the RGB-space is a subject for the interpolative generation of the regularity table, the RGB-space is split centering around the grid point K6, and the points P1, P2, P4 and P5 nearest to the grid point K6 are respectively selected from within split RGB-subspaces. When the points P1, P2, P4 and P5 are selected, interpolation points are generated so as to have substantially equal intervals on the RGB-space, in an area which is surrounded with these points P1, P2, P4 and P5.

Besides, an interpolation point Ri nearest to the grid point K6 is detected from among the interpolation points generated in the area surrounded with the points P1, P2, P4 and P5. When the interpolation point R1 is detected, an interpolation point S1 on the L*a*b*-space as corresponds to the interpolation point R1 on the RGB-space is calculated in such a way that weight coefficients which were used for the generation of the interpolation point R1 are applied to the points Q1, Q2, Q4 and Q5 on the L*a*b*-space as correspond respectively to the points P1, P2, P4 and P5 on the RGB-space. Further, the L*a*b*-values of the interpolation point S1 on the L*a*b*-space are registered in the regularity table, in correspondence with the grid number of the grid point K6 on the RGB-space.

In a case where the grid point K7 on the RGB-space is a subject for the interpolative generation of the regularity table, the RGB-space is split centering around the grid point K7, and the points P2, P3, P5 and P6 nearest to the grid point K7 are respectively selected from within split RGB-subspaces. When the points P2, P3, P5 and P6 are selected, interpolation points are generated so as to have substantially equal intervals on the RGB-space, in an area which is surrounded with these points P2, P3, P5 and P6.

Besides, an interpolation point R2 nearest to the grid point K7 is detected from among the interpolation points generated in the area surrounded with the points P2, P3, P5 and P6. When the interpolation point R2 is detected, an interpolation point S2 on the L*a*b*-space as corresponds to the interpolation point R2 on the RGB-space is calculated in such a way that weight coefficients which were used for the generation of the interpolation point R2 are applied to the points Q2, Q3, Q5 and Q6 on the L*a*b*-space as correspond respectively to the points P2, P3, P5 and P6 on the RGB-space. Further, the L*a*b*-values of the interpolation point S2 on the L*a*b*-space are registered in the regularity table, in correspondence with the grid number of the grid point K7 on the RGB-space.

In a case where the grid point K10 on the RGB-space is a subject for the interpolative generation of the regularity table, the RGB-space is split centering around the grid point K10, and the points P4, P5, P7 and P8 nearest to the grid point K10 are respectively selected from within split RGB-subspaces. When the points P4, P5, P7 and P8 are selected, interpolation points are generated so as to have substantially equal intervals on the RGB-space, in an area which is surrounded with these points P4, P5, P7 and P8.

Besides, an interpolation point R3 nearest to the grid point K10 is detected from among the interpolation points generated in the area surrounded with the points P4, P5, P7 and P8. When the interpolation point R3 is detected, an interpolation point S3 on the L*a*b*-space as corresponds to the interpolation point R3 on the RGB-space is calculated in such a way that weight coefficients which were used for the generation of the interpolation point R3 are applied to the points Q4, Q5, Q7 and Q8 on the L*a*b*-space as correspond respectively to the points P4, P5, P7 and P8 on the RGB-space. Further, the L*a*b*-values of the interpolation point S3 on the L*a*b*-space are registered in the regularity table, in correspondence with the grid number of the grid point K10 on the RGB-space.

In a case where the grid point K11 on the RGB-space is a subject for the interpolative generation of the regularity table, the RGB-space is split centering around the grid point K11, and the points P5, P6, P8 and P9 nearest to the grid point K11 are respectively selected from within split RGB-subspaces. When the points P5, P6, P8 and P9 are selected, interpolation points are generated so as to have substantially equal intervals on the RGB-space, in an area which is surrounded with these points P5, P6, P8 and P9.

Besides, an interpolation point R4 nearest to the grid point K11 is detected from among the interpolation points generated in the area surrounded with the points P5, P6, P8 and P9. When the interpolation point R4 is detected, an interpolation point S4 on the L*a*b*-space as corresponds to the interpolation point R4 on the RGB-space is calculated in such a way that weight coefficients which were used for the generation of the interpolation point R4 are applied to the points Q5, Q6, Q8 and Q9 on the L*a*b*-space as correspond respectively to the points P5, P6, P8 and P9 on the RGB-space. Further, the L*a*b*-values of the interpolation point S4 on the L*a*b*-space are registered in the regularity table, in correspondence with the grid number of the grid point K11 on the RGB-space.

Incidentally, since the interpolation points have been generated in the ranges surrounded with the color signals selected as the combinations of colors, so as to have the substantially equal intervals on the RGB-space, the distribution of the interpolation points corresponding to the RGB-values exhibits a deviation or an offset toward a specified area on the L*a*b*-space.

Figure 24:
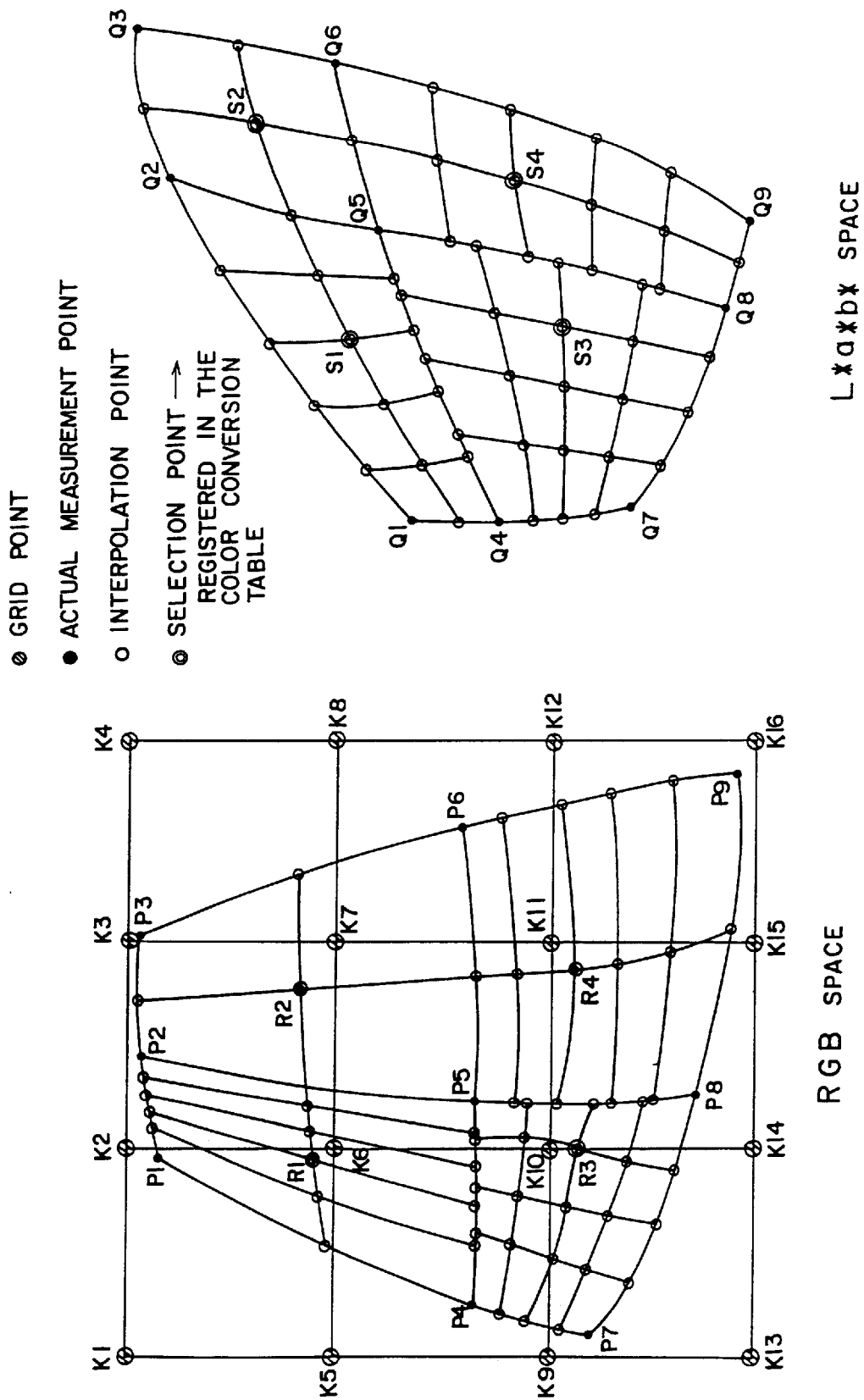
FIG. 24 is a diagram showing a method of splitting an RGB-space and an L*a*b*-space in accordance with the second embodiment of the present invention.

FIG. 24 is a diagram showing a method of splitting an RGB-space and an L*a*b*-space in accordance with the second embodiment of the present invention. In the example of FIG. 24, the generation intervals of colors to be created by interpolations are set so as to become approximately equal on the L*a*b*-space.

Referring to FIG. 24, it is assumed that RGB-values obtained by reading a color chart with a scanner be distributed at points P1 to P9 on the RGB-space, while L*a*b*-values obtained by measuring the color chart with a colorimeter be distributed at points Q1 to Q9 on the L*a*b*-space. It is also assumed here that the points P1 to P9 correspond to the points Q1 to Q9, respectively. Besides, it is assumed that the points P1 to P9 be irregularly distributed on the RGB-space, and that the L*a*b*-values corresponding to grid points K1 to K16 on the RGB-space be found in order to bring the irregular distribution into a regular distribution.

The grid points K1 to K5, K8, K9 and K12 to K16 on the RGB-space are excluded from subjects for the generation of a regularity table by interpolations because no actual measurement points surrounding these grid points have been obtained.

In a case where the grid point K6 on the RGB-space is a subject for the interpolative generation of the regularity table, the RGB-space is split centering around the grid point K6, and the points P1, P2, P4 and P5 nearest to the grid point K6 are respectively selected from within split RGB-subspaces. When the points P1, P2, P4 and P5 are selected, interpolation points are generated so as to have substantially equal intervals on the L*a*b*-space, in an area which is surrounded with these points P1, P2, P4 and P5. Here, in order to generate the interpolation points in the area surrounded with the points P1, P2, P4 and P5, at the substantially equal intervals on the L*a*b*-space, weight coefficients in the case of generating the interpolation points on the RGB-space are set on the basis of the arrangement states of the points Q1, Q2, Q4 and Q5 on the L*a*b*-space.

Besides, an interpolation point R1 nearest to the grid point K6 is detected from among the interpolation points generated in the area surrounded with the points P1, P2, P4 and P5. When the interpolation point R1 is detected, an interpolation point S1 on the L*a*b*-space as corresponds to the interpolation point R1 on the RGB-space is calculated in such a way that the weight coefficients which were used for the generation of the interpolation point R1 are applied to the points Q1, Q2, Q4 and Q5 on the L*a*b*-space as correspond respectively to the points P1, P2, P4 and P5 on the RGB-space. Further, the L*a*b*-values of the interpolation point S1 on the L*a*b*-space are registered in the regularity table, in correspondence with the grid number of the grid point K6 on the RGB-space.

In a case where the grid point K7 on the RGB-space is a subject for the interpolative generation of the regularity table, the RGB-space is split centering around the grid point K7, and the points P2, P3, P5 and P6 nearest to the grid point K7 are respectively selected from within split RGB-subspaces. When the points P2, P3, P5 and P6 are selected, interpolation points are generated so as to have substantially equal intervals on the L*a*b*-space, in an area which is surrounded with these points P2, P3, P5 and P6. Here, in order to generate the interpolation points in the area surrounded with the points P2, P3, P5 and P6, at the substantially equal intervals on the L*a*b*-space, weight coefficients in the case of generating the interpolation points on the RGB-space are set on the basis of the arrangement states of the points Q2, Q3, Q5 and Q6 on the L*a*b*-space.

Besides, an interpolation point R2 nearest to the grid point K7 is detected from among the interpolation points generated in the area surrounded with the points P2, P3, P5 and P6. When the interpolation point R2 is detected, an interpolation point S2 on the L*a*b*-space as corresponds to the interpolation point R2 on the RGB-space is calculated in such a way that the weight coefficients which were used for the generation of the interpolation point R2 are applied to the points Q2, Q3, Q5 and Q6 on the L*a*b*-space as correspond respectively to the points P2, P3, P5 and P6 on the RGB-space. Further, the L*a*b*-values of the interpolation point S2 on the L*a*b*-space are registered in the regularity table, in correspondence with the grid number of the grid point K7 on the RGB-space.

In a case where the grid point K10 on the RGB-space is a subject for the interpolative generation of the regularity table, the RGB-space is split centering around the grid point K10, and the points P4, P5, P7 and P8 nearest to the grid point K10 are respectively selected from within split RGB-subspaces. When the points P4, P5, P7 and P8 are selected, interpolation points are generated so as to have substantially equal intervals on the L*a*b*-space, in an area which is surrounded with these points P4, P5, P7 and P8. Here, in order to generate the interpolation points in the area surrounded with the points P4, P5, P7 and P8, at the substantially equal intervals on the L*a*b*-space, the weight coefficients in the case of generating the interpolation points on the RGB-space are set on the basis of the arrangement states of the points Q4, Q5, Q7 and Q8 on the L*a*b*-space.

Besides, an interpolation point R3 nearest to the grid point K10 is detected from among the interpolation points generated in the area surrounded with the points P4, P5, P7 and P8. When the interpolation point R3 is detected, an interpolation point S3 on the L*a*b*-space as corresponds to the interpolation point R3 on the RGB-space is calculated in such a way that the weight coefficients which were used for the generation of the interpolation point R3 are applied to the points Q4, Q5, Q7 and Q8 on the L*a*b*-space as correspond respectively to the points P4, P5, P7 and P8 on the RGB-space. Further, the L*a*b*-values of the interpolation point S3 on the L*a*b*-space are registered in the regularity table, in correspondence with the grid number of the grid point K10 on the RGB-space.

In a case where the grid point K11 on the RGB-space is a subject for the interpolative generation of the regularity table, the RGB-space is split centering around the grid point K11, and the points P5, P6, P8 and P9 nearest to the grid point K11 are respectively selected from within split RGB-subspaces. When the points P5, P6, P8 and P9 are selected, interpolation points are generated so as to have substantially equal intervals on the L*a*b*-space, in an area which is surrounded with these points P5, P6, P8 and P9. Here, in order to generate the interpolation points in the area surrounded with the points P5, P6, P8 and P9, at the substantially equal intervals on the L*a*b*-space, the weight coefficients in the case of generating the interpolation points on the RGB-space are set on the basis of the arrangement states of the points Q5, Q6, Q8 and Q9 on the L*a*b*-space.

Besides, an interpolation point R4 nearest to the grid point K11 is detected from among the interpolation points generated in the area surrounded with the points P5, P6, P8 and P9. When the interpolation point R4 is detected, an interpolation point S4 on the L*a*b*-space as corresponds to the interpolation point R4 on the RGB-space is calculated in such a way that the weight coefficients which were used for the generation of the interpolation point R4 are applied to the points Q5, Q6, Q8 and Q9 on the L*a*b*-space as correspond respectively to the points P5, P6, P8 and P9 on the RGB-space. Further, the L*a*b*-values of the interpolation point S4 on the L*a*b*-space are registered in the regularity table, in correspondence with the grid number of the grid point K11 on the RGB-space.

Incidentally, since the interpolation points have been generated in the ranges surrounded with the color signals selected as the combinations of colors, so as to have the substantially equal intervals on the L*a*b*-space, the distribution of the interpolation points corresponding to the L*a*b*-values exhibits a deviation or an offset toward a specified area on the RGB-space.

FIG. 25 is a diagram showing selected points according to one embodiment of the present invention, on a three-dimensional color space.

Referring to FIG. 25, eight points P0 to P7 surrounding an inputted point P are selected for the point P lying on the three-dimensional space. Besides, assuming that interpolation points be generated in an area surrounded with the eight points P0 to P7, the generation intervals of the interpolation points are determined by estimating the lengths of the diagonal lines of a hexahedron whose vertices are the points P0 to P7.

More specifically, each of the distance between the points P0 and P7, the distance between the points P1 and P5, the distance between the points P2 and P6, and the distance between the points P3 and P4 is evaluated as to respective components on the three-dimensional space. Besides, the generation intervals of the respective components on the three-dimensional space are set on the basis of the minimum value among the distances between the points P0 and P7, between the points P1 and P5, between the points P1 and P5, between the points P2 and P6, and between the points P3 and P4.

Now, the generation processing will be explained in conjunction with numerical formulae. Here, the generation intervals of the interpolation points shall be set so as to become approximately equal on an L*a*b*-space which matches more with the sensation of man than an RGB-space.

First, the Lab-values of numbers "num0" to "num7" set by the selection of the combination of colors can be obtained in accordance with the following equations:

$$L0=\text{Lin}[\text{num0}], a0=\text{ain}[\text{num0}], b0=\text{bin}[\text{num0}] \quad (7)$$

$$L1=\text{Lin}[\text{num1}], a1=\text{ain}[\text{num1}], b1=\text{bin}[\text{num1}] \quad (8)$$

$$L2=\text{Lin}[\text{num2}], a2=\text{ain}[\text{num2}], b2=\text{bin}[\text{num2}] \quad (9)$$

$$L3=\text{Lin}[\text{num3}], a3=\text{ain}[\text{num3}], b3=\text{bin}[\text{num3}] \quad (10)$$

$$L4=\text{Lin}[\text{num4}], a4=\text{ain}[\text{num4}], b4=\text{bin}[\text{num4}] \quad (11)$$

$$L5=\text{Lin}[\text{num5}], a5=\text{ain}[\text{num5}], b5=\text{bin}[\text{num5}] \quad (12)$$

$$L6=\text{Lin}[\text{num6}], a6=\text{ain}[\text{num6}], b6=\text{bin}[\text{num6}] \quad (13)$$

$$L7=\text{Lin}[\text{num7}], a7=\text{ain}[\text{num7}], b7=\text{bin}[\text{num7}] \quad (14)$$

Subsequently, the minimum values of the lengths of the L-components, a-components and b-components of the diagonal lines of the hexahedron surrounded with the Lab-values of Eqs. (7) to (14) can be obtained as follows:

$$\text{Lint0}=(\text{int})(W/\text{sqrt}((L0-L7)^2 + (a0-a7)^2 + (b0-b7)^2) + 0.5)$$
$$\text{Lint1}=(\text{int})(W/\text{sqrt}((L1-L5)^2 + (a1-a5)^2 + (b1-b5)^2) + 0.5)$$
$$\text{Lint2}=(\text{int})(W/\text{sqrt}((L2-L6)^2 + (a2-a6)^2 + (b2-b6)^2) + 0.5)$$
$$\text{Lint3}=(\text{int})(W/\text{sqrt}((L3-L4)^2 + (a3-a4)^2 + (b3-b4)^2) + 0.5)$$

$$\text{Lint} = \text{Minimum value of Lint0 to Lint3}$$
$$(\text{where "0" shall be replaced with "1"}) \quad \ldots (15)$$
$$\text{aint0}=(\text{int})(W/\text{sqrt}((L0-L7)^2 + (a0-a7)^2 + (b0-b7)^2) + 0.5)$$
$$\text{aint1}=(\text{int})(W/\text{sqrt}((L1-L5)^2 + (a1-a5)^2 + (b1-b5)^2) + 0.5)$$
$$\text{aint2}=(\text{int})(W/\text{sqrt}((L2-L6)^2 + (a2-a6)^2 + (b2-b6)^2) + 0.5)$$
$$\text{aint3}=(\text{int})(W/\text{sqrt}((L3-L4)^2 + (a3-a4)^2 + (b3-b4)^2) + 0.5)$$
$$\text{aint} = \text{Minimum value of aint0 to aint3}$$
$$(\text{where "0" shall be replaced with "1"}) \quad \ldots (16)$$
$$\text{bint0}=(\text{int})(W/\text{sqrt}((L0-L7)^2 + (a0-a7)^2 + (b0-b7)^2) + 0.5)$$
$$\text{bint1}=(\text{int})(W/\text{sqrt}((L1-L5)^2 + (a1-a5)^2 + (b1-b5)^2) + 0.5)$$
$$\text{bint2}=(\text{int})(W/\text{sqrt}((L2-L6)^2 + (a2-a6)^2 + (b2-b6)^2) + 0.5)$$
$$\text{bint3}=(\text{int})(W/\text{sqrt}((L3-L4)^2 + (a3-a4)^2 + (b3-b4)^2) + 0.5)$$
$$\text{bint} = \text{Minimum value of bint0 to bint3}$$
$$(\text{where "0" shall be replaced with "1"}) \quad \ldots (17)$$

In the above equations, symbol W denotes a preset value, which is 32 here.

The minimum values "Lint", "aint" and "bint" evaluated by Eqs. (15) to (17) can be set as the generation intervals of the interpolation points.

Subsequently, the RGB-values (Rnew, Gnew, Bnew) of new color signals are calculated by interpolations. In the interpolative creation of the new color signals, a cube each side of which is W long is divided into eight cubes at the intervals (Lint, aint, bint) set by Eqs. (15) to (17). Besides, the interpolation points are generated in such a way that the volumes of the cubes obtained by the division are set as the weight coefficients of the eight color signals selected as the combination of colors.

Figure 26:
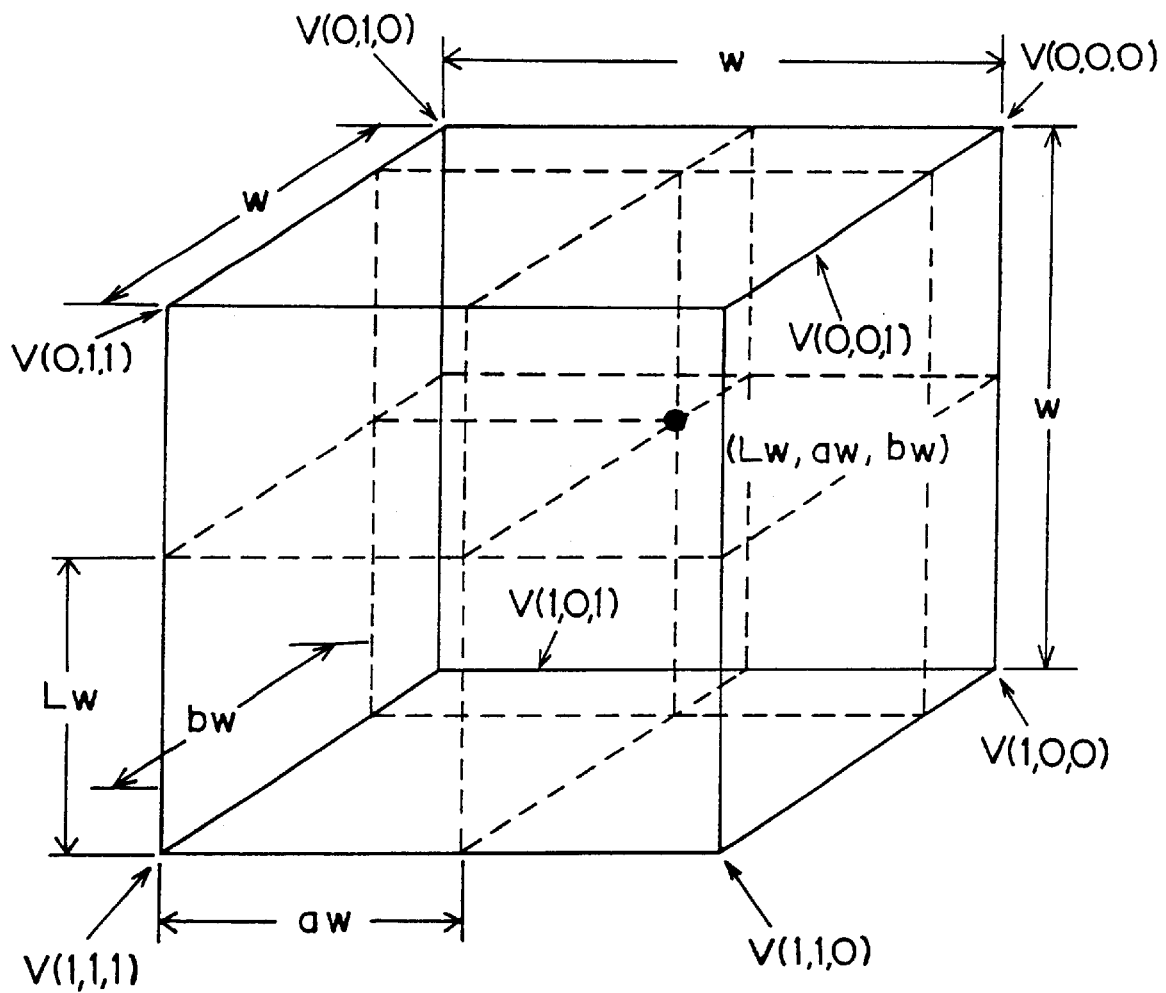
FIG. 26 is a diagram for explaining a method of calculating weight coefficients for use in a cube interpolation in accordance with one embodiment of the present invention.

FIG. 26 is a diagram for explaining a method of calculating weight coefficients for use in a cube interpolation in accordance with one embodiment of the present invention.

Referring to FIG. 26, a point O of values (Lw, aw, bw) in each of all the combinations of intervals "Lint" for "Lw", intervals "aint" for "aw" and intervals "bint" for "bw" is set in the ranges of $0 \leq Lw \leq W$, $0 \leq aw \leq W$ and $0 \leq bw \leq W$ inside a cube each side of which is W long. Further, the cube each side of which is W long is divided by planes which pass through the point O. On this occasion, the volumes V(0, 0, 0), V(1, 0, 0), V(0, 1, 0), V(0, 0, 1), V(0, 1, 1), V(1, 0, 1), V(1, 1, 0) and V(1, 1, 1) of the resulting cubes are given by the following equations:

$$V(0, 0, 0)=(W-Lw)\cdot(W-aw)\cdot(W-bw) \quad (18)$$

$$V(1, 0, 0)=Lw\cdot(W-aw)\cdot(W-bw) \quad (19)$$

$$V(0, 1, 0)=(W-Lw)\cdot aw\cdot(W-bw) \quad (20)$$

$$V(0, 0, 1)=(W-Lw)\cdot(W-aw)bw \quad (21)$$

$$V(0, 1, 1)=(W-Lw)aw\cdot bw \quad (22)$$

$$V(1, 0, 1)=Lw\cdot(W-aw)bw \quad (23)$$

$$V(1, 1, 0)=Lw\cdot aw\cdot(W-bw) \quad (24)$$

$$V(1, 1, 1)=Lw\cdot aw\cdot bw \quad (25).$$

In addition, the RGB-values (R0, G0, B0) to (R7, G7, B7) of eight color signals selected as the combination of colors are given by the following equations:

$$R0=\text{Rin}[\text{num0}], G0=\text{Gin}[\text{num0}], B0=\text{Bin}[\text{num0}] \quad (26)$$

$$R1=Rin[num1], G1=Gin[num1], B1=Bin[num1] \quad (27)$$

$$R2=Rin[num2], G2=Gin[num2], B2=Bin[num2] \quad (28)$$

$$R3=Rin[num3], G3=Gin[num3], B3=Bin[num3] \quad (29)$$

$$R4=Rin[num4], G4=Gin[num4], B4=Bin[num4] \quad (30)$$

$$R5=Rin[num5], G5=Gin[num5], B5=Bin[num5] \quad (31)$$

$$R6=Rin[num6], G6=Gin[num6], B6=Bin[num6] \quad (32)$$

$$R7=Rin[num7], G7=Gin[num7], B7=Bin[num7] \quad (33)$$

The RGB-values of the eight color signals selected as the combination of colors of Eqs. (26) to (33) are respectively multiplied by the weight coefficients of Eqs. (18) to (25). Thus, the RGB-values (Rnew, Gnew, Bnew) of the new color signals based on the interpolation can be obtained as follows:

$$\begin{aligned}
Rnew = &(R0 \cdot V(0,0,0) + R1 \cdot V(1,0,0) \\
&+ R2 \cdot V(0,1,0) + R3 \cdot V(0,0,1) \\
&+ R4 \cdot V(1,1,0) + R5 \cdot V(0,1,1) \\
&+ R6 \cdot V(1,0,1) + R7 \cdot V(1,1,1)) \\
&/ (W \cdot W \cdot W) \quad \ldots (34)
\end{aligned}$$

$$\begin{aligned}
Gnew = &(G0 \cdot V(0,0,0) + G1 \cdot V(1,0,0) \\
&+ G2 \cdot V(0,1,0) + G3 \cdot V(0,0,1) \\
&+ G4 \cdot V(1,1,0) + G5 \cdot V(0,1,1) \\
&+ G6 \cdot V(1,0,1) + G7 \cdot V(1,1,1)) \\
&/ (W \cdot W \cdot W) \quad \ldots (35)
\end{aligned}$$

$$\begin{aligned}
Bnew = &(B0 \cdot V(0,0,0) + B1 \cdot V(1,0,0) \\
&+ B2 \cdot V(0,1,0) + B3 \cdot V(0,0,1) \\
&+ B4 \cdot V(1,1,0) + B5 \cdot V(0,1,1) \\
&+ B6 \cdot V(1,0,1) + B7 \cdot V(1,1,1)) \\
&/ (W \cdot W \cdot W) \quad \ldots (36)
\end{aligned}$$

The calculations of Eqs. (34) to (36) are iterated at the intervals "Lint" for "Lw", intervals "aint" for "aw" and intervals "bint" for "bw" in the ranges of $0 \leq Lw \leq W$, $0 \leq aw \leq W$ and $0 \leq bw \leq W$. Thus, a plurality of interpolation points are generated in the range which is surrounded with the eight color signals selected as the combination of colors.

Subsequently, data are temporarily set.

In the temporary data setting, the RGB-values (Rnew, Gnew, Bnew) of the new interpolated color signals as obtained with Eqs. (34) to (36) are compared with the grid RGB-values (Rgrid, Ggrid, Bgrid) of the grid points as obtained with Eqs. (4) to (6). Besides, one nearest to the grid point is detected from among the new color signals generated by the interpolations, and the values (Lw, aw, bw) which were used for the generation of the detected color signal are found out.

More specifically, "diff" which denotes the square of a distance is calculated in accordance with the following equation:

$$\text{diff} = (Rgrid - Rnew)^2 + (Ggrid - Gnew)^2 + (Bgrid - Bnew)^2 \quad (37)$$

Further, on condition that no data are set for the grid point of grid number (Rnum, Gnum, Bnum) in terms of RGB-numbers (only at the first cycle of the calculation processing), or that the square of the distance, "diff" calculated anew is less than the square of a distance, "diffmin" already set, data are set as follows:

$$\text{diffmin} = \text{diff} \quad (38)$$

$$Lwmin = Lw \quad (39)$$

$$awmin = aw \quad (40)$$

$$bwmin = bw \quad (41)$$

Subsequently, data are formally set.

In the formal data setting, when the iterative processing till the temporary data setting has ended, values L[Rnum][Gnum][Bnum], a[Rnum][Gnum][Bnum] and b[Rnum][Gnum][Bnum] are calculated using the values Lwmin, awmin and bwmin obtained in accordance with Eqs. (39) to (41).

More specifically, the reference values (Lw, aw, bw) for dividing the cube each side of which is W long are set as follows:

$$Lw = Lwmin \quad (42)$$

$$aw = awmin \quad (43)$$

$$bw = bwmin \quad (44)$$

Besides, using the values (Lw, aw, bw) set by qs. (42) to (44), the volumes V(0, 0, 0), V(1, 0, 0), (0, 1, 0), V(0, 0, 1), V(0, 1, 1), V(1, 0, 1), V(1, 1, 0) and V(1, 1, 1) of the cube are evaluated in accordance with Eqs. (18) to (25).

Subsequently, the L*a*b*-values corresponding to the eight color signals selected as the combination of colors of Eqs. (7) to (14) are respectively multiplied by the weight coefficients obtained with Eqs. (18) to (25). Thus, the L*a*b*-values corresponding to the grid point of grid number (Rnum, Gnum, Bnum) in terms of RGB-numbers can be obtained in accordance with the following equations:

$$\begin{aligned}
&L[Rnum][Gnum][Bnum] \\
&= (L0 \cdot V(0,0,0) + L1 \cdot V(1,0,0) \\
&+ L2 \cdot V(0,1,0) + L3 \cdot V(0,0,1) \\
&+ L4 \cdot V(1,1,0) + L5 \cdot V(0,1,1) \\
&+ L6 \cdot V(1,0,1) + L7 \cdot V(1,1,1)) \\
&/ (W \cdot W \cdot W) \quad \ldots (45)
\end{aligned}$$

$$\begin{aligned}
&a[Rnum][Gnum][Bnum] \\
&= (a0 \cdot V(0,0,0) + a1 \cdot V(1,0,0) \\
&+ a2 \cdot V(0,1,0) + a3 \cdot V(0,0,1) \\
&+ a4 \cdot V(1,1,0) + a5 \cdot V(0,1,1) \\
&+ a6 \cdot V(1,0,1) + a7 \cdot V(1,1,1)) \\
&/ (W \cdot W \cdot W) \quad \ldots (46)
\end{aligned}$$

$$\begin{aligned}
&b[Rnum][Gnum][Bnum] \\
&= (b0 \cdot V(0,0,0) + b1 \cdot V(1,0,0) \\
&+ b2 \cdot V(0,1,0) + b3 \cdot V(0,0,1) \\
&+ b4 \cdot V(1,1,0) + b5 \cdot V(0,1,1) \\
&+ b6 \cdot V(1,0,1) + b7 \cdot V(1,1,1)) \\
&/ (W \cdot W \cdot W) \quad \ldots (47)
\end{aligned}$$

Figure 27:
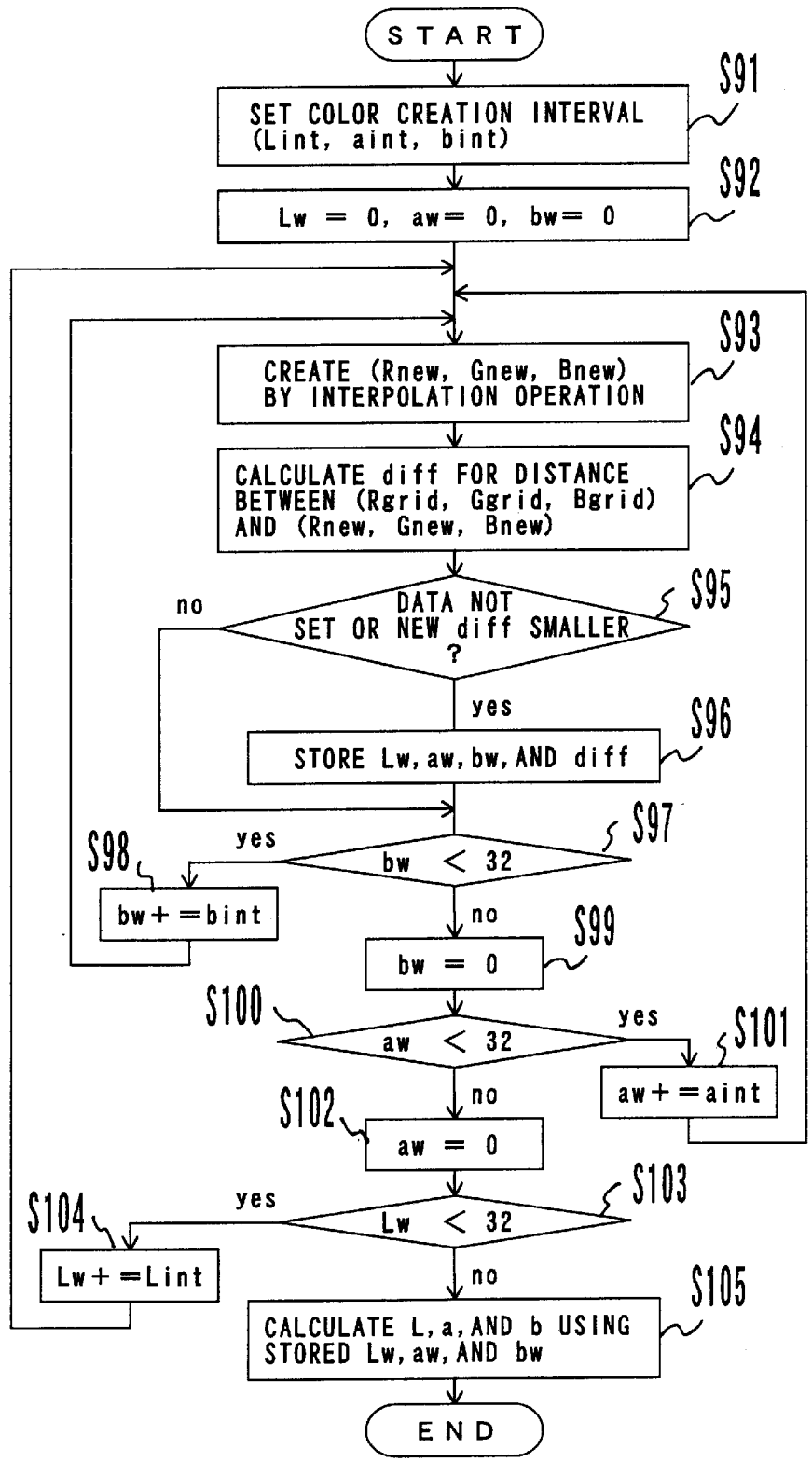
FIG. 27 is a flowchart showing a method of generating regular color signals by interpolations in accordance with the first embodiment of the present invention.

FIG. 27 is a flowchart showing a method of generating regular color signals by interpolations in accordance with the first embodiment of the present invention. Incidentally, the flowchart of FIG. 27 illustrates a case where reference values (Lw, aw, bw) for dividing a cube each side of which is 32 long are set at intervals "Lint" for the value Lw, at intervals "aint" for the value aw and at intervals "bint" for the value bw.

Referring to FIG. 27, the color creation intervals (Lint, aint, bint) are set in accordance with Eqs. (15) to (17) (step S91).

Subsequently, the reference values (Lw, aw, bw) for dividing the cube each side of which is 32 long are respectively set at zero (step S92).

At the next step, the weight coefficients of Eqs. (18) to (25) are calculated by dividing the cube according to the values (Lw, aw, bw). Besides, the RGB-values of eight color signals selected as the combination of colors with Eqs. (26) to (33) are respectively multiplied by the weight coefficients of Eqs. (18) to (25), thereby to calculate the RGB-values (Rnew, Gnew, Bnew) of a new color signal based on an interpolation operation (step S93).

The next step serves to calculate the square "diff" of the distance between the RGB-values (Rnew, Gnew, Bnew) of the new interpolated color signal as obtained at the step S93 and the grid RGB-values (Rgrid, Ggrid, Bgrid) of the grid point as obtained with Eqs. (4) to (6) (step S94).

Next, on condition that no data are set for the grid point of grid number (Rnum, Gnum, Bnum) in terms of RGB-numbers, or that the square of the distance, "diff" calculated anew is less than the square of a distance, "diffmin" already set (step S95), the reference values (Lw, aw, bw) for the division of the cube and the square of the distance, "diff" calculated anew are stored (step S96).

Thenceforth, the reference values (Lw, aw, bw) for the division of the cube are respectively incremented in accordance with the color creation intervals (Lint, aint, bint) until they reach at least 32, respectively (steps S97 to S104). Thus, the RGB-values (Rnew, Gnew, Bnew) of the new color signals are calculated by interpolation operations.

Subsequently, the weight coefficients of Eqs. (18) to (25) are calculated by dividing the cube according to the values (Lw, aw, bw) stored at the step S96. Besides, the L*a*b*-values of the eight color signals selected as the combination of colors with Eqs. (7) to (14) are respectively multiplied by the weight coefficients of Eqs. (18) to (25), thereby to calculate the L*a*b*-values corresponding to the grid point of the grid number (Rnum, Gnum, Bnum) in terms of RGB-numbers (step S105).

In the above way, a regularity table relevant to the grid points lying in the range of the actually measured RGB-values can be generated.

In the supplementation of the regularity table by extrapolations, when any grid point which could not be set by the interpolative generation of the regularity table has been detected while the grid points are being successively selected, the color signal of such a grid point is generated by extrapolating the color signals of the grid points already set. Here, for the grid point set by the interpolation operation or the extrapolation operation, processes for creating the color signals of the grid points outside the interpolated or extrapolated grid point are iterated, whereby color signals can be set for the grid points lying in the whole color reproduction range.

In the actual processing, grid points to be set are successively selected. In a case where no data are set for any grid point, it is checked if data are set for both the next or adjacent grid point to the particular grid point and the further next or adjacent grid point to the same. The checks are performed as to 26 directions in a predetermined sequence. Besides, the checks are continued till the detection of those next and further next grid points to the particular grid point for both of which the data are set. When the two grid points have been detected, the data of the selected grid point are generated by extrapolating the two data which are set for the two grid points.

When the above processing has been iterated for all grid points, data are set for grid points which correspond to one layer outside the set grid points. When the processing is iterated any number of times, the data of grid points can be set for any number of layers by extrapolations. Finally, therefore, data can be set for all the grid points of the RGB-space.

Thereafter, in a case where any set L*a*b*-values fall outside the color reproduction range, they are clipped. By way of example, set L*a*b*-values are all brought into the range of ($0 \leq L \leq 255$, $-128 \leq a \leq 127$ and $-128 \leq b \leq 127$).

Figure 28:
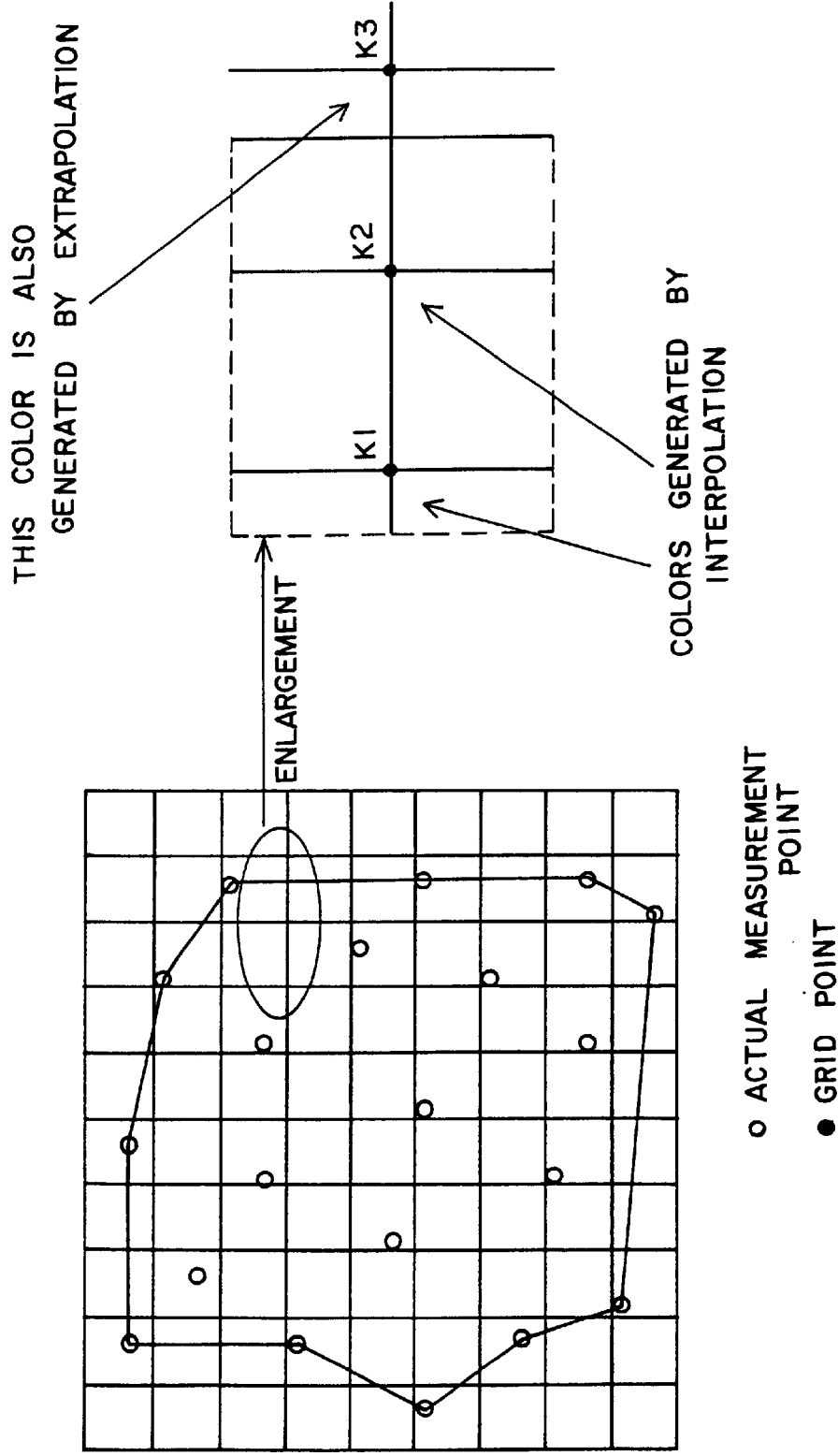
FIG. 28 is a diagram showing an extrapolation point generation method according to one embodiment of the present invention, in two dimensions on a color space.

FIG. 28 is a diagram showing a method of generating the RGB-values of a grid point by interpolation.

Referring to FIG. 28, when it is assumed that RGB-values obtained by an actual measurement be distributed on a color space, the range of the RGB-values of grid points generable by an interpolation operation or interpolative calculations lies inside a range surrounded with the actually measured RGB-values. The reason therefor is that the number of color signals in the range surrounded with the actually measured RGB-values are increased by the interpolative calculations, whereupon the color signals of the grid points are selected from among the interpolated color signals.

Accordingly, a regularity table for grid points in the whole color signal range of a device cannot be created in the mere way that the number of the color signals in the range surrounded with the RGB-values obtained by the actual measurement is increased by the interpolative calculations. Color signals are therefore supplemented by an extrapolation operation or extrapolative calculations, thereby to permit the creation of the regularity table for the grid points in the whole color signal range of the device.

For example, the color signal of a grid point K3 can be calculated outside the range of the actually measured RGB-values in such a way that an extrapolation is executed using two grid points K1 and K2 which lie at outer positions within the range of the actually measured RGB-values. Concretely, a color signal which is symmetric to a color signal correspondent to the grid point K1 (that directly adjoins the outermost grid point K2 inside this grid point K2) with respect to a color signal correspondent to the grid point K2 (that has had data set therefor at the outermost position) can be set as the color signal of the grid point K3.

FIG. 29 is a diagram showing on a three-dimensional space the positions of grid points K1 to K26 which are adjacent to a selected grid point O.

Referring to FIG. 29, the selected grid point O is adjoined by the 26 grid points K1 to K26 on the three-dimensional space. Therefore, 26 directions need to be examined in selecting the grid points K1 to K26 adjacent to the selected grid point O.

Figure 30:
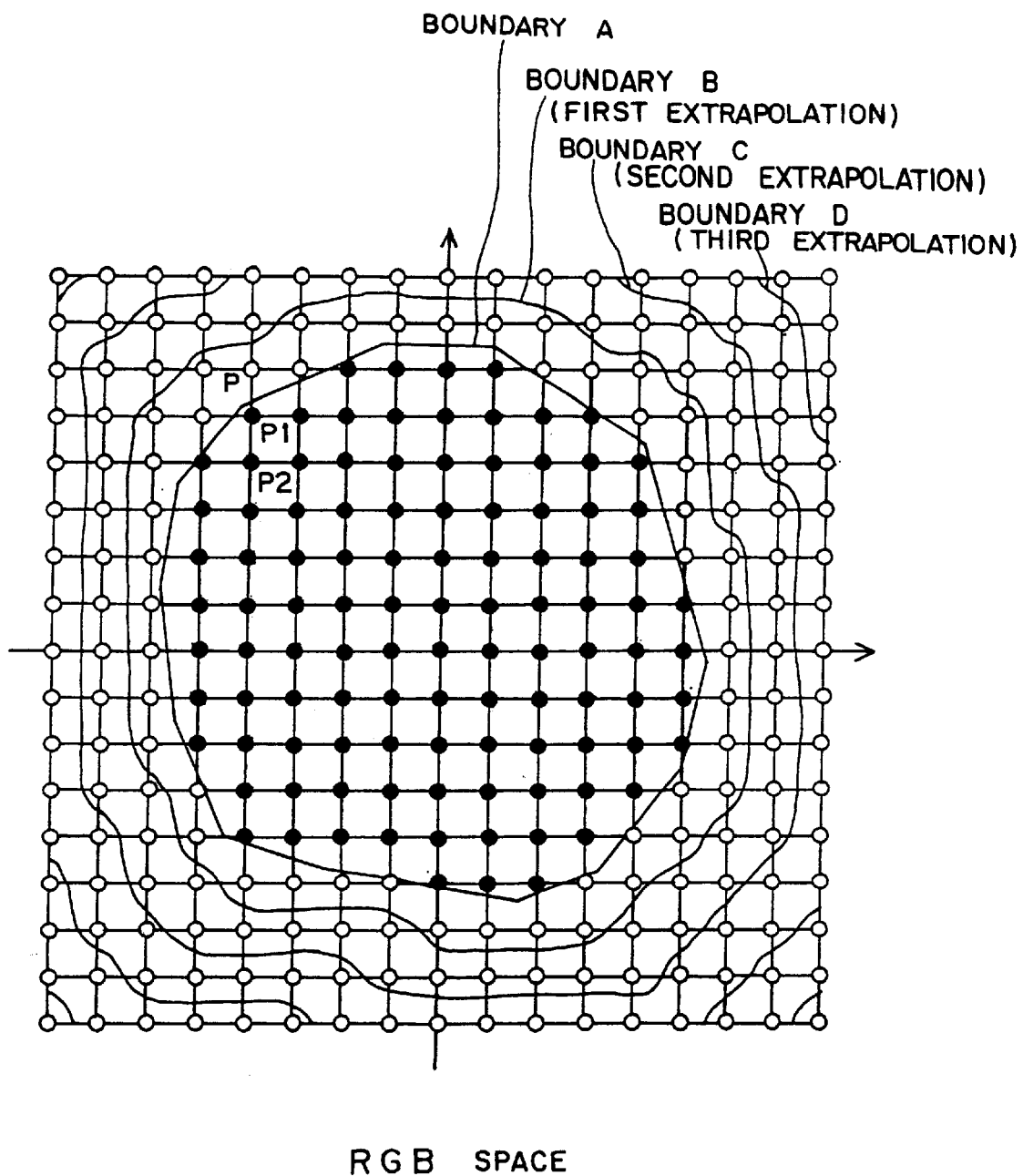
FIG. 30 is a diagram showing an extrapolation point selection process according to one embodiment of the present invention, in two dimensions on an RGB-space.

FIG. 30 is a diagram showing the distributions of grid points set by interpolations and grid points set by extrapolations.

In the example of FIG. 30, assuming that RGB-values obtained by an actual measurement be distributed inside a boundary A, grid points (black dots) lying inside the boundary A have data set by interpolations, and grid points (white dots) lying outside the boundary A have data set by extrapolations. In case of setting the data by the extrapolation, any grid point with no data set therefor as adjoins the grid points with the data set therefor is detected. Subsequently, the data of the grid point with no data set therefor are calculated using the data of the grid points with the data set therefor.

By way of example, in case of finding L*a*b*-values correspondent to a grid point P on an RGB-space, a grid point P1 next or adjacent to the grid point P and a grid point P2 further next or adjacent to the grid point P1 are picked out. It is assumed here that L*a*b*-values correspondent to the grid point P1 and L*a*b*-values correspondent to the grid point P2 have been already found by interpolative calculations. Subsequently, the L*a*b*-values correspondent to the grid point P are calculated using the known L*a*b*-values correspondent to the grid point P1 and correspondent to the grid point P2.

The above processing is executed for all the grid points of the RGB-space, whereby L*a*b*-values can be set for grid points which correspond to one layer inside a boundary B. Also, extrapolations are executed using the data of the grid points lying inside the boundary B, whereby L*a*b*-values can be set for grid points which correspond to one layer inside a boundary C. Further, extrapolations are executed using the data of the grid points lying inside the boundary C, whereby L*a*b*-values can be set for grid points which correspond to one layer inside a boundary D.

Figure 31:
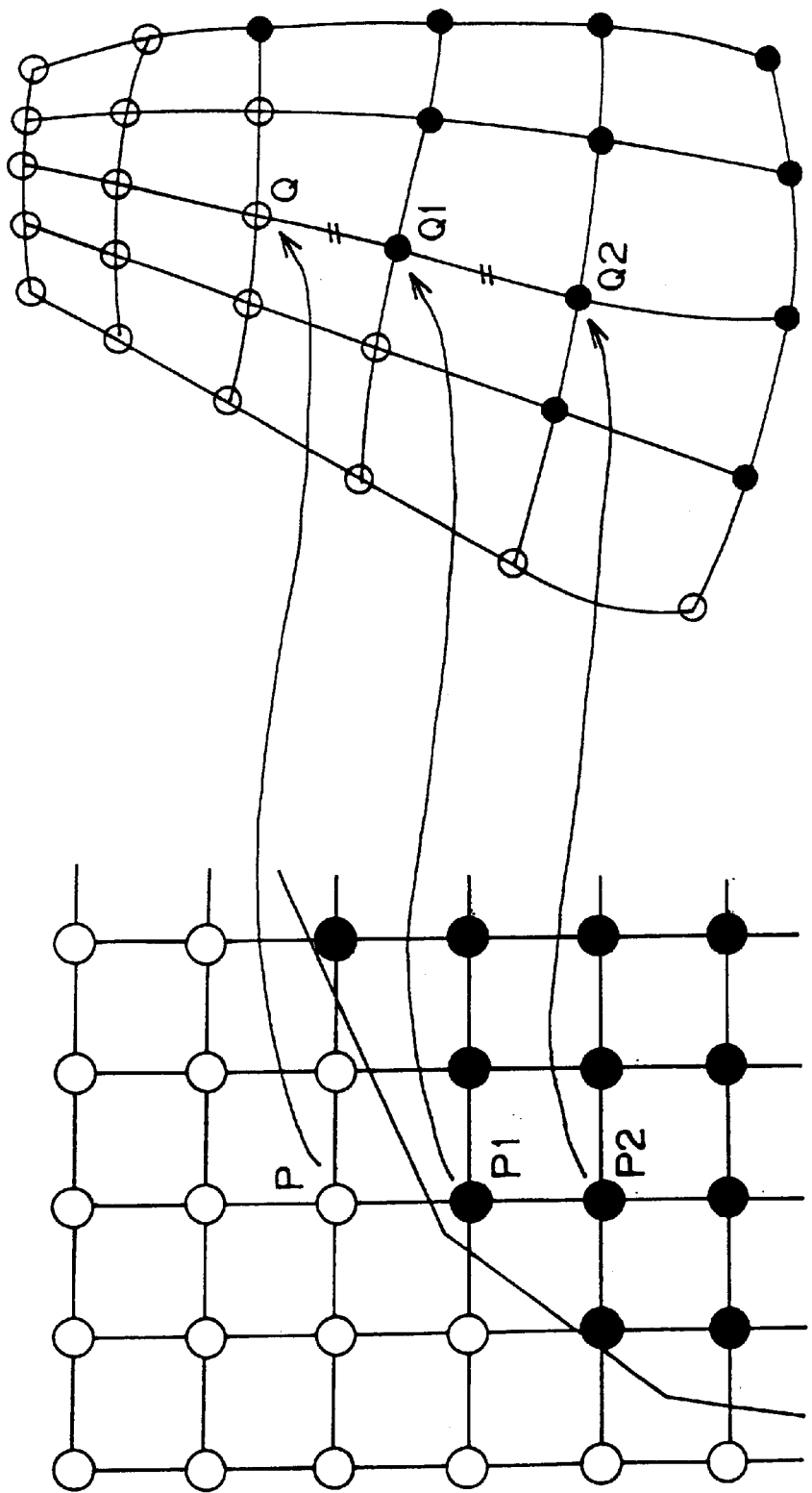
FIG. 31 is a diagram showing the correspondence relationships between RGB-signals and L*a*b*-signals in the case of extrapolation point generation according to one embodiment of the present invention.

FIG. 31 is a diagram for explaining a method of calculating the L*a*b*-values correspondent to the grid point P shown in FIG. 30, by the extrapolation.

Referring to FIG. 31, it is assumed that a grid point P1 on an RGB-space be next or adjacent to the grid point P, while a grid point P2 on the RGB-space be further next or adjacent to the grid point P. It is also assumed that the grid point P1 on the RGB-space correspond to a point Q1 on an L*a*b*-space, while the grid point P2 on the RGB-space correspond to a point Q2 on the L*a*b*-space. It is further assumed that the L*a*b*-values of the points Q1 and Q2 have been already found by interpolative calculations. On this occasion, the L*a*b*-values correspondent to the grid point P can be obtained as the L*a*b*-values of a point Q which is in point symmetry with the point Q2 about the point Q1.

An algorithm for supplementing the regularity table by the extrapolations will be explained as to sequential steps below.

As initialization, an extrapolation setting (extrapolation-already-set) flag is set to zero (extrapolation setting flag=0). The extrapolation setting flag serves to decide if data have been set for all grid points in the whole color signal range of a device. More specifically, data can be set for only one layer outside grid points for which data have been set, merely by scanning all the grid points in the whole color signal range of the device once. Accordingly, all the grid points in the whole color signal range of the device must be scanned many times in order to set the data for all these grid points. Therefore, if the data have been set for all the grid points in the whole color signal range of the device cannot be discriminated merely by judging if all these grid points have been selected.

Subsequently, the grid points of grid numbers (Rnum, Gnum, Bnum) are successively selected as to all the combinations of integral values in the ranges of $0 \leq \text{Rnum} < 17$, $0 \leq \text{Gnum} < 17$ and $0 \leq \text{Bnum} < 17$.

Besides, when the selection has been iterated for all the grid points, the extrapolation setting flag is checked. Subject to the extrapolation setting flag=1, the control flow of the algorithm returns to the initialization, and subject to the extrapolation setting flag=0, the entire process of the algorithm is ended.

Further, only in a case where data are not set for the grid point of the selected grid number (Rnum, Gnum and Bnum in terms of RGB-numbers), the subsequent processing is continued. On the other hand, in a case where data are not set for the grid point of the selected grid number (Rnum, Gnum and Bnum in terms of RGB-numbers), the next grid point is selected.

Subsequently, if data are set for adjacent and further adjacent grid points to the grid point of the selected grid number (Rnum, Gnum and Bnum in terms of RGB-numbers) is checked in each of 26 directions which are handled in a sequence as stated below. At the stage at which the grid point with data set therefor has been found out in any of the 26 directions, the RGB-numbers of the adjacent grid point are set at (Rnum1, Gnum1, Bnum1), and those of the further adjacent grid point are set at (Rnum2, Gnum2, Bnum2). Thereafter, the control flow proceeds to an extrapolation operation process.

By the way, in a case where the grid point with data set therefor has not been found out in any of the 26 directions, the next grid point is selected.

Here, the RGB-numbers (Rnum1, Gnum1, Bnum1) of the grid points K1 to K26 each being adjacent to the selected grid point O, and the RGB-numbers (Rnum2, Gnum2, Bnum2) of these grid points each being further adjacent to the selected grid point O, are expressed with the RGB-numbers (Rnum, Gnum, Bnum) of the selected grid point O by the following equations:

1) (Rnum1, Gnum1, Bnum1)
   =(Rnum+1, Gnum, Bnum)   (K1)
   (Rnum2, Gnum2, Bnum2)
   =(Rnum+2, Gnum, Bnum)

2) (Rnum1, Gnum1, Bnum1)
   =(Rnum−1, Gnum, Bnum)   (K2)
   (Rnum2, Gnum2, Bnum2)
   =(Rnum−2, Gnum, Bnum)

3) (Rnum1, Gnum1, Bnum1)
   =(Rnum, Gnum+1, Bnum)   (K3)
   (Rnum2, Gnum2, Bnum2)
   =(Rnum, Gnum+2, Bnum)

4) (Rnum1, Gnum1, Bnum1)
   =(Rnum, Gnum−1, Bnum1)   (K4)
   (Rnum2, Gnum2, Bnum2)
   =(Rnum, Gnum−2, Bnum)

5) (Rnum1, Gnum1, Bnum1)
   =(Rnum, Gnum, Bnum+1)   (K5)
   (Rnum2, Gnum2, Bnum2)
   =(Rnum, Gnum, Bnum+2)

6) (Rnum1, Gnum1, Bnum1)
   =(Rnum, Gnum, Bnum−1)   (K6)
   (Rnum2, Gnum2, Bnum2)
   =(Rnum, Gnum, Bnum−2)

7) (Rnum1, Gnum1, Bnum1)
   =(Rnum+1, Gnum+1, Bnum)   (K7)
   (Rnum2, Gnum2, Bnum2)
   =(Rnum+2, Gnum+2, Bnum)

8) (Rnum1, Gnum1, Bnum1)
   =(Rnum+1, Gnum−1, Bnum)   (K8)
   (Rnum2, Gnum2, Bnum2)
   =(Rnum+2, Gnum−2, Bnum)

9) (Rnum1, Gnum1, Bnum1)
   =(Rnum−1, Gnum+1, Bnum)   (K9)
   (Rnum2, Gnum2, Bnum2)
   =(Rnum−2, Gnum+2, Bnum)

10) (Rnum1, Gnum1, Bnum1)
    =(Rnum−1, Gnum−1, Bnum)   (K10)
    (Rnum2, Gnum2, Bnum2)
    =(Rnum−2, Gnum−2, Bnum)

11) (Rnum1, Gnum1, Bnum1)
    =(Rnum+1, Gnum, Bnum+1)   (K11)
    (Rnum2, Gnum2, Bnum2)
    =(Rnum+2, Gnum, Bnum+2)

12) (Rnum1, Gnum1, Bnum1)
    =(Rnum+1, Gnum, Bnum−1)   (K12)
    (Rnum2, Gnum2, Bnum2)
    =(Rnum−2, Gnum, Bnum−2)

13) (Rnum1, Gnum1, Bnum1)
    =(Rnum−1, Gnum, Bnum+1)   (K13)
    (Rnum2, Gnum2, Bnum2)
    =(Rnum−2, Gnum, Bnum+2)

14) (Rnum1, Gnum1, Bnum1)
    =(Rnum−1, Gnum, Bnum−1)   (K14)
    (Rnum2, Gnum2, Bnum2)
    =(Rnum−2, Gnum, Bnum−2)

15) (Rnum1, Gnum1, Bnum1)
    =(Rnum, Gnum+1, Bnum+1)   (K15)
    (Rnum2, Gnum2, Bnum2)
    =(Rnum, Gnum+2, Bnum+2)

16) (Rnum1, Gnum1, Bnum1)
    =(Rnum, Gnum+1, Bnum−1)   (K16)
    (Rnum2, Gnum2, Bnum2)
    =(Rnum, Gnum+2, Bnum−2)

17) (Rnum1, Gnum1, Bnum1)
    =(Rnum, Gnum−1, Bnum+1)   (K17)
    (Rnum2, Gnum2, Bnum2)
    =(Rnum, Gnum−2, Bnum+2)

-continued

| | | |
|---|---|---|
| 18) | (Rnum1, Gnum1, Bnum1)<br>=(Rnum, Gnum-1 Bnum-1)<br>(Rnum2, Gnum2, Bnum2)<br>=(Rnum, Gnum-2, Bnum-2) | (K18) |
| 19) | (Rnum1, Gnum1, Bnum1)<br>=(Rnum+1, Gnum+1, Bnum+1)<br>(Rnum2, Gnum2, Bnum2)<br>=(Rnum+2, Gnum+2, Bnum+2) | (K19) |
| 20) | (Rnum1, Gnum1, Bnum1)<br>=(Rnum+1, Gnum+1, Bnum-1)<br>(Rnum2, Gnum2, Bnum2)<br>=(Rnum+2, Gnum+2, Bnum-2) | (K20) |
| 21) | (Rnum1, Gnum1, Bnum1)<br>=(Rnum+1, Gnum-1, Bnum+1)<br>(Rnum2, Gnum2, Bnum2)<br>=(Rnum+2, Gnum-2, Bnum+2) | (K21) |
| 22) | (Rnum1, Gnum1, Bnum1)<br>=(Rnum+1, Gnum-1, Bnum-1)<br>(Rnum2, Gnum2, Bnum2)<br>=(Rnum+2, Gnum-2, Bnum-2) | (K22) |
| 23) | (Rnum1, Gnum1, Bnum1)<br>=(Rnum-1, Gnum+1, Bnum+1)<br>(Rnum2, Gnum2, Bnum2)<br>=(Rnum-2, Gnum+2, Bnum+2) | (K23) |
| 24) | (Rnum1, Gnum1, Bnum1)<br>=(Rnum-1, Gnum+1, Bnum-1)<br>(Rnum2, Gnum2, Bnum2)<br>=(Rnum-2, Gnum+2, Bnum-2) | (K24) |
| 25) | (Rnum1, Gnum1, Bnum1)<br>=(Rnum-1, Gnum-1, Bnum+1)<br>(Rnum2, Gnum2, Bnum2)<br>=(Rnum-2, Gnum-2, Bnum+2) | (K25) |
| 26) | (Rnum1, Gnum1, Bnum1)<br>=(Rnum-1, Gnum-1, Bnum-1)<br>(Rnum2, Gnum2, Bnum2)<br>=(Rnum-2, Gnum-2, Bnum-2) | (K26) |

In this manner, the grid points adjoining the selected grid point O lie in the 26 directions and are successively checked in the above sequence 1) to 26). Incidentally, the sequence is a mere example, and any other sequence may well be employed.

Subsequently, in the extrapolation operation process, $L^*a^*b^*$-values correspondent to the grid point of the RGB-numbers (Rnum1, Gnum1, Bnum1) and $L^*a^*b^*$-values correspondent to the grid point of the RGB-numbers (Rnum2, Gnum2, Bnum2) are acquired by referring to the regularity table generated by the interpolations. Besides, $L^*a^*b^*$-values which are symmetric with the $L^*a^*b^*$-values correspondent to the grid point of the RGB-numbers (Rnum2, Gnum2, Bnum2), about the $L^*a^*b^*$-values correspondent to the grid point of the RGB-numbers (Rnum1, Gnum1, Bnum1), are calculated in accordance with the following equations:

$$L[Rnum][Gnum][Bnum]$$
$$=L[Rnum1][Gnum1][Bnum1]\cdot 2$$
$$-L[Rnum2][Gnum2][Bnum2] \quad \ldots (48)$$
$$a[Rnum][Gnum][Bnum]$$
$$=a[Rnum1][Gnum1][Bnum1]\cdot 2$$
$$-a[Rnum2][Gnum2][Bnum2] \quad \ldots (49)$$
$$b[Rnum][Gnum][Bnum]$$
$$=b[Rnum1][Gnum1][Bnum1]\cdot 2$$
$$-b[Rnum2][Gnum2][Bnum2] \quad \ldots (50)$$

In addition, the values calculated by Eqs. (48) to (50):

L[Rnum][Gnum][Bnum]
a[Rnum][Gnum][Bnum]
b[Rnum][Gnum][Bnum]

are registered in the regularity table as the $L^*a^*b^*$-values correspondent to the grid point of the RGB-numbers (Rnum, Gnum, Bnum). At this time, the extrapolation setting flag=1 is set.

$L^*a^*b^*$-values for all the grid points can be set by the above processing.

Subsequently, after the values of all the grid points have been set, the $L^*a^*b^*$-values are clipped in accordance with the following equations:

if 0>L then L=0 if 100<L then L=100 if −128>a then a=−128 if 127<a then a=127 if −128>b then b=−128 if 127<b then b=127

Owing to the above processing, the regularity table can be efficiently generated without redoing the selection of the color signals for use in the interpolative calculations.

Figure 32:
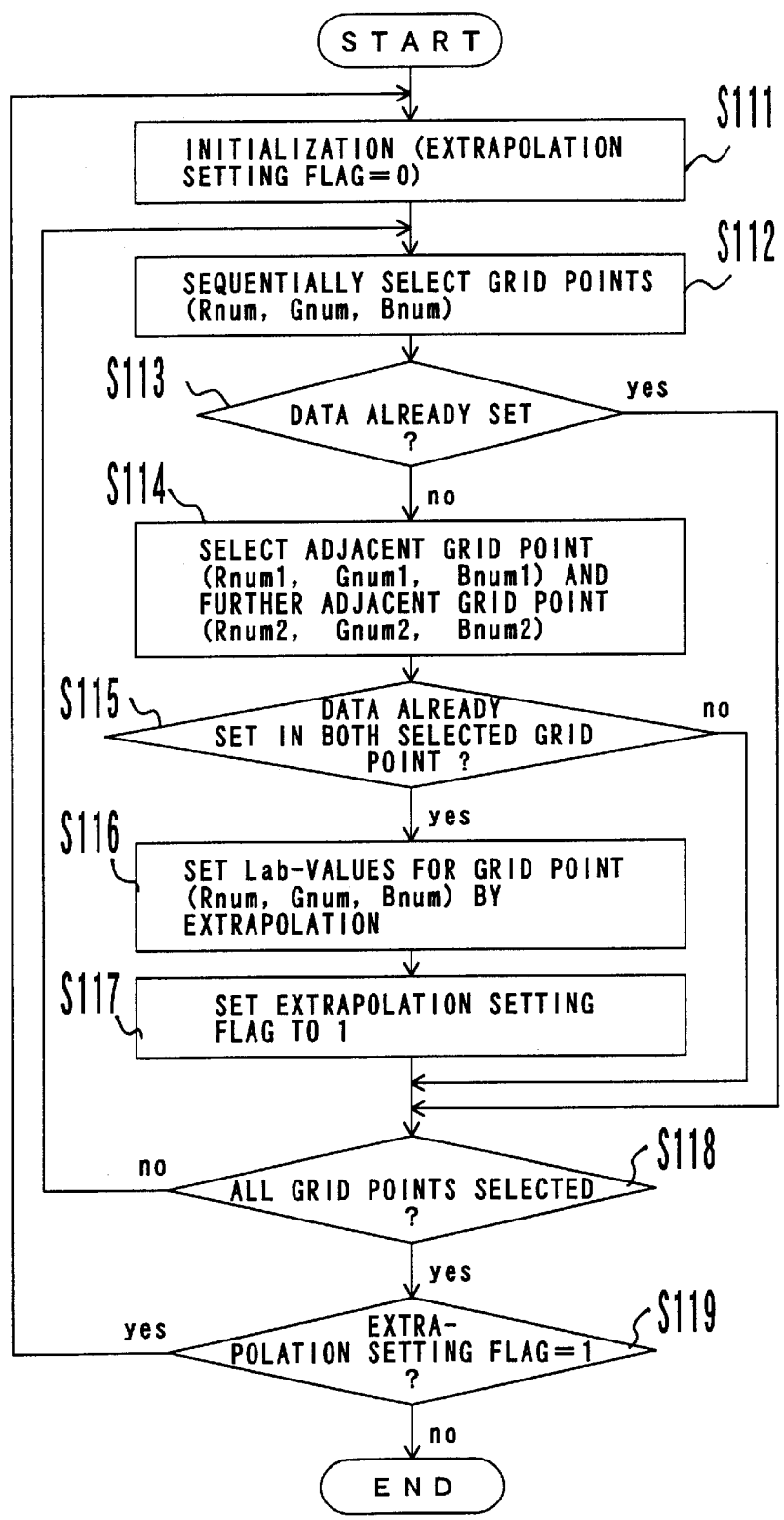
FIG. 32 is a flowchart showing a method of generating regular color signals by extrapolations in accordance with one embodiment of the present invention.

FIG. 32 is a flowchart showing an extrapolation process according to one embodiment of the present invention.

Referring to FIG. 32, an extrapolation setting (extrapolation-already-set) flag is set to zero (extrapolation setting flag=0) as initialization (step S111). In the initial state of the extrapolation process, data are set for only grid points which lie in a range surrounded with actual measurement points.

Subsequently, each grid point on an RGB-space is selected by selecting RGB-numbers (Rnum, Gnum, Bnum) (step S112), and if data are set for the selected grid point is checked (step S113). On condition that no data are set for the selected grid point, a data setting process is executed.

In the data setting process, a grid point being next or adjacent to the selected grid point and a grid point being further next or adjacent thereto are selected (step S114), and if data have already been set for both the grid points being adjacent and further adjacent to the selected grid point is checked (step S115). Here, the RGB-numbers of the adjacent grid point and those of the further adjacent grid point shall be respectively denoted by (Rnum1, Gnum1, Bnum1) and (Rnum2, Gnum2, Bnum2).

Besides, in a case where the data of the grid points being adjacent and further adjacent to the selected grid point have been set in any of 26 directions, an extrapolative calculation process is executed using the data of the adjacent and further adjacent grid points, whereby $L^*a^*b^*$-values correspondent to the selected grid point are calculated (step S116), and the extrapolation setting flag is set to one (extrapolation setting flag=1) (step S117).

In contrast, in a case where the data of the grid points being adjacent and further adjacent to the selected grid point have not been set in any of the 26 directions, the control flow of the extrapolation process returns to the step S112 for selecting the next grid point of the RGB-space, on condition that all the grid points have not been selected yet (step S118).

In a case where the first time of selection of all the grid points has ended (step S118) and where the extrapolation setting flag is one (step S119), the control flow returns to the step S111, and the second time of selection of all the grid points is done, so as to set the data of the grid points on the still outer side of the grid points set anew. When the data of all the grid points of the RGB-space have been set by iterating the above processing, the extrapolation setting flag is judged zero at the step S119, and the entire extrapolation process is ended.

Now, a table transformation method according to the second embodiment of the present invention will be described. The table transformation method according to the second embodiment transforms an irregularity table into a regularity table in conformity with a tetrahedron interpolation.

The processing steps of the second embodiment consist of three stages; the "creation of the combination of colors", the "generation of the regularity table by interpolations" and the "supplementation of the regularity table by extrapolations".

In the creation of the combination of colors, the color signals of the irregularity table surrounding grid RGB-values are obtained as to respective grid points. Here, four color signals are selected as to one grid point. Incidentally, the four color signals shall be called the "combination of colors" below.

The combination of colors is generated in such a way that, while the grid RGB-values to be generated as the regularity table are being successively selected, the four color signals (the scanner input values and the color measurement values of a target) around the grid point of the grid RGB-values are selected from within the irregularity table. Here, in order to efficiently select the four color signals surrounding the grid point, a color space is not fixedly split, but coordinate axes are rotated in accordance with the distribution of color signals, and the color space is split on the basis of the relationships in the magnitudes of coordinate values concerning the rotated coordinate axes.

An algorithm for creating the combination of colors will be explained as to sequential steps below.

As initialization, RGB-values and L*a*b*-values registered in the irregularity table are set in an array.

That is, the RGB-values and L*a*b*-values registered in the irregularity table are set in the array; Lin[i], ain[i], bin[i], Rin[i], Gin[i] and Bin[i]. Here, the color number i of a patch lies within $0 \leq i <$ (the number of colors).

Subsequently, the color signals of the grid points of an RGB-space are successively selected by successively designating grid numbers.

That is, the Rgrid-values, Ggrid-values and Bgrid-values are successively set in accordance with Eqs. (4) to (6) mentioned before.

Subsequently, the RGB-space is split into four areas about each of the grid points, and the color signals of the irregularity table lying at the shortest distances from the grid point are selected from within the respective areas.

Here, the splitting of the RGB-space into the four areas is based on a rotated coordinate system. More specifically, the first color signal of the irregularity table being nearest to the grid point is selected.

Subsequently, the R-axis is rotated so that the first color signal may have a minus value on the R-axis.

Selected next is the second color signal of the irregularity table being nearest to the origin in a range in which an R-value after the rotation is plus.

Next, the G-axis is rotated so that the second color signal may come into an area of minus G-values on an RG-plane.

Next, colors nearest to the grid point are respectively selected from within an area in which the R- and G-values are plus and in which B-values are zero or above, and an area in which the R- and G-values are plus and in which the B-values are minus.

The color numbers of the four color signals selected by the above processing are respectively retained in numbers "num1" to "num4".

Incidentally, the next step, namely, the generation of the regularity table by interpolations is executed only in a case where all the color numbers "num1" to "num4" have been successfully set, and the control flow of the algorithm returns to the selection of the grid point in a case where any color signal cannot be set.

In the generation of the regularity table by interpolations, a large number of new correspondence relationships of color signals are created by interpolating the combinations of colors, and the L*a*b*-values corresponding to the RGB-values near the grid points of the RGB-space among the created color signals are registered.

By the way, since data to be created are the L*a*b*-values corresponding to the RGB-numbers (Rnum, Gnum, Bnum) of the grid points, the actual format of the created data become the following three-dimensional array:

L[Rnum][Gnum][Bnum],
a[Rnum][Gnum][Bnum],
b[Rnum][Gnum][Bnum].

An algorithm for generating the regularity table by the interpolations will be explained referring to sequential steps below. In this embodiment, simple processing preferred, and the generation intervals of color signals are fixed.

In the first place, the RGB-values (Rnew, Gnew, Bnew) of new color signals are calculated by interpolations. In the interpolative creation of the new color signals, weight coefficients V1 to V4 relevant to the four color signals having the color numbers "num1" to "num4" are created by a procedure below.

The weight coefficients V1 satisfying the following equation are successively set:

$$0 \leq V1 \leq W \tag{51}$$

The weight coefficients V2 satisfying the following equation are successively set:

$$0 \leq V2 \leq W-V1 \tag{52}$$

The weight coefficients V3 satisfying the following equation are successively set:

$$0 \leq V3 \leq W-(V1+V2) \tag{53}$$

The weight coefficient V4 is set in accordance with:

$$V4 = W-(V1+V2+V3) \tag{54}$$

Here, the value W is set to 32 by way of example.

Besides, the RGB-values (R1, G1, B1) to (R4, G4, B4) of the four color signals having the color numbers "num1" to "num4" are given by the following equations:

$$R1 = Rin[num1], G1 = Gin[num1], B1 = Bin[num1] \tag{55}$$

$$R2 = Rin[num2], G2 = Gin[num2], B2 = Bin[num2] \tag{56}$$

$$R3 = Rin[num3], G3 = Gin[num3], B3 = Bin[num3] \tag{57}$$

$$R4 = Rin[num4], G4 = Gin[num4], B4 = Bin[num4] \tag{58}$$

Subsequently, the RGB-values of the four color signals selected as the combination of colors with Eqs. (55) to (58) are respectively multiplied by the weight coefficients V1 to V4 set with Eqs. (51) to (54). Thus, the RGB-values (Rnew, Gnew, Bnew) of a new color signal based on an interpolation operation can be obtained as follows:

$$Rnew=(R1 \cdot V1+R2 \cdot V2+R3 \cdot V3+R4 \cdot V4)/W \qquad (59)$$

$$Gnew=(G1 \cdot V1+G2 \cdot V2+G3 \cdot V3+G4 \cdot V4)/W \qquad (60)$$

$$Bnew=(B1 \cdot V1+B2 \cdot V2+B3 \cdot V3+B4 \cdot V4)/W \qquad (61)$$

The calculations of Eqs. (59) to (61) are iterated for all the weight coefficients V1 to V4 set by Eqs. (51) to (54). Thus, a plurality of interpolation points are generated in the range which is surrounded with the four color signals selected as the combination of colors.

Subsequently, data are temporarily set.

In the temporary data setting, the RGB-values (Rnew, Gnew, Bnew) of the new interpolated color signals as obtained with Eqs. (59) to (61) are compared with the grid RGB-values (Rgrid, Ggrid, Bgrid) of the grid points as obtained with Eqs. (4) to (6). Besides, one nearest to the grid point is detected from among the new color signals generated by the interpolations, and the weight coefficients V1 to V4 which were used for the generation of the detected color signal are selected.

More specifically, "diff" which denotes the square of a distance is calculated in accordance with the following equation:

$$diff=(Rgrid-Rnew)^2+(Ggrid-Gnew)^2+(Bgrid-Bnew)^2$$

Further, on condition that no data are set for the grid point of grid number (Rnum, Gnum, Bnum) in terms of RGB-numbers (only at the first cycle of the calculation processing), or that the square of the distance, "diff" calculated anew is less than the square of a distance, "diffmin" already set, data are set as follows:

$$diffmin=diff \qquad (62)$$

$$V1min=V1 \qquad (63)$$

$$V2min=V2 \qquad (64)$$

$$V3min=V3 \qquad (65)$$

$$V4min=V4 \qquad (66)$$

Subsequently, data are formally set.

In the formal data setting, when the interactive processing till the temporary data setting has changed, values L[Rnum][Gnum][Bnum], a[Rnum][Gnum][Bnum] and b[Rnum][Gnum][Bnum] are calculated using the data V1min–V4min obtained in accordance with Eqs. (63)–(66).

More specifically, the weight coefficients V1–V4 for calculating the values L[Rnum][Gnum][Bnum], a[Rnum][Gnum][Bnum] and b[Rnum][Gnum][Bnum] are set as follows:

$$V1=V1min \qquad (67)$$

$$V2=V2min \qquad (68)$$

$$V3=V3min \qquad (69)$$

$$V4=V4min \qquad (70)$$

Besides, the L*a*b*-values (L1, a1, b1) to (L4, a4, b4) of the four color signals having the color numbers "num1" to "num4" are given by the following equations:

$$L1=Lin[num1], a1=ain[num1], b1=bin[num1] \qquad (71)$$

$$L2=Lin[num2], a2=ain[num2], b2=bin[num2] \qquad (72)$$

$$L3=Lin[num3], a3=ain[num3], b3=bin[num3] \qquad (73)$$

$$L4=Lin[num4], a4=ain[num4], b4=bin[num4] \qquad (74)$$

Subsequently, the L*a*b*-values of Eqs. (71) to (74) are respectively multiplied by the weight coefficients V1 to V4 obtained with Eqs. (67) to (70). Thus, the L*a*b*-values corresponding to the grid point of the grid number (Rnum, Gnum, Bnum) in terms of RGB-numbers can be obtained in accordance with the following equations:

$$L[Rnum][Gnum][Bnum]=(L1 \cdot V1+L2 \cdot V2+L3 \cdot V3+L4 \cdot V4)/W \qquad (75)$$

$$a[Rnum][Gnum][Bnum]=(a1 \cdot V1+a2 \cdot V2+a3 \cdot V3+a4 \cdot V4)/W \qquad (76)$$

$$b[Rnum][Gnum][Bnum]=(b1 \cdot V1+b2 \cdot V2+b3 \cdot V3+b4 \cdot V4)/W \qquad (77)$$

Figure 33:
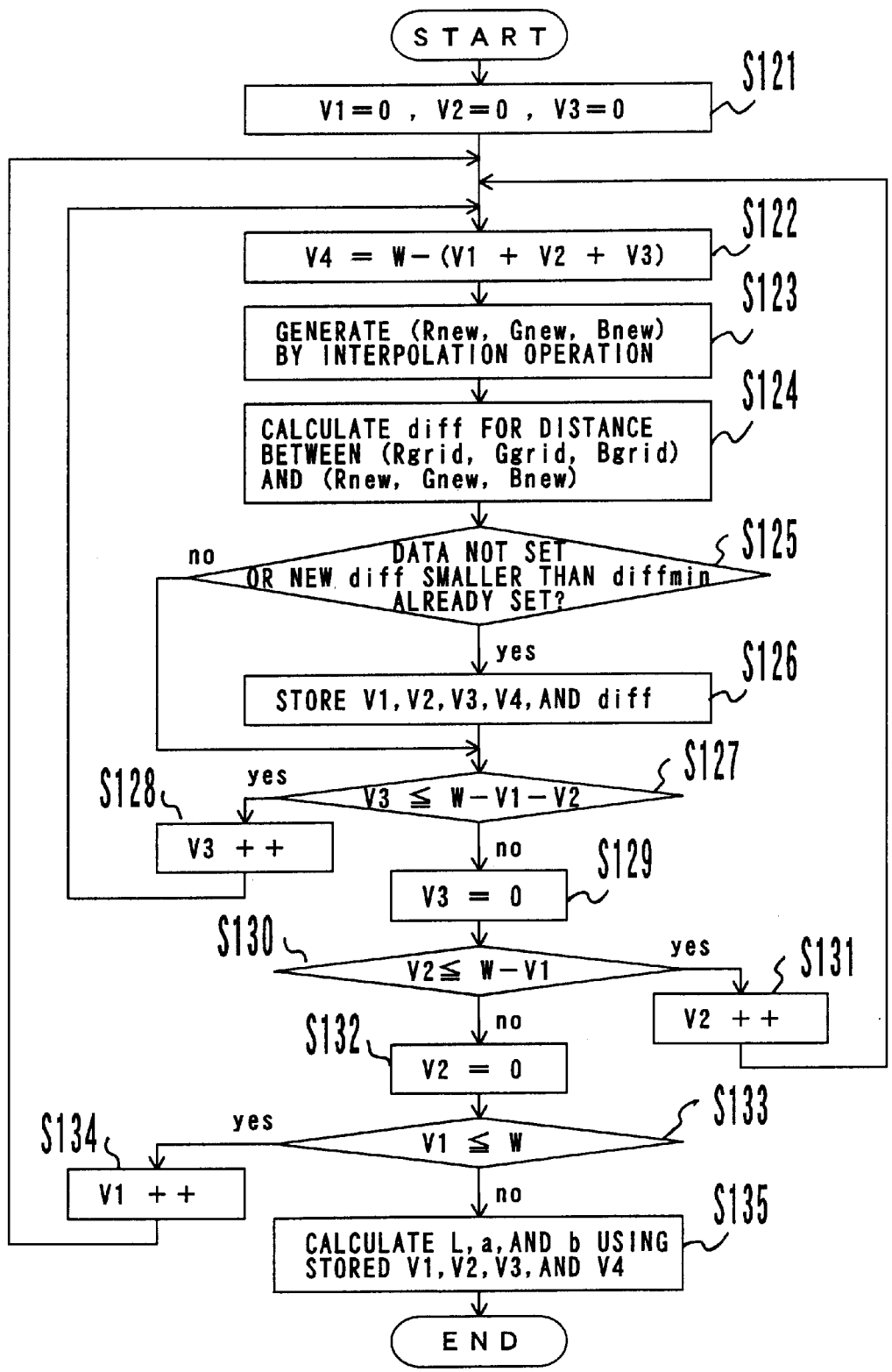
FIG. 33 is a flowchart showing a method of generating regular color signals by interpolations in accordance with the second embodiment of the present invention.

FIG. 33 is a flowchart showing a method of generating regular color signals by interpolations in accordance with the second embodiment of the present invention.

Referring to FIG. 33, weight coefficients V1 to V3 are set to zero (step S121), and a weight coefficient V4 is set to [W−(V1+V2+V3)] (step S122).

Subsequently, the RGB-values of four color signals selected as the combination of colors with Eqs. (55) to (58) are respectively multiplied by the weight coefficients V1 to V4, whereby the RGB-values (Rnew, Gnew, Bnew) of a new color signal based on an interpolation operation are calculated (step S123).

The next step serves to calculate the square "diff" of the distance between the RGB-values (Rnew, Gnew, Bnew) of the new interpolated color signal as obtained at the step S123 and the grid RGB-values (Rgrid, Ggrid, Bgrid) of the grid point as obtained with Eqs. (4) to (6) (step S124).

Next, on condition that no data are set for the grid point of grid number (Rnum, Gnum, Bnum) in terms of RGB-numbers, or that the square of the distance, "diff" calculated anew is less than the square of a distance, "diffmin" already set (step S125), the weight coefficients V1 to V4 of the new color signal and the square of the distance, "diff" calculated anew are stored (step S126).

Thenceforth, the values of the weight coefficients V1 to V3 are respectively incremented until the weight coefficient V3 reaches (W−V1−V2), the weight coefficient V2 reaches (W−V1), and the weight coefficient V1 reaches W (steps S127 to S134). Thus, the RGB-values (Rnew, Gnew, Bnew) of the new color signals are calculated by interpolation operations.

Subsequently, the L*a*b*-values of the four color signals selected as the combination of colors with Eqs. (71) to (74) are respectively multiplied by the weight coefficients V1 to V4 stored at the step S126, thereby to calculate L*a*b*-values corresponding to the grid point of the grid number (Rnum, Gnum, Bnum) in terms of RGB-numbers (step S135). When the generation of the regularity table by the interpolations has ended, the regularity table is supplemented by extrapolations. The supplementation of the regularity table by the extrapolations can be executed by the same method as in the first embodiment.

Now, a table transformation method according to the third embodiment of the present invention will be described. The table transformation method according to the third embodiment transforms an irregularity table into a regularity table in conformity with an 8-point interpolation, and makes it possible to set a reference point for splitting an RGB-space so as to be different from a grid point to-be-interpolated. More specifically, a reference color signal for selecting a combination of color signals is set at values which are other than grid RGB-values to be generated as the regularity table.

By way of example, in a case where the intervals of grid RGB-values are extraordinarily smaller as compared with the intervals of the colors of the irregularity table, the same combination of color signals is repeatedly selected very often for different grid RGB-values which are used as the reference grid RGB-values. Even when the same combination of color signals is repeatedly selected very often, interpolation processing can be executed. In this case, however, the same calculations recur for the same combination of color signals many times, so that the efficiency of the interpolative generation of the regularity table might worsen.

According to the method of the third embodiment, therefore, the combination of colors is selected with reference to, for example, the RGB-values of grid intervals which are somewhat greater than the intervals of the grid RGB-values. Thus, it is relieved to repeatedly select the same combination of color signals very often, and it is permitted to more efficiently generate the regularity table by the interpolations.

Meanwhile, in a case where colors are generated for all color signals by increasing the number of colors by interpolative calculations, any omission might occur in color signals to-be-generated on account of the selection of very close data items. By way of example, in a case where a large number of color signals distributed over the whole data distribution range of the irregularity table are to be generated by creating the combinations of the data items of the irregularity table and using them for the interpolations, ranges surrounded with selected color signals may well overlap partly. However, when there is an area which is not surrounded with any of the combinations of color signals, the color signal of the area not surrounded cannot be generated.

Accordingly, a threshold value is set for the selection of color signals, thereby to prevent the very close data items from being selected. Moreover, each range to be surrounded may well be endowed with a certain extent or size, thereby to prevent any omission from occurring in the ranges which are surrounded with the combinations of color signals.

Figure 34:
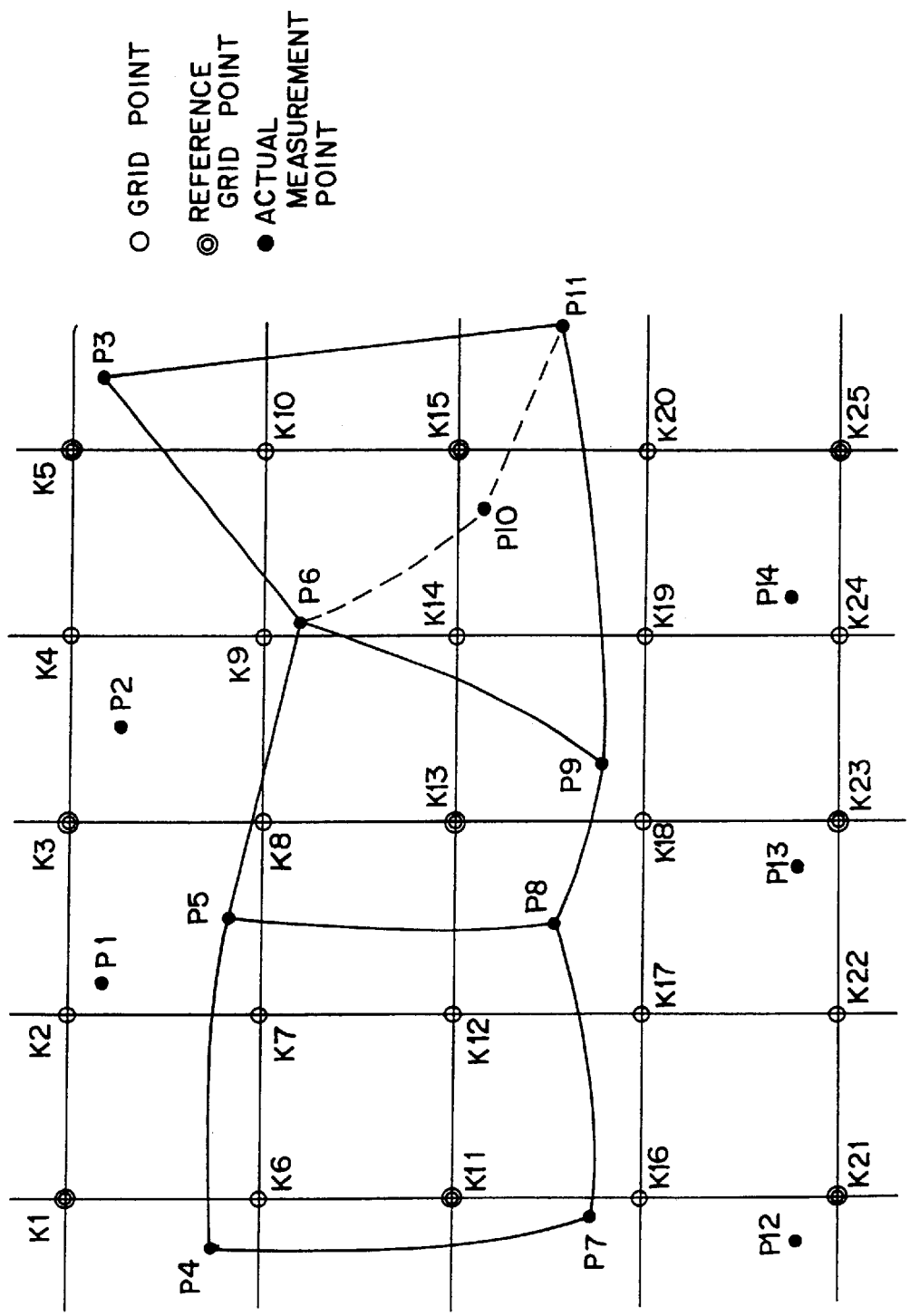
FIG. 34 is a diagram showing on a color space a method of generating regular color signals by interpolations in accordance with the third embodiment of the present invention.

FIG. 34 is a diagram showing on a color space a method of generating regular color signals by interpolations in accordance with the third embodiment of the present invention.

Referring to FIG. 34, it is assumed that color signals registered in an irregularity table be distributed at points P1 to P14 on a color space. Here, it is assumed that the values of color signals corresponding to grid points K1 to K25 on the color space be obtained by interpolations. In this case, the color space is split with a reference point set at the grid point (each of the grid points K1 to K25) on the color space, and color signals for use in the interpolation are selected.

Herein, in a case where the points P4, P5, P7 and P8 on the color space are selected for the grid points K6, K7, K11 and K12, and where the operations of the interpolative generation of a regularity table are executed for the respective grid points K6, K7, K11 and K12 independently of one another, the same interpolative calculations recur many times. By way of example, in a case where the RGB-values (Rnew, Gnew, Bnew) of a new color signal based on the interpolation are generated by employing Eqs. (34) to (36) or Eqs. (59) to (61), such RGB-values (Rnew, Gnew, Bnew) become the same for all the grid points K6, K7, K11 and K12.

In this embodiment, therefore, reference points for splitting the color space are set at intervals which are, for example, double the grid intervals of the grid points K1 to K25 to-be-interpolated. That is, the grid points K1, K3, K5, K11, K13, K15, K21, K23 and K25 are set as the reference points for splitting the color space. Here, when the grid point K11 is the reference point for splitting the color space, the points P4, P5, P7 and P8 on the color space are selected for this grid point K11.

Besides, the RGB-values (Rnew, Gnew, Bnew) of new color signals based on interpolations are collectively generated as to the grid points K6, K7, K11 and K12 lying in a range surrounded with the selected points P4, P5, P7 and P8, and RGB-values (Rnew, Gnew, Bnew) near the respective grid points K6, K7, K11 and K12 are detected from among the interpolated RGB-values (Rnew, Gnew, Bnew) of the new color signals generated collectively.

Thus, it can be suppressed that the same interpolative calculations for the different grid points K6, K7, K11 and K12 recur many times, and it is permitted to more efficiently generate the regularity table based on the interpolations.

Also, when the grid point K13 is the reference point for splitting the color space, the points P5, P6, P8 and P9 on the color space are selected as points nearest to this grid point K13 from within split color subspaces.

Also, when the grid point K15 is the reference point for splitting the color space, the points P3, P6, P10 and P11 on the color space are selected as points nearest to this grid point K15 from within split color subspaces.

In the illustrated example, the grid point K14 to be interpolated cannot be surrounded with the points P5, P6, P8 and P9 selected with reference to the grid point K13 or with the points P3, P6, P10 and P11 selected with reference to the grid point K15, and interpolative calculations cannot be executed for this grid point K14. Therefore, any grid point different from the grid points K1 to K25 to be interpolated may be set as a reference point for splitting the color space. On this occasion, a threshold value for the selection of color signals is set so as not to select very close data items. By way of example, in the case of selecting color signals with reference to the grid point K15, the point P9 is selected instead of the point P10 lying near this grid point K15, on the basis of the threshold value.

Thus, an area surrounded with the points P3, P6, P9 and P11 selected with reference to the grid point K15 has a larger size, and the grid point K14 comes to be surrounded with these selected points P3, P6, P9 and P11. As a result, even in the case where the grid point K15 different from the grid point K14 to be interpolated is set as the reference point for splitting the color space, the interpolative calculations for the grid point K14 to be interpolated can be prevented from becoming impossible.

The processing steps of the third embodiment of the color signal generation method consist of four stages; the "creation of the combinations of colors", the "generation of a regularity table by interpolations (preprocessing)", the "generation of a regularity table by interpolations (postprocessing)" and the "supplementation of the regularity table by extrapolations".

Also in the third embodiment, the generation of a regularity table by interpolations is executed every combination of colors, till the temporary data setting of the first embodiment. After processing for all the combinations of colors has ended, L*a*b*-values are collectively registered in the regularity table by the generation of a regularity table by interpolations (postprocessing).

In the creation of the combinations of colors, reference RGB-values for splitting a color space are set, and the color signals of an irregularity table surrounding the reference RGB-values are obtained as to the respective reference RGB-values. Here, eight color signals are selected as to one reference RGB-value point. Incidentally, the eight color signals shall be called the "combination of colors" below.

By way of example, with reference to the RGB-values of grid intervals which are somewhat greater than the intervals of grid RGB-values to-be-interpolated (for example, which are double the intervals of the grid RGB-values), color signals surrounding the RGB-values at the greater grid intervals are selected. Besides, a large number of color signals are generated by interpolations with the selected combinations of colors, color signals near the grid RGB-values are detected from among the large number of color signals generated by the interpolations, and L*a*b*-values corresponding to the detected color signals are registered in the regularity table. In this regard, the L*a*b*-values are collectively registered after all the combinations of colors have been created.

Here in the creation of the combinations of colors, any color signals irrespective of the grid RGB-values can be set as reference points, and a vacancy sometimes appears among areas surrounded with the selected combinations of colors. When any grid RGB-values come into the vacancy, a color signal corresponding thereto cannot be generated. In order to avoid this drawback, the intervals of the combinations of colors to be selected are set somewhat great. Concretely, color signals which are spaced from the reference color signals at least a predetermined value are selected so that the areas surrounded with the selected combinations of colors may overlap one another without fail. The predetermined value should preferably be made $0.5\sqrt{3}$ times the intervals of the reference color signals.

The color numbers i of the eight color signals selected by the above creation of the combination of colors are respectively retained in numbers "num0" to "num7". In the generation of the regularity table by interpolations (preprocessing), the correspondence relationship of a new color signal (Rnew, Gnew, Bnew) is created by executing an interpolation with the combination of colors (num0 to num7) selected on the basis of the reference color signal. Besides, grid RGB-values nearest to the color signal (Rnew, Gnew, Bnew) created anew is selected from among the grid RGB-values to-be-interpolated. Here, in a case where the same grid RGB-values have been selected among a plurality of combinations of colors (num0 to num7), the combination of colors (num0 to num7) which generates the color signal (Rnew, Gnew, Bnew) of the shortest distances from the selected grid RGB-values is selected.

When the combination of colors (num0 to num7) relevant to the grid RGB-values to be interpolated has been determined, weight coefficients at the generation of the color signal (Rnew, Gnew, Bnew) which was used for selecting the grid RGB-values are determined. Besides, L*a*b*-values selected as the combination of colors (num0 to num7) are multiplied by the weight coefficients, thereby to generate L*a*b*-values corresponding to the grid RGB-values.

In this manner, when the color signal for selecting the combination of colors and the color signal to be interpolated are different, they are not in a one-to-one correspondence. Therefore, on condition that the combination of colors inputted to the process for the generation of the regularity table by the interpolation is the same as the combination of colors already processed, the generation of the regularity table by the interpolation is skipped. In addition, which of the combinations of colors is to be used for the execution of the interpolation of the grid RGB-values that are to be registered in the regularity table cannot be determined merely by setting the reference color signals for the selection of the combinations of colors. Therefore, the color signals of the shortest distances from the grid RGB-values are detected as to the respective color signals generated by the interpolations, thereby to select the combination of colors for use in the interpolation of the grid RGB-values.

An algorithm for generating the regularity table by interpolations will be explained as to sequential steps below.

In the first place, it is checked if quite the same combination of colors (num0 to num7) exists among the combinations of colors already processed. On condition that quite the same combination of colors (num0 to num7) exists, the process for the generation of the regularity table by the interpolation is ended, and the control flow of the generation algorithm returns to the creation of the combination of colors.

Subsequently, the intervals of colors to be created by interpolations are set. This processing can be executed similarly to the method explained in connection with the first embodiment.

Subsequently, the RGB-values (Rnew, Gnew, Bnew) of new color signals are calculated by interpolations. This processing can be executed similarly to the method explained in connection with the first embodiment.

Subsequently, data are temporarily set.

In the temporary data setting, grid RGB-values (Rgrid, Ggrid, Bgrid) nearest to the RGB-values (Rnew, Gnew, Bnew) of the new interpolated color signals as obtained with Eqs. (34) to (36) are selected. By way of example, if the grid RGB-values (Rgrid, Ggrid, Bgrid) are arrayed at intervals of 8, the nearest grid RGB-values (Rgrid, Ggrid, Bgrid) can be computed in accordance with the following equations:

$$Rnum=(int)((Rnew+4)/8) \tag{78}$$

$$Rgrid=Rnum \cdot 8 \tag{79}$$

$$Gnum=(int)((Gnew+4)/8) \tag{80}$$

$$Ggrid=Gnum \cdot 8 \tag{81}$$

$$Bnum=(int)((Bnew+4)/8) \tag{82}$$

$$Bgrid=Bnum \cdot 8 \tag{83}$$

Here, symbol (int) signifies discarding figures below a decimal point.

Subsequently, "diff" which denotes the square of the distance between the RGB-values (Rnew, Gnew, Bnew) of the new color signal based on the interpolation and the grid RGB-values (Rgrid, Ggrid, Bgrid) selected with Eqs. (78) to (83) is calculated in accordance with the following equation:

$$diff=(Rgrid-Rnew)^2+(Ggrid-Gnew)^2+(Bgrid-Bnew)^2$$

Further, on condition that the square of the distance, "diff" is less than a predetermined threshold value (for example, 2), and that no data are set for the grid point of grid number (Rnum, Gnum, Bnum) in terms of RGB-numbers (only at the first cycle of the calculation processing), or that the square of the distance, "diff" calculated anew is less than the square of a distance, "diffmin[Rnum][Gnum][Bnum]" already set, data are set as follows:

$$diffmin[Rnum][Gnum][Bnum]=diff \tag{84}$$

$$Lwmin[Rnum][Gnum][Bnum]=Lw \tag{85}$$

$$awmin[Rnum][Gnum][Bnum]=aw \tag{86}$$

$$bwmin[Rnum][Gnum][Bnum]=bw \tag{87}$$

$$num0min[Rnum][Gnum][Bnum]=num0 \tag{88}$$

$$\text{num1min}[\text{Rnum}][\text{Gnum}][\text{Bnum}]=\text{num1} \quad (89)$$

$$\text{num2min}[\text{Rnum}][\text{Gnum}][\text{Bnum}]=\text{num2} \quad (90)$$

$$\text{num3min}[\text{Rnum}][\text{Gnum}][\text{Bnum}]=\text{num3} \quad (91)$$

$$\text{num4min}[\text{Rnum}][\text{Gnum}][\text{Bnum}]=\text{num4} \quad (92)$$

$$\text{num5min}[\text{Rnum}][\text{Gnum}][\text{Bnum}]=\text{num5} \quad (93)$$

$$\text{num6min}[\text{Rnum}][\text{Gnum}][\text{Bnum}]=\text{num6} \quad (94)$$

$$\text{num7min}[\text{Rnum}][\text{Gnum}][\text{Bnum}]=\text{num7} \quad (95)$$

That is, in the third embodiment, the combinations of colors (num0 to num7) are retained in addition to the data which are set in the first embodiment, whereby the combinations of colors (num0 to num7) for use in the interpolations of the grid RGB-values can be specified. Incidentally, since the values "diffmin", "Lwmin", "awmin", "bwmin", and "num0" to "num7" are respectively retained every grid number (Rnum, Gnum and Bnum in terms of RGB-numbers), the format of the values become a three-dimensional array.

Figure 35:
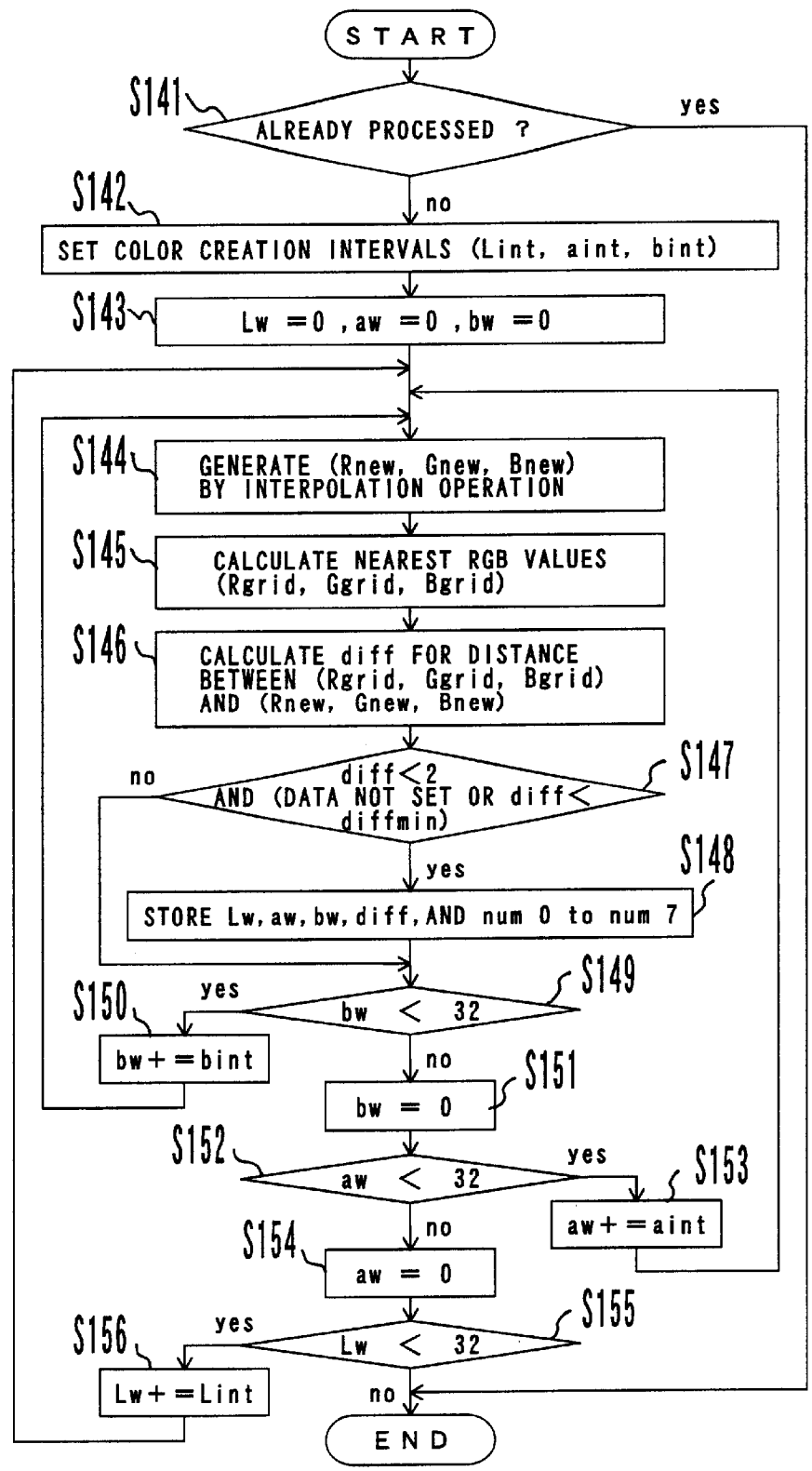
FIG. 35 is a flowchart showing a method of generating regular color signals by interpolations in accordance with the third embodiment of the present invention.

FIG. 35 is a flowchart showing a method of generating regular color signals by interpolations in accordance with the third embodiment of the present invention. The flowchart of FIG. 35 illustrates a case where reference values (Lw, aw, bw) for dividing a cube each side of which is 32 long are set at intervals "Lint" for the value "Lw", intervals "aint" for the value "aw" and intervals "bint" for the value "bw".

Referring to FIG. 35, it is checked if quite the same combination of colors (num0 to num7) exists among the combinations of colors already processed (step S141). On condition that quite the same combination of colors (num0 to num7) exists, a process for the generation of a regularity table by an interpolation is ended.

Subsequently, color creation intervals (Lint, aint, bint) are set in accordance with Eqs. (15) to (17) (step S142).

Subsequently, reference values (Lw, aw, bw) for dividing a cube each side of which is 32 long are respectively set at zero (step S143).

At the next step, the weight coefficients of Eqs. (18) to (25) are calculated by dividing the cube according to the values (Lw, aw, bw). Besides, the RGB-values of eight color signals selected as the combination of colors (num0 to num7) with Eqs. (26) to (33) are respectively multiplied by the weight coefficients of Eqs. (18) to (25), thereby to calculate the RGB-values (Rnew, Gnew, Bnew) of a new color signal based on an interpolation operation (step S144).

At the next step, grid RGB-values (Rgrid, Ggrid, Bgrid) nearest to the RGB-values (Rnew, Gnew, Bnew) of the new interpolated color signal as obtained with Eqs. (34) to (36) are selected with Eqs. (78) to (83) (on condition that the grid RGB-values (Rgrid, Ggrid, Bgrid) are arrayed at intervals of 8) (step S145).

The next step serves to calculate the square "diff" of the distance between the RGB-values (Rnew, Gnew, Bnew) of the new interpolated color signal as obtained at the step S144 and the grid RGB-values (Rgrid, Ggrid, Bgrid) selected at the step S145 (step S146).

Next, on condition that the square "diff" of the distance is less than 2, and that no data are set for the grid point of the grid RGB-values (Rgrid, Ggrid, Bgrid), or that the square "diff" of the distance calculated anew is less than the square "diffmin" of the distance already set (step S147), the reference values (Lw, aw, bw) for the division of the cube, the square "diff" of the distance calculated anew and the combination of colors (num0 to num7) are stored (step S148).

Thenceforth, the reference values (Lw, aw, bw) for the division of the cube are respectively incremented in accordance with the color creation intervals (Lint, aint, bint) until they reach at least 32, respectively (steps S149 to S156). Thus, the grid RGB-values (Rgrid, Ggrid, Bgrid) nearest to the RGB-values (Rnew, Gnew, Bnew) of the new color signals are selected.

In the generation of the regularity table by interpolations (postprocessing), L*a*b*-values are calculated as to the grid RGB-values (Rgrid, Ggrid, Bgrid) for which the following values have been set in accordance with Eqs. (85) to (95):

Lwmin [Rnum][Gnum][Bnum],
awmin [Rnum][Gnum][Bnum],
bwmin [Rnum][Gnum][Bnum],
num0min [Rnum][Gnum][Bnum]–num7min [Rnum][Gnum][Bnum]

More specifically, the combination of colors (num0 to num7) for use in the interpolation of the grid RGB-values (Rgrid, Ggrid, Bgrid) is given by the following equations:

$$\text{num0}=\text{num0min}[\text{Rnum}][\text{Gnum}][\text{Bnum}] \quad (96)$$

$$\text{num1}=\text{num1min}[\text{Rnum}][\text{Gnum}][\text{Bnum}] \quad (97)$$

$$\text{num2}=\text{num2min}[\text{Rnum}][\text{Gnum}][\text{Bnum}] \quad (98)$$

$$\text{num3}=\text{num3min}[\text{Rnum}][\text{Gnum}][\text{Bnum}] \quad (99)$$

$$\text{num4}=\text{num4min}[\text{Rnum}][\text{Gnum}][\text{Bnum}] \quad (100)$$

$$\text{num5}=\text{num5min}[\text{Rnum}][\text{Gnum}][\text{Bnum}] \quad (101)$$

$$\text{num6}=\text{num6min}[\text{Rnum}][\text{Gnum}][\text{Bnum}] \quad (102)$$

$$\text{num7}=\text{num7min}[\text{Rnum}][\text{Gnum}][\text{Bnum}] \quad (103)$$

When the combination of colors (num0 to num7) has been given by Eqs. (96) to (103), the L*a*b*-values (L0, a0, b0) to (L7, a7, b7) of the eight color signals selected as this combination of colors (num0 to num7) are calculated in accordance with Eqs. (7) to (14).

In addition, the values (Lw, aw, bw) for dividing the cube in order to generate the weight coefficients are given by the following equations:

$$Lw=\text{Lwmin}[\text{Rnum}][\text{Gnum}][\text{Bnum}] \quad (104)$$

$$aw=\text{awmin}[\text{Rnum}][\text{Gnum}][\text{Bnum}] \quad (105)$$

$$bw=\text{bwmin}[\text{Rnum}][\text{Gnum}][\text{Bnum}] \quad (106)$$

Besides, using Eqs. (104) to (106), the weight coefficients for the execution of the interpolation operation are calculated in accordance with Eqs. (18) to (25). Using the weight coefficients calculated with Eqs. (18) to (25), the L*a*b*-values corresponding to the grid RGB-values (Rgrid, Ggrid, Bgrid) can be obtained in accordance with Eqs. (45) to (47).

Owing to the above interpolation operations, the grid RGB-values which lie in a range covered by an irregularity table can be set in the regularity table. Subsequently, the supplementation of the regularity table by extrapolations is executed in the same manner as in the first embodiment. Then, the regularity table can be completed.

Now, a table transformation method according to the fourth embodiment of the present invention will be described. The table transformation method according to the fourth embodiment transforms an irregularity table into a regularity table in conformity with a tetrahedron interpolation, and makes it possible to set a reference point for splitting an RGB-space so as to be different from a grid point to-be-interpolated.

The processing steps of the fourth embodiment consist of four stages; the "creation of the combinations of colors", the "generation of a regularity table by interpolations (preprocessing)", the "generation of a regularity table by interpolations (postprocessing)" and the "supplementation of the regularity table by extrapolations".

In the creation of the combinations of colors, reference RGB-values for splitting a color space are set, and the color space is split into eight areas with the center at the reference RGB-values. Besides, three areas are selected from among the split eight areas, and color signals nearest to the reference RGB-values are selected from within the selected three areas. Incidentally, the four color signals which consist of the color signal of the reference RGB-values and the selected three color signals shall be called the "combination of colors" below.

Here, the reference RGB-values can be set by, for example, successively selecting color signals registered in the irregularity table. Besides, a large number of color signals are generated by interpolations with the selected combinations of colors, color signals near the grid RGB-values are detected from among the large number of color signals generated by the interpolations, and $L^*a^*b^*$-values corresponding to the detected color signals are registered in the regularity table. In this regard, the $L^*a^*b^*$-values are collectively registered after all the combinations of colors have been created.

Figure 36:
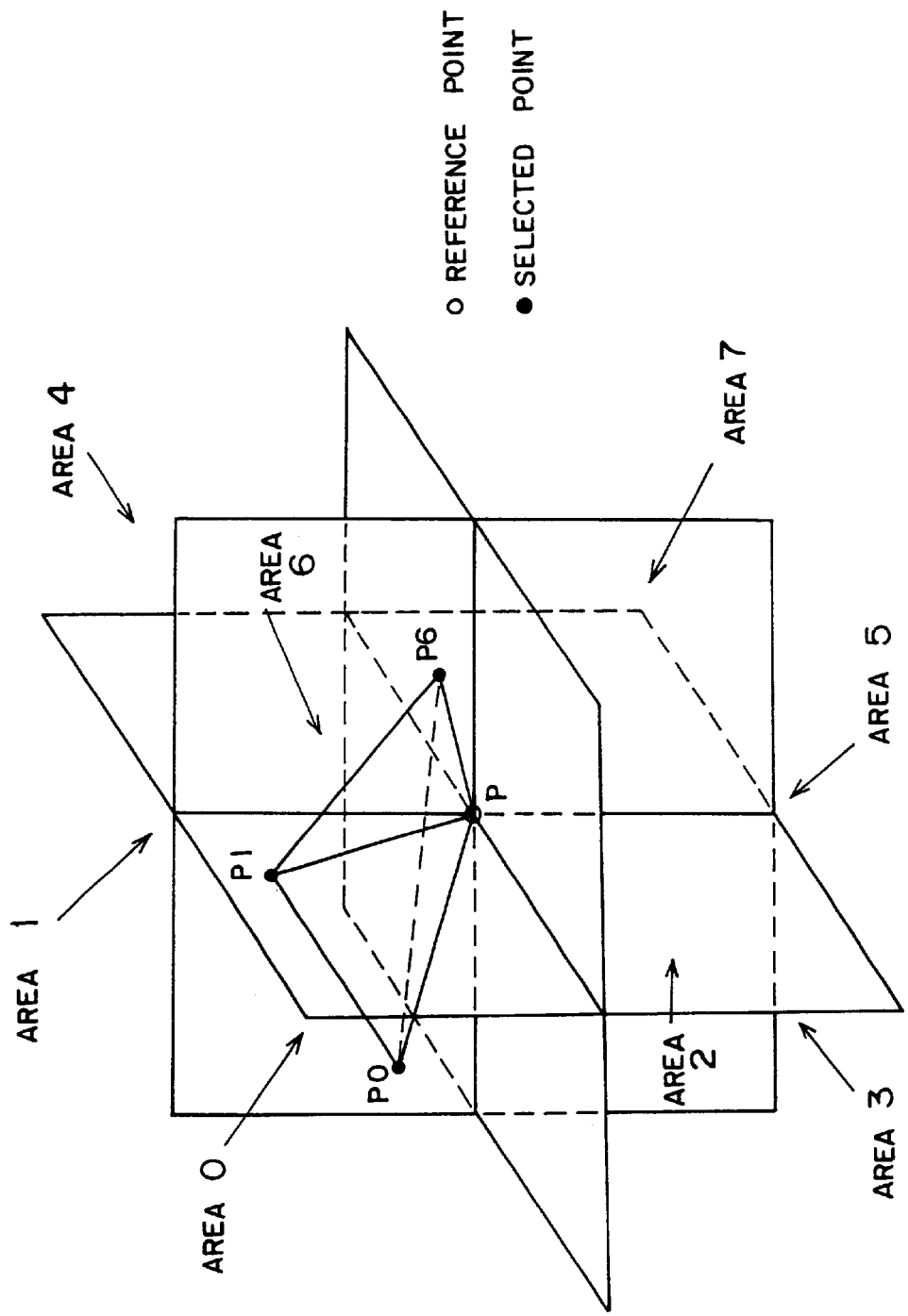
FIG. 36 is a diagram showing on a three-dimensional color space a color signal selection method according to one embodiment of the present invention.

FIG. 36 is a diagram showing on a three-dimensional color space a color signal selection method according to one embodiment of the present invention.

Referring to FIG. 36, a reference point P for splitting a three-dimensional space is given, and the three-dimensional space is split into eight areas #0 to #7 with the center at the point P. Besides, three areas adjacent to one another are selected from among the split eight areas #0 to #7, and color signals nearest to the point P are selected from among color signals distributed in the selected three areas. By way of example, the areas #0, #1 and #6 are selected as the three areas adjacent to one another, and a point P0 is selected from within the area #0, a point P1 from within the area #1, and a point P6 from within the area #6. Incidentally, since the three areas adjacent to one another can be selected from within the split eight areas #0 to #7 in 24 ways, the three points can be selected with respect to the reference point P in 24 ways.

An algorithm for creating the combination of colors will be explained as to sequential steps below. In this example, RGB-values (Rin[j], Gin[j], Bin[j]) registered in an irregularity table are successively selected as reference color signals within the range of $0 \leq j <$(the number of colors). Moreover, the selection of areas is changed in 24 ways for each reference color signal.

As initialization, RGB-values and $L^*a^*b^*$-values (the colors of a target, $0 \leq k <$(the number of colors)) registered in the irregularity table are set in an array Lin[k], ain[k], bin[k], Rin[k], Gin[k] and Bin[k].

Subsequently, the reference RGB-values (Rin[j], Gin[j], Bin[j]) for splitting the color space are successively selected from among the RGB-values (Rin[k], Gin[k], Bin[k]) registered in the irregularity table, and the following color signals (where $0 \leq j <$(the number of colors) hold) are set:

$$Rcnet = Rin[j] \qquad (107)$$

$$Gcnet = Gin[j] \qquad (108)$$

$$Bcnet = Bin[j] \qquad (109)$$

Subsequently, the RGB-space is split into eight areas about each of the color signals set with Eqs. (107) to (109). Besides, three areas are selected from among the split eight areas, and a color signal nearest to the reference RGB-values is selected from within the selected three areas.

Concretely, regarding the range of $0 \leq i <$(the number of colors of the target), the RGB-space is classified into the eight areas #0 to #7 as follows:

| Area #0: | Rin[i] > Rgrid, Bin[i] $\leq$ Bgrid | Gin[i] $\leq$ Ggrid, |
|---|---|---|

Excluding the case of Rin[i]=Rcnet, Gin[i]=Gcnet and Bin[i]=Bcnet where three equal signs hold simultaneously.

| Area #1: | Rin[i] > Rgrid, Gin[i] $\leq$ Ggrid, Bin[i] $\leq$ Bgrid |
|---|---|
| Area #2: | Rin[i] $\leq$ Rgrid, Gin[i] > Ggrid, Bin[i] $\leq$ Bgrid |
| Area #3: | Rin[i] $\leq$ Rgrid, Gin[i] $\leq$ Ggrid, Bin[i] > Bgrid |
| Area #4: | Rin[i] > Rgrid, Gin[i] > Ggrid, Bin[i] $\leq$ Bgrid |
| Area #5: | Rin[i] $\leq$ Rgrid, Gin[i] > Ggrid, Bin[i] > Bgrid |
| Area #6: | Rin[i] > Rgrid, Gin[i] $\leq$ Ggrid, Bin[i] > Bgrid |
| Area #7: | Rin[i] > Rgrid, Gin[i] > Ggrid, Bin[i] > Bgrid |

Besides, regarding each of 24 combinations to be mentioned below, the RGB-numbers of the RGB-values having the shortest distances from the reference RGB-values (Rin[j], Gin[j], Bin[j]) in the classified areas #0 to #7 (Rin[i], Gin[i], Bin[i]) are retained in numbers "num2" to "num4". Incidentally, the number of the reference RGB-values is retained in number "num1".

Combination #1:

num1=j

Retain the numbers of respective colors having the shortest distances from the reference color in the areas #0, #1 and #2, in the numbers "num2", "num3" and "num4".

Combination #2:

num1=j

Retain the numbers of respective colors having the shortest distances from the reference color in the areas #0, #1 and #3, in the numbers "num2", "num3" and "num4".

Combination #3:

num1=j

Retain the numbers of respective colors having the shortest distances from the reference color in the areas #0, #2 and #3, in the numbers "num2", "num3" and "num4".

Combination #4:

num1=j

Retain the numbers of respective colors having the shortest distances from the reference color in the areas #0, #1 and #4, in the numbers "num2", "num3" and "num4".

Combination #5:

num1=j

Retain the numbers of respective colors having the shortest distances from the reference color in the areas #0, #1 and #6, in the numbers "num2", "num3" and "num4".

Combination #6:

num1=j

Retain the numbers of respective colors having the shortest distances from the reference color in the areas #1, #4 and #6, in the numbers "num2", "num3" and "num4".

Combination #7:

num1=j

Retain the numbers of respective colors having the shortest distances from the reference color in the areas #0, #2 and #4, in the numbers "num2", "num3" and "num4".

Combination #8:

num1=j

Retain the numbers of respective colors having the shortest distances from the reference color in the areas #0, #2 and #5, in the numbers "num2", "num3" and "num4".

Combination #9:

num1=j

Retain the numbers of respective colors having the shortest distances from the reference color in the areas #2, #4 and #5, in the numbers "num2", "num3" and "num4".

Combination #10:

num1=j

Retain the numbers of respective colors having the shortest distances from the reference color in the areas #0, #3 and #5, in the numbers "num2", "num3" and "num4".

Combination #11:

num1=j

Retain the numbers of respective colors having the shortest distances from the reference color in the areas #0, #3 and #6, in the numbers "num2", "num3" and "num4".

Combination #12:

num1=j

Retain the numbers of respective colors having the shortest distances from the reference color in the areas #5, #3 and #6, in the numbers "num2", "num3" and "num4".

Combination #13:

num1=j

Retain the numbers of respective colors having the shortest distances from the reference color in the areas #1, #2 and #4, in the numbers "num2", "num3" and "num4".

Combination #14:

num1=j

Retain the numbers of respective colors having the shortest distances from the reference color in the areas #1, #4 and #7, in the numbers "num2", "num3" and "num4".

Combination #15:

num1=j

Retain the numbers of respective colors having the shortest distances from the reference color in the areas #2, #4 and #7, in the numbers "num2", "num3" and "num4".

Combination #16:

num1=j

Retain the numbers of respective colors having the shortest distances from the reference color in the areas #2, #3 and #5, in the numbers "num2", "num3" and "num4".

Combination #17:

num1=j

Retain the numbers of respective colors having the shortest distances from the reference color in the areas #2, #5 and #7, in the numbers "num2", "num3" and "num4".

Combination #18:

num1=j

Retain the numbers of respective colors having the shortest distances from the reference color in the areas #3, #5 and #7, in the numbers "num2", "num3" and "num4".

Combination #19:

num1=j

Retain the numbers of respective colors having the shortest distances from the reference color in the areas #1, #3 and #6, in the numbers "num2", "num3" and "num4".

Combination #20:

num1=j

Retain the numbers of respective colors having the shortest distances from the reference color in the areas #1, #6 and #7, in the numbers "num2", "num3" and "num4".

Combination #21:

num1=j

Retain the numbers of respective colors having the shortest distances from the reference color in the areas #3, #6 and #7, in the numbers "num2", "num3" and "num4".

Combination #22:

num1=j

Retain the numbers of respective colors having the shortest distances from the reference color in the areas #4, #5 and #7, in the numbers "num2", "num3" and "num4".

Combination #23:

num1=j

Retain the numbers of respective colors having the shortest distances from the reference color in the areas #4, #6 and #7, in the numbers "num2", "num3" and "num4".

Combination #24:

num1=j

Retain the numbers of respective colors having the shortest distances from the reference color in the areas #5, #6 and #7, in the numbers "num2", "num3" and "num4".

Figure 37:
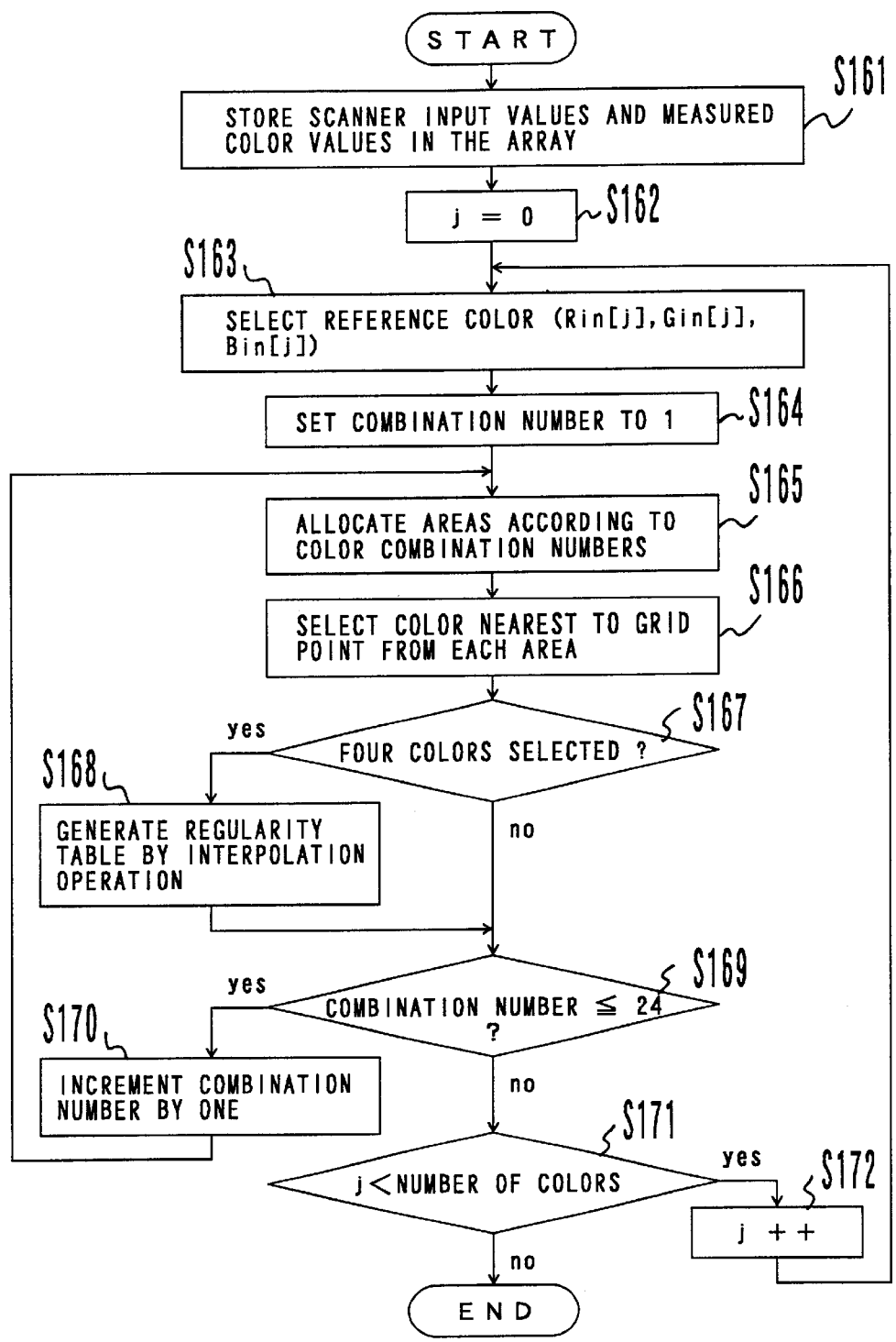
FIG. 37 is a flowchart showing a method of selecting a combination of color signals in accordance with the second embodiment of the present invention.

FIG. 37 is a flowchart showing a method of selecting a combination of color signals in accordance with the second embodiment of the present invention.

Referring to FIG. 37, values inputted by a scanner and values measured by a colorimeter are set in an array (step S161). Here, color signals which are set in the array become irregular ordinarily, and the array can be specified by designating a color number j corresponding to the color of a target.

Subsequently, the color number j is set at zero (step S162), and RGB-values (Rin[j], Gin[j], Bin[j]) specified by the color number j are selected as a reference color signal (step S163).

Subsequently, a combination number is set to one (step S164), and areas are allocated or set in accordance with the combination number (step S165).

Further, color signals nearest to the reference color signal are selected from within the respective set areas (step S166).

The next step serves to judge if the four color signals have been successfully selected (step S167). On condition that the selection of the four color signals has been successful, a regularity table is generated by an interpolation operation (step S168), whereupon the control flow of the selection method proceeds to a step S169.

In contrast, on condition that the selection of the four color signals has not been successful, if the combination number is at most 24 is judged (step S169). When the combination number is at most 24, it is incremented by one (step S170), whereupon the control flow returns to the step S165.

On the other hand, when the combination number is greater than 24, if the color number j is less than the number of colors is judged (step S171). When the color number j is less than the number of colors, it is incremented by one (step S172), whereupon the control flow returns to the step S163.

Herein, when the color number j has reached the number of colors, the process of the selection method is ended.

In a case where all the numbers "num1" to "num4" have been set, the generation of the regularity table by the interpolation operation (preprocessing) is executed, and in a case where any color signal cannot be set, the control flow returns to the selection of a grid point.

In the generation of the regularity table by the interpolation operation (preprocessing), the correspondence relationship of a new color signal (Rnew, Gnew, Bnew) is created by executing an interpolation with the combination of colors (num1 to num4) selected on the basis of the reference RGB-values (Rin[j], Gin[j], Bin[j]). Incidentally, weight coefficients for the interpolation operation can be set in conformity with Eqs. (51) to (54), the respective RGB-values of the combination of colors (num1 to num4) can be set in conformity with Eqs. (55) to (58), and the new color signal (Rnew, Gnew, Bnew) can be calculated in conformity with Eqs. (59) to (61).

Besides, grid RGB-values nearest to the color signal (Rnew, Gnew, Bnew) created anew is selected from among the grid RGB-values to-be-interpolated. Here, in a case where the same grid RGB-values have been selected among a plurality of combinations of colors (num1 to num4), the combination of colors (num1 to num4) which generates the color signal (Rnew, Gnew, Bnew) of the shortest distances from the selected grid RGB-values is selected.

When the generation of the combinations of colors has ended as to all the color signals of an irregularity table, the generation of the regularity table by interpolations (postprocessing) is executed.

In the generation of the regularity table by interpolations (postprocessing), when the combination of colors (num1 to num4) relevant to the grid RGB-values to be interpolated has been determined, weight coefficients at the generation of the color signal (Rnew, Gnew, Bnew) which was used for selecting the grid RGB-values are determined. Besides, $L^*a^*b^*$-values selected as the combination of colors (num1 to num4) are multiplied by the weight coefficients, thereby to generate $L^*a^*b^*$-values corresponding to the grid RGB-values. Incidentally, weight coefficients for calculating the $L^*a^*b^*$-values can be set in conformity with Eqs. (67) to (70), the respective $L^*a^*b^*$-values of the combination of colors (num1 to num4) can be set in conformity with Eqs. (71) to (73), and the $L^*a^*b^*$-values corresponding to the grid RGB-values can be calculated in conformity with Eqs. (75) to (77).

Owing to the selection of the combinations of colors, the generation of the regularity table by the interpolations (preprocessing) and the generation of the regularity table by the interpolations (postprocessing), all the grid RGB-values which lie in a range covered by the irregularity table are set. Subsequently, the supplementation of the regularity table by extrapolations is executed in the same manner as in the first embodiment. Then, the regularity table can be completed. Incidentally, the supplementation of the regularity table by extrapolations can be executed by a method which is similar to the method explained in conjunction with the first embodiment.

While the embodiments of the present invention have thus far been described, the present invention can be subjected to other various alterations and modifications within the scope of the technical idea thereof without being restricted to the foregoing embodiments. By way of example, although the method of converting RGB-values into $L^*a^*b^*$-values has been described in the foregoing embodiments, the color signals of an independent color space which does not depend upon device may well be CMY-values or CMYK-values, and the color signals of a device-dependent color space which depends upon device may well be XYZ-values.

As described above, according to the present invention, a color space is split according a first color signal, and second color signals are selected from within split color subspaces. Thus, even in a case where the second color signals are irregularly distributed on the color space, the first color signal can be surrounded with the second color signals without redoing the selection of the second color signals. It is therefore permitted to select the second color signals surrounding the first color signal, at high speed.

Besides, according to one aspect of the present invention, the second color signals are selected while the coordinate axes of the color space are being rotated. Thus, in selecting the second color signals which surround the first color signal, the number of the second color signals can be made as small as possible, and interpolative calculations can be executed simply.

According to another aspect of the present invention, the color space is split on the basis of the results of the comparisons between the values of the components of the first color signal and those of the components of each of the second color signals. Thus, the second color signals surrounding the first color signal can be selected merely by executing simple calculations.

According to still another aspect of the present invention, the second color signals of the shortest distances from the first color signal are selected. Thus, the interpolative calculations can be executed at a high precision.

According to yet another aspect of the present invention, the second color signals of distances from the first color signal, the distances being equal to or greater than a predetermined value, are selected. Thus, the selection of only color signals within a limited range of small extent can be prevented, and the omission of any color signal generable within a color reproduction range on the color space can be avoided.

Meanwhile, according to one aspect of the present invention, a color signal is interpolated on the basis of the results of selection of color signals from split color subspaces. Thus, even in a case where color signals are irregularly distributed on the color space, it is permitted to quickly select the color signals necessary for the interpolation, so that color conversion can be executed at high speed.

Besides, according to one aspect of the present invention, the color space is split according to the values of a grid point on the color space. Thus, interpolation points can be regularly generated on the color space, and the distribution of color signals on the color space can be uniformalized.

Meanwhile, according to one aspect of the present invention, a point which is different from a color signal to be interpolated is set as a reference point for splitting. Thus, the same reference point can be set for a plurality of color signals to-be-interpolated, and it can be dispensed with to redo the selection of color signals for use in an interpolation each time a color signal lying within an identical range is inputted as one to-be-interpolated, so that a processing speed can be heightened.

Herein, according to one aspect of the present invention, the color space is split according to the values of a grid point on the color space. Thus, reference points can be regularly generated on the color space, and the selections of the color signals for use in the interpolation can be regularly performed.

Besides, according to one aspect of the present invention, the grid intervals of the grid points are altered on the basis of the density of the color signals. Thus, it is permitted to reduce the overlap of ranges surrounded with the color signals selected with reference to the particular grid point, and to prevent the same interpolation point from being repeatedly generated.

In addition, according to one aspect of the present invention, the color space is split according to a color signal distributed on the color space. Thus, ranges which are surrounded with the selected color signals can be set without any vacancy on the color space, and the omission of any color signal generable within a color reproduction range on the color space can be avoided.

Yet in addition, according to one aspect of the present invention, an interpolation point nearest to a point to-be-converted is selected from among interpolation points generated using set weight coefficients, and color conversion is performed by employing the weight coefficients which were used in the case of obtaining the selected interpolation point. Thus, even in the case where the color signals are irregularly distributed on the color space, the number of points for use in an n-dimensional interpolation such as the tetrahedron interpolation need not be limited to (n+1), and the interpolation point can be generated by employing an interpolation method less susceptible to noise, such as the 8-point interpolation.

Besides, according to one aspect of the present invention, color signals are selected from within a color space split at a reference point. Thus, the selection of color signals surrounding the reference point does not end in failure, so that interpolation points can be efficiently generated in the range surrounded with the selected color signals.

Besides, according to one aspect of the present invention, volumes obtained by dividing a cube at predetermined intervals are set as the weight coefficients in the case of the interpolation. Thus, even in a case where the color signals are irregularly distributed, the interpolation points can be generated by an 8-point interpolation, and such an interpolation method less susceptible to noise can be offered.

In addition, according to one aspect of the present invention, the intervals for the division of the cube are altered on the basis of the distances between the selected color signals. Thus, it is permitted to generate the interpolation points uniformly even in a case where the range surrounded with the selected color signals is in a distorted shape, so that the color signals can be interpolated in a shape which is more adapted to the visual property of man.

Yet in addition, according to one aspect of the present invention, in a case where a plurality of points to be converted are surrounded with the same color signals, the weight coefficients relevant to the plurality of points to be converted are collectively selected. Thus, the selection of the color signals surrounding the point to be converted need not be iterated, and the color conversion can be efficiently executed.

Still in addition, according to one aspect of the present invention, a color signal on a device-dependent color space is converted into a color signal on an independent color space. Thus, even in a case where color signals are transmitted or received between device of different color reproducibilities, the color reproducibilies between the device can be brought into agreement.

Further, according to one aspect of the present invention, a color signal on a CMY-space, a CMYK-space or an RGB-space is converted into a color signal on an L*a*b*-space or an XYZ-space. Thus, the color signal on the device-dependent color space which depends upon device can be converted into the color signal on the independent color space.

Meanwhile, according to one aspect of the present invention, color signals lying in a range which is surrounded with color signals distributed on a color space are extrapolated. Thus, even in a case where the color signals are irregularly distributed on the color space, a new color signal can be generated outside the range which is surrounded with the color signals distributed on the color space.

Besides, according to one aspect of the present invention, the color signals are selected from within split color subspaces. Thus, even in the case where the color signals are irregularly distributed, an extrapolation point can be generated at high speed, so that the extrapolation point can be quickly generated from the interpolation points, and that the new color signal can be efficiently generated outside the range which is surrounded with the color signals distributed on the color space.

In addition, according to one aspect of the present invention, a color space on which color signals are irregularly distributed is split, and color signals are selected from within split color subspaces. Thus, an irregularity table can be transformed into a regularity table without failure in the selection of color signals for use in interpolative calculations.

Yet in addition, according to one aspect of the present invention, the color space is split according to a color signal registered in a color conversion table. Thus, ranges which are surrounded with the color signals selected from within split color subspaces can be set without any vacancy, and the omission of any range of color signals registered in the color conversion table can be avoided.

Still in addition, according to one aspect of the present invention, the color space is split according to a grid point so as to select the color signals. Thus, interpolation points can be generated at equal intervals without failure in the selection of color signals for use in the interpolative calculations, and the irregularity table can be efficiently transformed into the regularity table.

Besides, according to one aspect of the present invention, grid points to be registered in the color conversion table are thinned out, and the resulting grid points are set as reference points for splitting the color space. Thus, it is permitted to reduce the overlap of ranges surrounded with the same color signals, so that the irregularity table can be efficiently transformed into the regularity table.

Meanwhile, according to one aspect of the present invention, the step of finding second correspondence relationships comprises the step of setting volumes obtained by dividing a cube at predetermined intervals, as weight coefficients relevant to selected first color signals, the step of generating interpolation points in a range surrounded with the first color signals, on the basis of the weight coefficients, the step of selecting the weight coefficients of the interpolation point nearest to a third color signal surrounded with the first color signals, from among the set weight coefficients, and the step of calculating a fourth color signal by applying the selected weight coefficients to second color signals.

In this way, the interpolation point nearest to a point to be registered in a color conversion table is selected from among the interpolation points generated using the weight coefficients which are the volumes obtained by dividing the cube at the predetermined intervals, and color conversion is executed by employing the weight coefficients which were used in the case of finding the selected interpolation point. Thus, color signals registered in an irregularity table can be converted by an 8-point interpolation, and the irregularity table can be accurately converted into a regularity table.

Moreover, according to one aspect of the present invention, a linear operation is executed using two points near an extrapolation point. Thus, color conversion can be quickly and accurately executed even outside a range which is surrounded with color signals registered in a color conversion table.

What is claimed is:

1. A color signal selection apparatus, comprising:
   a color signal receiving unit to which a first signal, which belongs to a color space, is inputted;
   a color space split unit splitting the color space to which an inputted first color signal belongs, into subspaces by one or more lines or planes passing through said first color signal; and a color signal selection unit selecting second color signals from within the split color subspaces.

2. A color signal selection apparatus as defined in claim 1, further comprising:

a color signal rotation unit performing a rotational transformation of color signals distributed on the color space, in order that the second color signals selected by said color signal selection unit may come into predetermined areas.

3. A color signal selection apparatus as defined in claim 1, wherein the second color signals in the color space are irregularly distributed.

4. A color signal selection apparatus as defined in claim 1, wherein said color signal selection unit selects the second color signals on the basis of a relationship in magnitude between values of components of said first color signal and those of components of said each second color signal.

5. A color signal selection apparatus as defined in claim 1, wherein said color signal selection unit selects the color signals of the shortest distances from said first color signal.

6. A color signal selection apparatus as defined in claim 1, wherein said color signal selection unit selects the color signals of the shortest distances from said first color signal, in a range in which distances from said first color signal are not shorter than a predetermined value.

7. A color signal interpolation apparatus, comprising:

a color signal input unit inputting a first color signal which belongs to a first color space;

a color space split unit splitting the first color space into subspaces by lines or planes passing through the first color signal;

a color signal selection unit selecting second color signals from within split first color subspaces; and a color signal calculation unit calculating a result of conversion of said first color signal into a color signal of a second color space, on the basis of results of conversions of the second color signals into color signals of the second color space.

8. A color signal interpolation apparatus as defined in claim 7, wherein said color signal input unit inputs values of a grid point on said first color space as said first color signal.

9. A color signal interpolation apparatus, comprising:

a color signal input unit inputting a first color signal which belongs to a first color space;

a color space split unit splitting the first color space into subspaces by one or more lines or places passing through the first color signal;

a color signal selection unit selecting second color signals from within split first color subspaces; and a color signal calculation unit calculating results of conversions of third color signals surrounded with the second color signals, into color signals of a second color space, on the basis of results of conversions of said second color signals into color signals of the second color space.

10. A color signal interpolation apparatus as defined in claim 9, wherein said color signal input unit inputs values of a grid point on said first color space as said first color signal.

11. A color signal interpolation apparatus as defined in claim 10, wherein said color signal input unit alters a grid distance of the grid points on the basis of a density of the color signals distributed on said first color space.

12. A color signal interpolation apparatus as defined in claim 9, wherein said color signal input unit inputs a color signal distributed on said first color space as said first color signal.

13. A color signal interpolation apparatus as defined in claim 9, wherein said color signal calculation unit sets values of grid points on said first color space as the third color signals.

14. A color signal interpolation apparatus, comprising:

a color signal input unit inputting a first color signal which belongs to a first color space;

a color signal selection unit selecting second color signals which surround the first color signal from subspaces which are generated by splitting the first color space by one or more lines or planes passing through the first color signal;

a correspondence relationship acquisition unit acquiring correspondence relationships between the second color signals and third color signals which belong to a second color space;

a weight coefficient setting unit setting weight coefficients relevant to said second color signals selected by said color signal selection unit;

an interpolation point generation unit generating interpolation points in a range surrounded with said second color signals on the basis of the weight coefficients;

a weight coefficient selection unit selecting the weight coefficients of the interpolation point nearest to a fourth color signal surrounded with said second color signals from among said weight coefficients set by said weight coefficient setting unit; and an interpolation operation unit calculating a result of conversion of the fourth color signal into a color signal of the second color space in such a way that said weight coefficients selected by said weight coefficient selection unit are applied to the third color signals.

15. A color signal interpolation apparatus as defined in claim 14, wherein said weight coefficient setting unit sets volumes obtained by dividing a cube at predetermined intervals as said weight coefficients.

16. A color signal interpolation apparatus as defined in claim 15, wherein said weight coefficient setting unit alters the intervals for the division of the cube on the basis of either of distances between said second color signals and distances between said third color signals.

17. A color signal interpolation apparatus as defined in claim 15, wherein when the plurality of fourth signals are surrounded with the same second color signals, said weight coefficient selection unit selects the weight coefficients relevant to the respective fourth color signals collectively.

18. A color signal interpolation apparatus as defined in claim 15, wherein the first color space is a device-dependent color space, which depends upon a corresponding device, and said second color space is an independent color space, which is not device dependent.

19. A color signal interpolation apparatus as defined in claim 15, wherein said second color signals are irregularly distributed, and the fourth color signals are regularly distributed.

20. A color signal interpolation apparatus as defined in claim 15, wherein the first color space is one selected from the group consisting of a CMY-space, a CMYK-space and an RGB-space, and said second color space is one selected from the group consisting of an L*a*b*-space and an XYZ-space.

21. A color signal interpolation apparatus, comprising:

a first-interpolation-point generation unit generating a first interpolation point within a range, which is surrounded with first color signals distributed on a color space;

a second-interpolation-point generation unit generating a second interpolation point within a range, which is surrounded with second color signals distributed on the color space;

an interpolation point selection unit selecting one of the first interpolation point and the second interpolation point as is nearer to a third color signal to be interpolated on said color space; and an interpolation unit interpolating the third color signal by use of the first color signals on a condition that said first interpolation point has been selected by said interpolation point selection unit, and interpolating said third color signal by use of the second color signals on condition that said second interpolation point has been selected by said interpolation point selection unit.

22. A color signal generation apparatus, comprising:

a color signal input unit inputting a first color signal, which belongs to a first color space;

a color signal selection unit selecting second color signals, which surround the first color signal;

a color signal calculation unit converting a third color signal on the first color space surrounded with the second color signals, into a color signal of a second color space, on the basis of results of conversions of said second color signals into color signals of the second color space; and an extrapolation unit extrapolating the converted color signal into a color signal and generating a fourth color signal lying outside a range surrounded with said second color signals.

23. A color signal generation apparatus as defined in claim 22, wherein said color signal selection unit selects said second color signals from within first color subspaces split according to said first color signal.

24. A color signal generation apparatus as defined in claim 22, wherein said second color signals are irregularly distributed, and the third color signals and the fourth color signals are regularly distributed.

25. A surrounding-point selection apparatus, comprising:

a space splitting unit splitting a space into subspaces by one or more lines or planes passing there through; and a surrounding-point identification unit identifying any point surrounding the first point by selecting second points from within split subspaces.

26. A surrounding-point identification method, which identifies second points surrounding a first point on a space, comprises the fact:

that points which are distributed on subspaces split by one or more lines or planes passing through the first point are set as the second points surrounding said first point.

27. A surrounding-point selection method, which selects three points surrounding a first point on a two-dimensional space, comprising:

selecting a second point near the first point;

rotating a coordinate axis, which passes through the first point, around said first point so that the second point may come onto the coordinate axis; and selecting one point from within each of areas which oppose each other through said coordinate axis.

28. A surrounding-point selection method, which selects four points surrounding a first point on a three-dimensional space, comprising:

selecting a second point near the first point;

rotating a first coordinate axis, which passes through the first point, around said first point so that the second point may come into a minus value on the first coordinate axis;

selecting a third point from within a plus value on the rotated first coordinate axis;

rotating a second coordinate axis so that the third point may come into an area lying on a plane containing said first coordinate axis and the second coordinate axis, and which is minus value regarding said second coordinate axis;

selecting a fourth point from within an area which is minus value regarding said first coordinate axis and said second coordinate axis, and which is zero or above value regarding a third coordinate axis; and selecting a fifth point from within an area which is minus value regarding said first coordinate axis and said second coordinate axis, and which is minus value regarding the third coordinate axis.

29. A color conversion method, comprising:

inputting a first color signal;

splitting a color space to which the first color signal belongs into subspaces by one or more lines or planes passing through the first color signal;

selecting second color signals from within split color subspaces;

acquiring correspondence relationships between the second color signals and third color signals; and converting said first color signal into a fourth color signal on the basis of the correspondence relationships between said second color signals and the third color signals.

30. A method of creating a color conversion table, comprising:

acquiring first correspondence relationships between first color signals distributed irregularly on a first color space and second color signals distributed on a second color space;

setting reference points on the first color space;

splitting said first color space at each of the reference points;

selecting the first color signals from within the split color subspaces;

acquiring second correspondence relationships between third color signals, which are positioned at grid points on said first color space and fourth color signals distributed on the second color space within a range surrounded with said first color signals, by executing interpolations on the basis of the selected first color signals;

acquiring third correspondence relationships between fifth color signals which are positioned at the grid points on said first color space and sixth color signals distributed on said second color space, outside the range which is surrounded with said first color signals by extrapolating the second correspondence relationships; and registering said second correspondence relationships and the third correspondence relationships in the color conversion table.

31. A method of creating a color conversion table as defined in claim 30, wherein said reference points correspond to the first color signals.

32. A method of creating a color conversion table as defined in claim 30, wherein said reference points correspond to the third color signals.

33. A method of creating a color conversion table as defined in claim 30, wherein said reference points correspond to some of the third color signals.

34. A method of creating a color conversion table as defined in claim 30, wherein the step of acquiring said second correspondence relationships comprises:

setting volumes obtained by dividing a cube at predetermined intervals as weight coefficients relevant to said selected first color signals;

generating interpolation points in a range surrounded with said first color signals on the basis of the weight coefficients;

selecting the weight coefficients of the interpolation point nearest to the third color signal surrounded with said first color signals from among the set weight coefficients; and calculating the fourth color signal by applying the selected weight coefficients to the second color signals.

35. A method of creating a color conversion table as defined in claim 30, wherein the step of acquiring said third correspondence relationships comprises:

selecting on said first color space a first grid point which adjoins outside a boundary of said range surrounded with said first color signals;

selecting on said first color space a second grid point which adjoins on the nearer side of said boundary of said range surrounded with said first color signals viewing from the first grid point;

selecting on said first color space a third grid point which lies by a grid point on the inside of said boundary of said range surrounded with said first color signals, viewing from the second grid point;

finding a first point on said second color space as corresponds to said second grid point on the basis of said second correspondence relationships;

finding a second point on said second color space as corresponds to the third grid point on the basis of said second correspondence relationships;

finding on said second color space a color signal of a third point which is in point symmetry with the second point about the first point; and registering the color signal of the third point in said color conversion table in correspondence with a color signal of said first grid point.

36. A computer-readable storage medium storing a program therein, the program causing a computer to implement:

the function of splitting a color space to which an inputted first color signal belongs, into subspaces by one or more lines or planes passing through the first color signal; and the function of selecting second color signals from within split color subspaces.

37. A computer-readable storage medium storing a program therein, the program causing a computer to implement:

the function of inputting a first color signal, which belongs to a first color space;

the function of splitting the first color space by one or more lines or planes passing through the first color signal;

the function of selecting second color signals from within split first color subspaces; and the function of calculating a result of conversion on said first color signal on the basis of results of conversions of the second color signals into color signals of a second color space.

* * * * *

UNITED STATES PATENT AND TRADEMARK OFFICE
CERTIFICATE OF CORRECTION

PATENT NO. : 6,292,195 B1  
DATED : September 18, 2001  
INVENTOR(S) : Masayoshi Shimizu et al.

Page 1 of 1

It is certified that error appears in the above-identified patent and that said Letters Patent is hereby corrected as shown below:

<u>Title page,</u>  
Item [56] References Cited,  
FOREIGN PATENT DOCUMENTS  
Change "WO 9816057" to -- WO 9816057A --  
Change "WO 9819452" to -- WO 9819452A --.

Signed and Sealed this

Fifth Day of March, 2002

Attest:

JAMES E. ROGAN  
*Attesting Officer*    *Director of the United States Patent and Trademark Office*